US008738917B2

(12) United States Patent
Wakao et al.

(10) Patent No.: US 8,738,917 B2
(45) Date of Patent: May 27, 2014

(54) IMAGE DATA VERIFICATION

(75) Inventors: Satoru Wakao, Yokohama (JP); Keiichi Iwamura, Yokohama (JP); Yasuhiro Nakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1723 days.

(21) Appl. No.: 11/278,749

(22) PCT Filed: Oct. 14, 2004

(86) PCT No.: PCT/JP2004/015541
§ 371 (c)(1),
(2), (4) Date: Jun. 29, 2006

(87) PCT Pub. No.: WO2005/036814
PCT Pub. Date: Apr. 21, 2005

(65) Prior Publication Data
US 2006/0248348 A1 Nov. 2, 2006

(30) Foreign Application Priority Data

Oct. 14, 2003 (JP) .................................. 2003-354155
Oct. 8, 2004 (JP) .................................. 2004-297010

(51) Int. Cl.
*H04L 9/32* (2006.01)
(52) U.S. Cl.
USPC ........................................................ 713/176
(58) Field of Classification Search
USPC ................... 713/176; 726/22, 26, 32
See application file for complete search history.

(56) References Cited

U.S. PATENT DOCUMENTS

| 5,499,294 | A  | * | 3/1996 | Friedman .................... 713/179 |
| 5,898,779 | A  | * | 4/1999 | Squilla et al. ............... 713/176 |
| 6,185,316 | B1 | * | 2/2001 | Buffam ....................... 382/115 |
| 6,269,446 | B1 | * | 7/2001 | Schumacher et al. ........ 713/176 |
| 6,425,081 | B1 |   | 7/2002 | Iwamura |
| 6,560,339 | B1 |   | 5/2003 | Iwamura |
| 6,567,530 | B1 | * | 5/2003 | Keronen et al. .............. 382/100 |
| 6,642,956 | B1 | * | 11/2003 | Safai ......................... 348/222.1 |
| 6,757,827 | B1 | * | 6/2004 | Geist ............................ 713/176 |

(Continued)

FOREIGN PATENT DOCUMENTS

| EP | 1209847 A1 * | 5/2002 |
| JP | 09-200730    | 7/1997 |

(Continued)

OTHER PUBLICATIONS

Jan. 25, 2005 International Search Report in Int'l. Appln. No. PCT/JP2004/015541.

(Continued)

*Primary Examiner* — Tamara T Kyle
(74) *Attorney, Agent, or Firm* — Fitzpatrick, Cella, Harper & Scinto

(57) ABSTRACT

An image verification system includes an image input apparatus, image verification apparatus, and database apparatus. The image input apparatus generates verification information for image data by using a private key and adds the verification information and predetermined information unique to the image input apparatus to the image data. The image verification apparatus verifies that the image data has been altered or not by using the verification information and a public key corresponding to the private key. The database apparatus stores the public key in association with the predetermined information in the a storage unit and provides the public key to the image verification apparatus.

24 Claims, 40 Drawing Sheets

(56) References Cited

U.S. PATENT DOCUMENTS

| | | | |
|---|---|---|---|
| 6,826,315 B1* | 11/2004 | Wickes | 382/305 |
| 6,889,324 B1* | 5/2005 | Kanai et al. | 713/176 |
| 6,922,777 B1 | 7/2005 | Iwamura | |
| 6,968,058 B1* | 11/2005 | Kondoh et al. | 380/200 |
| 7,084,903 B2* | 8/2006 | Narayanaswami et al. | 348/207.99 |
| 7,092,910 B2 | 8/2006 | Iwamura | |
| 7,231,133 B2* | 6/2007 | Kasai | 386/94 |
| 2001/0021251 A1* | 9/2001 | Kasai | 380/201 |
| 2002/0010627 A1* | 1/2002 | Lerat | 705/14 |
| 2002/0060736 A1 | 5/2002 | Wakao et al. | |
| 2002/0118837 A1* | 8/2002 | Hamilton | 380/277 |
| 2003/0123701 A1* | 7/2003 | Dorrell et al. | 382/100 |
| 2003/0126432 A1* | 7/2003 | Tonisson | 713/156 |
| 2003/0161536 A1 | 8/2003 | Iwamura et al. | |
| 2003/0231769 A1* | 12/2003 | Bolle et al. | 380/210 |
| 2004/0056967 A1* | 3/2004 | Ito et al. | 348/231.2 |
| 2004/0071311 A1* | 4/2004 | Choi et al. | 382/100 |
| 2004/0111603 A1 | 6/2004 | Iwamura | |
| 2004/0133794 A1* | 7/2004 | Kocher et al. | 713/193 |
| 2005/0283612 A1* | 12/2005 | Oishi | 713/176 |
| 2007/0172256 A1* | 7/2007 | Iwamura | 399/130 |
| 2008/0276095 A1* | 11/2008 | Iwamura | 713/179 |

FOREIGN PATENT DOCUMENTS

| | | |
|---|---|---|
| JP | 10-268763 | 10/1998 |
| JP | 11-316543 | 11/1999 |
| JP | 2000-324334 | 11/2000 |
| JP | 2002-158649 | 5/2002 |
| JP | 2002-244924 | 8/2002 |
| JP | 2003-152714 | 5/2003 |
| JP | 2003-198540 | 7/2003 |
| JP | 2003-198542 | 7/2003 |
| JP | 2003-198543 | 7/2003 |
| JP | 2003-198834 | 7/2003 |
| JP | 2004-040307 | 2/2004 |

OTHER PUBLICATIONS

Jan. 25, 2005 Written Opinion in Int'l. Appln. No. PCT/JP2004/015541.

* cited by examiner

FIG. 6

| SERIAL NUMBER | PUBLIC KEY | PRIVATE KEY |
|---|---|---|
| 0001 | 0x123456789··· | 0x987654321··· |
| 0002 | 0x234567890··· | 0x876543210··· |
| 0003 | 0x345678901··· | 0x765432109··· |
| 0004 | 0x456789012··· | 0x654321098··· |
| ····· | ····· | ····· |

FIG. 7

| IDENTIFIER | LENGTH | SERIAL NUMBER | DIGITAL SIGNATURE DATA |

FIG. 13

| SERIAL NUMBER | PRIVATE KEY |
|---|---|
| 0001 | 0x987654321··· |
| 0002 | 0x876543210··· |
| 0003 | 0x765432109··· |
| 0004 | 0x654321098··· |
| ...... | ...... |

FIG. 24

| USER INFORMATION | PUBLIC KEY | PRIVATE KEY |
|---|---|---|
| A | 0x123456789··· | 0x987654321··· |
| B | 0x234567890··· | 0x876543210··· |
| C | 0x345678901··· | 0x765432109··· |
| D | 0x456789012··· | 0x654321098··· |
| ······ | ······ | ······ |

FIG. 32

| USER INFORMATION | PRIVATE KEY |
|---|---|
| A | 0x987654321⋯ |
| B | 0x876543210⋯ |
| C | 0x765432109⋯ |
| D | 0x654321098⋯ |
| ⋯⋯ | ⋯⋯ |

F I G. 38

| USER INFORMATION | PRIVATE KEY |
|---|---|
| A' | 0x987654321··· |
| B' | 0x876543210··· |
| C' | 0x765432109··· |
| D' | 0x654321098··· |
| ...... | ...... |

IMAGE DATA VERIFICATION

TECHNICAL FIELD

The present invention relates to a system, an apparatus, a method, a computer program and so on for verifying whether image data has been altered or not.

BACKGROUND ART

Recently, for example, digital cameras have come into practical use as an image input apparatus which replaces a conventional silver halide photograph and 8-mm film. The digital camera digitizes image information obtained by photographing, and records the image information on a recording medium or the like.

With practical application of the digital camera, image information (image data) obtained by photographing can be transferred to an information processing apparatus (terminal apparatus) such as a personal computer, and displayed on the information processing apparatus. In addition, image data obtained by the digital camera can be instantaneously transferred to any place via a communication line.

Such digital image data is utilized by, for example, an insurance company which handles photographic evidence for an accident investigation, a construction company which records the progress of a building site, and the like.

However, the reliability of digital data drops because various digital data including image data can be easily edited by a photo-retouch tool, moving picture editing tool, and the like with remarkable development of the data processing technique.

For example, when digital image data is used as an evidence photograph treated by an insurance company, the reliability is lower than a conventional silver halide photograph and the like, and the digital image data is weak evidence.

To solve this problem, there has been proposed an apparatus or system which detects whether image data has been altered or not.

Such image input apparatus and image input system are disclosed in, e.g., U.S. Pat. No. 5,499,294 "DIGITAL CAMERA WITH APPARATUS FOR AUTHENTICATION OF IMAGES PRODUCED FROM AN IMAGE", Japanese Patent Laid-Open No. 9-200730, Japanese Patent Laid-Open No. 2000-324334, Japanese Patent Laid-Open No. 2002-244924, Japanese Patent Laid-Open No. 2003-198540, Japanese Patent Laid-Open No. 2003-198542, Japanese Patent Laid-Open No. 2003-198543, Japanese Patent Laid-Open No. 2003-198834, and Japanese Patent Laid-Open No. 2004-40307.

This image input apparatus executes a predetermined calculation on the basis of (i) at least one of a unique private key and a unique private key of an external apparatus connected to the image input apparatus, and (ii) image data acquired by photographing with the image input apparatus. By this calculation, the image input apparatus generates digital signature data serving as information for identifying the image data, and outputs the digital signature data and the image data.

For example, the image input apparatus uses a hash function and public key cryptography for generation of digital signature data, as shown in FIG. 20.

The digital signature is used when the transmitting side of target data transmits target data and signature data corresponding to the target data, and the receiving side verifies the signature data to confirm the authenticity of the target data.

Confirmation of the authenticity of target data on the basis of digital signature data generated using the hash function and public key cryptography is performed as follows.

Let Ks be the private key and Kp be the public key. The transmitting side executes an arithmetic process for compressing plaintext data M by a hash function and calculating data h of a predetermined length.

The transmitting side executes an arithmetic process of converting the data h by using the private key Ks and creating digital signature data s:

$$D(Ks,h)=s$$

After that, the transmitting side transmits the digital signature data s and plaintext data M.

The receiving side receives the digital signature data s transmitted from the transmitting side, and executes an arithmetic process of converting the digital signature data s by using the public key Kp:

$$E(Kp,s)=E(Kp,D(Ks,h''))=h''$$

The receiving side executes an arithmetic process of compressing the plaintext data M transmitted from the transmitting side by the same hash function as that of the transmitting side and calculating data h'. If the data h' and data h'' coincide with each other, the receiving side determines that the plaintext data M transmitted from the transmitting side is authentic. If the plaintext data M has been altered between the transmitting and receiving sides, data h'' (=E(Kp,s)=E(Kp,D(Ks,h''))) and the data h' do not coincide with each other, and thus alteration can be detected.

However, alteration cannot be detected when the digital signature data s has also been altered in accordance with alteration of the plaintext data M. To detect such alteration, the plaintext data M must be obtained from the data h, but such arithmetic process is impossible because of the one-way characteristic of the hash function (to be described later).

The hash function will be explained. The hash function is used to increase the speed of a digital signature data generation process or the like. The hash function outputs data h of a predetermined length by executing a process for plaintext data M of an arbitrary length.

The data output h is also called "hash value of plaintext data M", "message digest", or "digital fingerprint".

Properties necessary for the hash function include a one-way characteristic and collision resistance.

The one-way characteristic represents that when data h is provided, calculation of plaintext data M:

$$h=H(M)$$

is difficult owing to computational complexity.

Collision resistance represents that when plaintext data M is provided, calculation of plaintext data M' (M≠M'):

$$H(M)=H(M')$$

is difficult owing to computational complexity, and calculation of the plaintext data M and M':

$$H(M)=H(M') \text{ and } M \neq M'$$

is difficult owing to computational complexity.

As the hash function, algorithms such as MD-2, MD-4, SHA-1, RIPEMD-128, and RIPEMD-160 open to the public are available.

Public key cryptography will be explained. In public key cryptography, an encryption key and decryption key are different, the encryption key is laid open to the public, and the decryption key is held in secret.

Public key cryptography has the following features (a) to (c).

(a) Since encryption and decryption keys are different and the encryption key can be laid open to the public, the encryption key need not be delivered in secret, and key delivery is easy.

(b) Since the encryption key of each user is laid open to the public, the user stores only his decryption key in secret.

(c) Public key cryptography can realize an authentication function of allowing the receiving side to confirm that the transmitting side of a transmitted message (plaintext data) is not a "disguise" user and the message has not been altered.

For example, when "E(Kp,M)" represents encryption operation of the plaintext data M using the public encryption key Kp and "D(Ks,M)" represents decryption operation using the private decryption key Ks, the algorithm of public key cryptography satisfies two conditions (1) and (2).

(1) When the public encryption key Kp is provided, an arithmetic process of E(Kp,M) is easy. When the private decryption key Ks is provided, an arithmetic process of D(Ks, M) is easy.

(2) When the private decryption key Ks is not known, it is difficult due to computational complexity to determine plaintext data M even if the public encryption key Kp, "E" calculation sequence, and "C=E(Kp,M)" are known.

More secret communication can be realized by meeting condition (3) in addition to conditions (1) and (2).

(3) E(Kp,M) can be defined for all plaintext data M, and $$D(Ks,E(Kp,M))=M$$

is established. Since the public encryption key Kp is laid open to the public, any user can calculate E(Kp,M), but only a user having the private decryption key Ks can obtain plaintext data M by executing an arithmetic process of D(Ks,E(Kp,M)).

Further, more reliable authentication communication can be realized by meeting condition (4) in addition to conditions (1) and (2).

(4) D(Ks,M) can be defined for all plaintext data M, and $$E(Kp,D(Ks,M))=M$$

is established. That is, only a user having the private decryption key Ks can calculate D(Ks,M). Even if a third party calculates D(Ks',M) using a false private decryption key Ks' and is disguised as the user having the private decryption key Ks, $$E(Kp,D(Ks',M))\neq M$$

Thus, the receiving side can confirm that the received information is illicit. Also when D(Ks,M) is altered, $$E(Kp,D(Ks,M))\neq M$$

The receiving side can confirm that the received information is illicit.

Representative examples of cryptography capable of realizing the above-described secret communication and authentication communication are RSA cryptography, R cryptography, and W cryptography.

For example, encryption and decryption by RSA cryptography which is most popular now are given using an encryption key (e,n), decryption key (d,n), and n=p·q (different large prime numbers);

encryption: $C=M^e(\text{mod } n)$
decryption: $M=C^d(\text{mod } n)$

As represented by these transformations, RSA cryptography requires power calculation and residue calculation for each of encryption and decryption. Compared to secret key cryptography such as DES, the arithmetic quantity is very large, and a high-speed process is difficult.

Hence, no high-speed process can be expected when the above-described image input apparatus generates digital signature data by RSA cryptography. In order to shorten the processing time, the performance of hardware such as a CPU (Central Processing Unit) and memory (recording medium) for the image input apparatus must be improved. This configuration undesirably raises the cost of the product because of the following reasons. Since the resource (CPU) and memory (recording medium) of the image input apparatus are designed on the assumption that they are used for only a process or the like in image sensing for acquiring image data, these resources are hardly distributed to a digital signature data generation process. Further, public key cryptography such as RSA cryptography requires a larger quantity of calculation than that in secret key cryptography.

As described above, public key cryptography such as RSA cryptography suffers a complicated arithmetic process because of the necessity for power calculation and residue calculation. Public key cryptography requires a processing time several hundred to several thousand times longer than that of secret key cryptography such as DES cryptography.

In other words, the digital signature data generation method using public key cryptography and the hash function shown in FIG. 20 has a problem with the arithmetic quantity.

If digital signature data is created without using any public key cryptography in order to solve the above problem, any user can easily generate digital signature data because the algorithm of hash function calculation is laid open to the public. Thus, this configuration cannot be adopted.

To solve the above problem, for example, a method as shown in FIG. 21 has been proposed.

According to this method, as shown in FIG. 21, a simple arithmetic process, more specifically, an arithmetic process with a light processing burden using private key shared between an image input apparatus and an image verification apparatus is executed for image data as an input of the hash function. The result is processed by hash function calculation to generate digital signature data.

According to this method, the result (hash value) of hash function calculation becomes information unique to image data serving as an input and private key. An attacker cannot obtain a hash value corresponding to the image data because he does not know the private key even if he can alter the image data serving as an input. This is guaranteed from the fact that original data, i.e., private key cannot be obtained from an obtained hash value due to the one-way characteristic of the hash function. Hence, a user who does not know private key cannot alter image data.

This method can attain the same effects by calculation of a small processing quantity in comparison with the method using public key cryptography.

However, in the conventional verification method, when public key cryptography is adopted, a public key corresponding to a private key used to generate digital signature data is indispensable. The apparatus or system must be configured in consideration of where the public key or private key is stored and how to read out it in verification.

If a verification process is executed by using erroneous public key or private key, authentic image data which has not been altered may be determined as altered data, or illicit altered image data may be determined as unaltered image data.

Therefore the conventional verification method strictly manages information (public key, private key, and the like) necessary to verify target data.

DISCLOSURE OF INVENTION

The present invention has been made in consideration of the above situation, and has as its object to provide a system, an apparatus, a method, a computer program and so on capable of verifying that image data has been altered or not.

According to the present invention, the foregoing object is attained by providing an image verification system including an image input apparatus, an image verification apparatus, and a database apparatus, wherein the image input apparatus comprises a verification information generation unit that generates verification information for image data by using private key, and an output unit that outputs to the image verification apparatus the verification information generated by the verification information generation unit and predetermined information unique to the image input apparatus after adding the verification information and the predetermined information to the image data, the image verification apparatus comprises an acquisition unit that acquires public key corresponding to the private key by requesting the public key of the database apparatus, and a verification unit that verifies that the image data has been altered or not by using the public key obtained by the acquisition unit and the verification information added to the image data, the database apparatus comprises a storage unit that stores the public key in association with the predetermined information unique to the image input apparatus that uses the private key corresponding to the public key, and a first information providing unit that provides the public key of the storage unit on the basis of a request, and the acquisition unit transmits the predetermined information unique to the image input apparatus to the database apparatus, and the first information providing unit transmits the public key corresponding to the unique predetermined information to the image verification apparatus.

According to the present invention, the foregoing object is also attained by providing an image verification system including an image input apparatus, an image verification apparatus, and a database apparatus, wherein the image input apparatus comprises a verification information generation unit that generates verification information for image data by using private key, and an output unit that outputs to the image verification apparatus the verification information generated by the verification information generation unit and predetermined information unique to the image input apparatus after adding the verification information and the predetermined information to the image data, the image verification apparatus comprises an acquisition unit that acquires the private key by requesting the private key of the database apparatus, and a verification unit that verifies that the image data has been altered or not by using the private key obtained by the acquisition unit and the verification information added to the image data, the database apparatus comprises a storage unit that stores the private key in association with the predetermined information unique to the image input apparatus that uses the private key, and a first information providing unit that provides the private key of the storage unit on the basis of a request, and the acquisition unit transmits the predetermined information unique to the image input apparatus to the database apparatus, and the first information providing unit transmits the private key corresponding to the unique predetermined information to the image verification apparatus.

Further, the foregoing object is also attained by providing an image verification system including an image input apparatus, an image verification apparatus, a database apparatus, a user information input apparatus and a key generation apparatus, wherein the user information input apparatus comprises a user information registration unit that accepts unique user information, and a first information providing unit that provides the user information accepted by the user information registration unit to at least one of the information input apparatus and the key generation apparatus serving as an information requesting source, the image input apparatus comprises a verification information generation unit that generates verification information for image data by using private key, and an output unit that outputs to the image verification apparatus the verification information generated by the verification information generation unit and the user information after adding the verification information and the user information to the image data, the image verification apparatus comprises an acquisition unit that acquires public key corresponding to the private key by requesting the public key of the database apparatus, and a verification unit that verifies that the image data has been altered or not by using the public key obtained by the acquisition unit and the verification information added to the image data, the database apparatus comprises a storage unit that stores the public key in association with the user information for the private key corresponding to the public key, and a second information providing unit that provides the public key of the storage unit on the basis of a request, and the acquisition unit transmits the user information to the database apparatus, and the second information providing unit transmits the public key corresponding to the user information to the image verification apparatus.

Furthermore, the foregoing object is also attained by providing an image verification system including an image input apparatus, an image verification apparatus, a database apparatus, a user information input apparatus and a key generation apparatus, wherein the user information input apparatus comprises a user information registration unit that accepts unique user information, and a first information providing unit that provides the user information accepted by the user information registration unit to at least one of the information input apparatus and the key generation apparatus serving as an information requesting source, the image input apparatus comprises a verification information generation unit that generates verification information for image data by using private key, and an output unit that outputs to the image verification apparatus the verification information generated by the verification information generation unit and the user information after adding the verification information and the user information to the image data, the image verification apparatus comprises an acquisition unit that acquires the private key by requesting the private key of the database apparatus, and a verification unit that verifies that the image data has been altered or not by using the private key obtained by the acquisition unit and the verification information added to the image data, the database apparatus comprises a storage unit that stores the private key in association with the user information for the private key, and a second information providing unit that provides the private key of the storage unit on the basis of a request, and the acquisition unit transmits the user information to the database apparatus, and the second information providing unit transmits the private key corresponding to the user information to the image verification apparatus.

Further, the foregoing object is also attained by providing a public key management method in an image verification system that includes an image input apparatus, an image verification apparatus, and a database apparatus, and verifies that image data transmitted from the image input apparatus has been altered or not by using public key of the image input apparatus, comprising: a generation step of generating private key used in the image input apparatus and public key corresponding to the private key; a storage step of storing the public key and predetermined information unique to the image input apparatus that uses the private key corresponding to the public key, in the database apparatus in association with each other; and a transmission step of transmitting the public key corresponding to the unique predetermined information from the database apparatus to the image verification apparatus on the basis of the predetermined information which is provided from the image verification apparatus and is unique to the image input apparatus, wherein the image verification apparatus verifies that the image data is altered or not by using the public key transmitted from the database apparatus.

Further, the foregoing object is also attained by providing a private key management method in an image verification system that includes an image input apparatus, an image verification apparatus and a database apparatus, and verifies that target data transmitted from the image input apparatus is altered or not by using private key of the image input apparatus, comprising: a generation step of generating private key used in the image input apparatus; a storage step of storing the private key and predetermined information unique to the image input apparatus that uses the private key, in the database apparatus in association with each other; and a transmission step of transmitting the private key corresponding to the unique predetermined information from the database apparatus to the image verification apparatus on the basis of the predetermined information which is provided from the image verification apparatus and is unique to the image input apparatus, wherein the image verification apparatus verifies that the target data is altered or not by using the private key transmitted from the database apparatus.

Further, the foregoing object is also attained by providing a public key management method in an image verification system that includes an image input apparatus, an image verification apparatus, a database apparatus, and a user information input apparatus, and verifies that image data transmitted from the image input apparatus is altered or not by using public key for user information input from the user information input apparatus, comprising: a user information registration step of accepting unique user information; a generation step of generating private key corresponding to the user information and public key corresponding to the private key; a storage step of storing the public key and the user information in the database apparatus in association with each other; and a transmission step of transmitting the public key corresponding to unique predetermined information from the database apparatus to the image verification apparatus on the basis of the user information provided from the image verification apparatus, wherein the image verification apparatus verifies that the image data is altered or not by using the public key transmitted from the database apparatus.

Further, the foregoing object is also attained by providing a public key management method in an image verification system that includes an image input apparatus, an image verification apparatus, a database apparatus, and a user information input apparatus, and verifies that image data transmitted from the image input apparatus is altered or not by using private key for user information input from the user information input apparatus, comprising: a user information registration step of accepting unique user information; a generation step of generating private key corresponding to the user information; a storage step of storing the private key and the user information in the database apparatus in association with each other; and a transmission step of transmitting the private key corresponding to unique predetermined information from the database apparatus to the image verification apparatus on the basis of the user information provided from the image verification apparatus, wherein the image verification apparatus verifies that the image data transmitted from the image input apparatus is altered or not by using the private key transmitted from the database apparatus.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a table for explaining a private key and public key generated by the key generation apparatus;

FIG. 7 is a view for explaining digital signature data generated by the image input apparatus;

FIG. 13 is a table for explaining private key generated by an key generation apparatus in the image verification system according to the second embodiment of the present invention;

FIG. 24 is a table for explaining a private key and public key generated by an key generation apparatus in the image verification system according to the fourth embodiment of the present invention;

FIG. 32 is a table for explaining private key generated by an key generation apparatus in the image verification system according to the fifth embodiment of the present invention;

FIG. 38 is a table for explaining private key generated by an key generation apparatus in the image verification system according to the sixth embodiment of the present invention;

BEST MODE FOR CARRYING OUT THE INVENTION

Preferred embodiments of the present invention will be described in detail in accordance with the accompanying drawings.

First Embodiment

Figure 1:
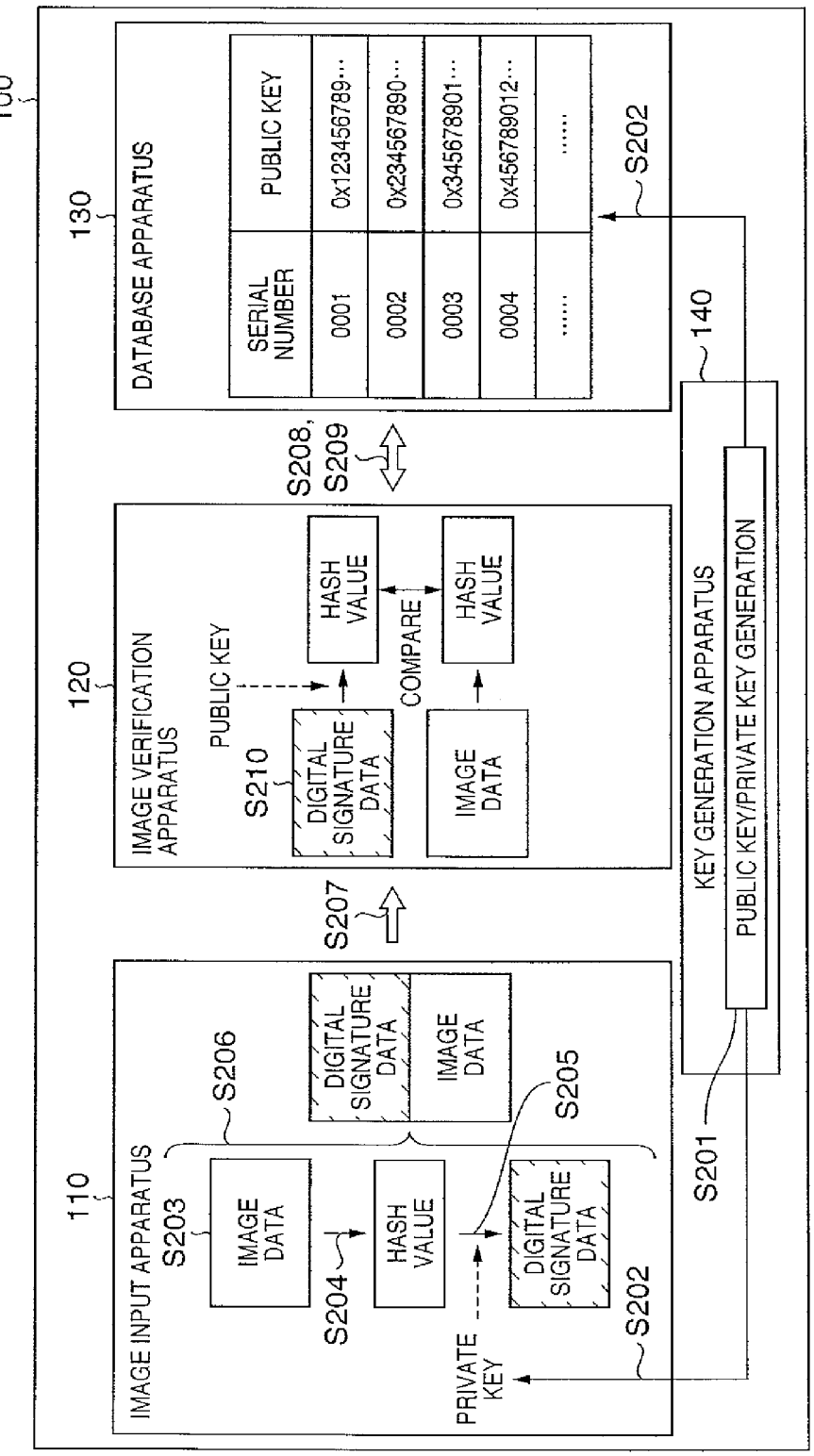
FIG. 1 is a block diagram showing the configuration of an image verification system to which the present invention is applied, and schematic processing procedures executed within and between apparatuses which form the image verification system according to the first embodiment of the present invention.

The first embodiment of the present invention is applied to, e.g., an image verification system 100 as shown in FIG. 1.

The image verification system 100 according to the first embodiment comprises an image input apparatus 110 which generates digital signature data (verification information) necessary for detecting that digital image data has been altered or not by using private key or public key corresponding to the private key, an image verification apparatus 120 which detects that the image data has been altered or not by using digital signature data and a private key or a public key corresponding to the private key, a database apparatus 130 which stores and manages a private key or a public key corresponding to the private key, and a key generation apparatus 140 which generates a private key and a public key corresponding to the private key. A private key or a public key corresponding to the private key which is required to detect whether image data has not been altered is strictly managed and utilized. Even if image data has been altered, alteration is reliably detected.

The image verification system 100 according to the first embodiment will be explained in detail.

<Configuration of Image Input Apparatus 110>

Figure 2:
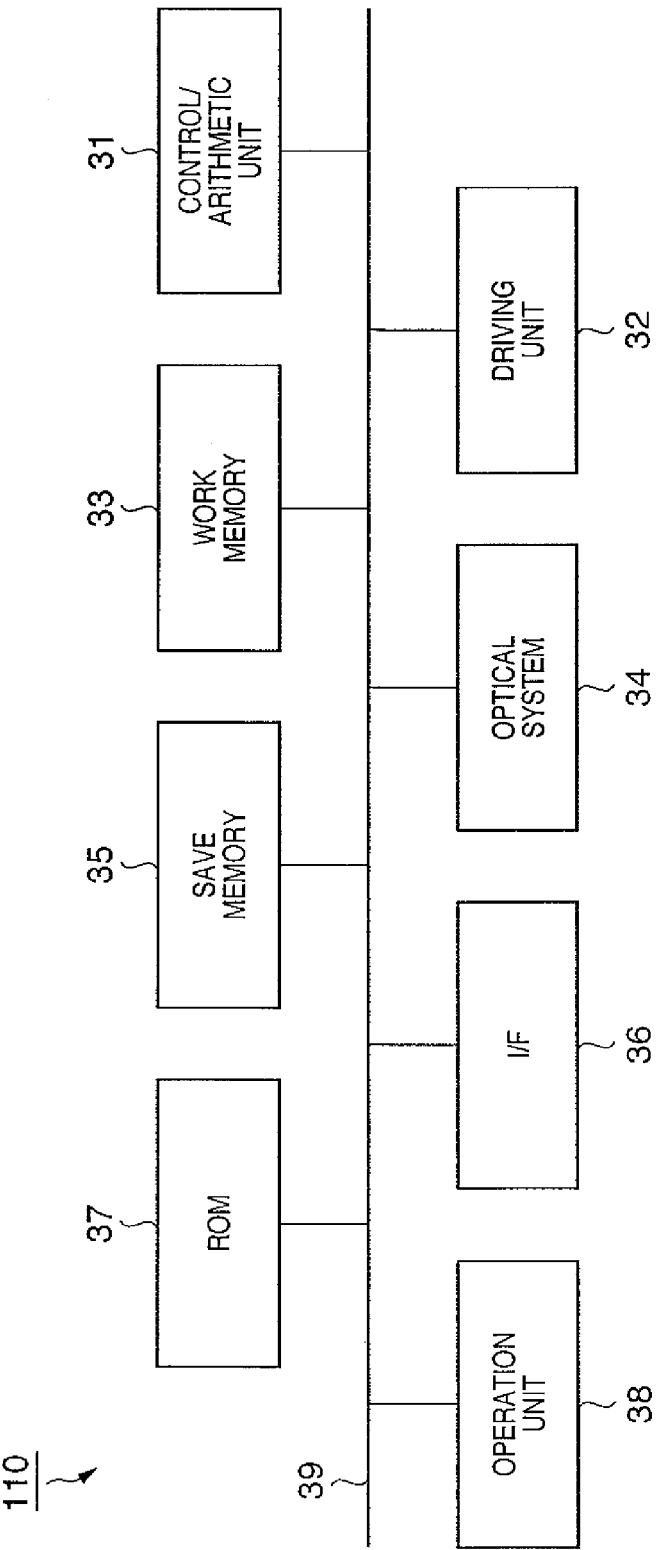
FIG. 2 is a block diagram showing the configuration of an image input apparatus in the image verification system.

The image input apparatus 110 has an image sensing function like a digital still camera, digital video camera, or a camera-equipped portable terminal apparatus (including a camera-equipped cell phone), or an image read function like a scanner or film scanner. For example, when the image input apparatus 110 has an image sensing function, the image input apparatus 110 comprises a control/arithmetic unit 31, a driving unit 32, a work memory 33, an optical system 34, a save memory 35, an interface (I/F) 36 with an external apparatus, a ROM 37, and an operation unit 38, as shown in FIG. 2. These building components 31 to 38 are connected via a bus 39 so as to be able to communicate with each other.

The control/arithmetic unit 31 is formed from a CPU and the like which control the overall operation of the image input apparatus 110. For example, when the user designates image sensing via the operation unit 38, the control/arithmetic unit 31 reads out and executes a predetermined processing program stored in the ROM 37 in advance. The control/arithmetic unit 31 performs an image data compression process and various arithmetic processes for generation of digital signature data and the like, and in addition, issues necessary control instructions to the constituents of the image input apparatus 110.

The driving unit 32 performs mechanical operation necessary for image sensing under the control of the control/arithmetic unit 31.

The work memory 33 temporarily stores, e.g., image data, and a process for the image data is done using the work memory 33.

The optical system 34 generates and outputs sensed image data (image data) of an object by a charge-coupled device (CCD) or the like. When the user designates image sensing via the operation unit 38 the optical system 34 executes sensing of an object, an electrical signal process for the sensed image, a digital signal process, and the like under the control of the control/arithmetic unit 31.

The save memory 35 stores processed image data and the like.

The I/F 36 interfaces an external apparatus such as a memory card, portable terminal apparatus, or communication apparatus. The I/F 36 executes, e.g., a process of transmitting image data, digital signature data, and the like to the external apparatus.

The ROM 37 is a read only memory, and stores in advance a processing program necessary to control the operation of the image input apparatus 110, private key necessary to generate digital signature data, and the like.

The operation unit 38 accepts various instructions such as a image sensing instruction from the user (photographer).

<Configuration of Image Verification Apparatus 120>

Figure 3:
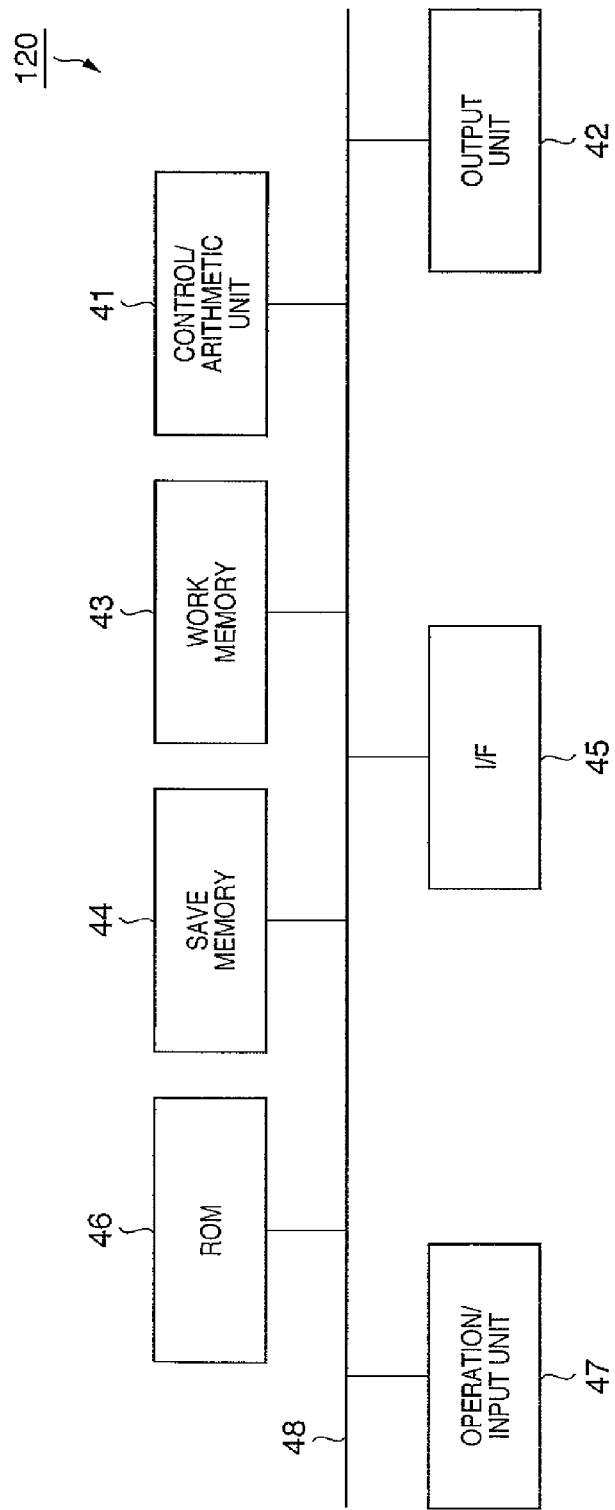
FIG. 3 is a block diagram showing the configuration of an image verification apparatus in the image verification system.

For example, as shown in FIG. 3, the image verification apparatus 120 comprises a control/arithmetic unit 41, output unit 42, work memory 43, save memory 44, interface 45, ROM 46, and operation/input unit 47. These constituents 41 to 47 are connected via a bus 48 so as to be able to communicate with each other.

The control/arithmetic unit 41 is formed from a CPU and the like which control the overall operation of the image verification apparatus 120. For example, the control/arithmetic unit 41 reads out and executes a predetermined processing program stored in the ROM 46 in advance, and issues necessary control instructions to the constituents of the image verification apparatus 120.

For example, received image data is moved from the save memory 44 to the work memory 43. By using the work memory 43, a verification process for the image data, various arithmetic processes, and the like are done.

The output unit 42 outputs an authentication process result, verification process result, and the like to an external apparatus such as a display or printer.

The interface 45 interfaces an external apparatus such as a memory card, portable terminal apparatus, or communication apparatus. The interface 45 receives, e.g., image data containing digital signature data, and public key corresponding to private key necessary to verify the image data.

The ROM 46 is a read only memory, and stores in advance processing programs (authentication program, verification program, and the like) necessary to control the operation of the image verification apparatus 120, and if necessary, private key necessary to verify digital signature data, public key corresponding to the private key, and the like.

The operation/input unit 47 accepts various instructions such as an authentication instruction from the user.

In the image verification apparatus 120, when the user designates activation of the image verification apparatus 120 via the operation/input unit 47, the control/arithmetic unit 41 reads out and executes a predetermined processing program (user authentication program) stored in the ROM 46 in advance, and requests the user to input data (e.g., password) for authentication.

The input data (e.g., password) is temporarily converted in the work memory 43.

The control/arithmetic unit 41 performs an authentication process for the input data by using the work memory 43, and only when the result is authentic, activates the image verification apparatus 120.

The interface 45 receives image data containing digital signature data, and public key corresponding to private key necessary to verify the image data. The interface 45 stores the received image data in the save memory 44, and stores the received public key in the work memory 43.

When the user uses the operation/input unit 47 to designate verification of the image data input from the interface 45, the control/arithmetic unit 41 reads out and executes a predetermined processing program (verification program) stored in the ROM 46 in advance. The control/arithmetic unit 41 executes a verification process for the digital signature data contained in the input image data by using the work memory 43.

The public key corresponding to the private key necessary for the verification process is stored in the ROM 46 in advance, and, loaded from the ROM 46 to the work memory 43 as needed. Alternatively, the public key is acquired by access to the external database apparatus 130, and loaded to the work memory 43.

To acquire public key corresponding to private key by access to the external database apparatus 130, the image verification apparatus 120 issues a data transmission request to the database apparatus 130, and the image verification apparatus 120 must be determined as an authentic apparatus as a result of authentication between the image verification apparatus 120 and the database apparatus 130.

Examples of a representative authentication method are
(1) method using a password
(2) method using secret key cryptography
(3) method using public key cryptography (1) Method Using Password The image verification apparatus 120 transmits an ID number unique to the apparatus 120 to the database apparatus 130. The database apparatus 130 requests the image verification apparatus 120 to transmit a password. The image verification apparatus 120 transmits a password held in advance to the database apparatus 130. The database apparatus 130 determines whether the password transmitted from the image verification apparatus 120 coincides with a password which is registered in advance and corresponds to the ID number, and only when the passwords coincide with each other, determines that authentication is successful.

(2) Method Using Secret Key Cryptography

The image verification apparatus 120 transmits an ID number unique to the apparatus 120 to the database apparatus 130. The database apparatus 130 generates a random number, and transmits it to the image verification apparatus 120. The image verification apparatus 120 executes an arithmetic process using a secret key shared with the database apparatus 130 for the random number from the database apparatus 130, and transmits data of the arithmetic result to the database apparatus 130. The database apparatus 130 executes an arithmetic process for the data from the image verification apparatus 120 by using a secret key which is registered in advance and corresponds to the ID number. The database apparatus 130 determines whether the arithmetic result coincides with the random number, and only when the arithmetic result coincides with the random number, determines that authentication is successful.

(3) Method Using Public Key Cryptography

The image verification apparatus 120 transmits an ID number unique to the apparatus 120 to the database apparatus 130. The database apparatus 130 generates a random number, and transmits it to the image verification apparatus 120. The image verification apparatus 120 executes an arithmetic process using its own private key for the random number from the database apparatus 130, and transmits data of the arithmetic result to the database apparatus 130. The database apparatus 130 executes an arithmetic process for the data from the image verification apparatus 120 by using a public key which is registered in advance and corresponds to the ID number. The database apparatus 130 determines whether the arithmetic result coincides with the random number, and only when the arithmetic result coincides with the random number, determines that authentication is successful.

<Configuration of Database Apparatus 130>

Figure 4:
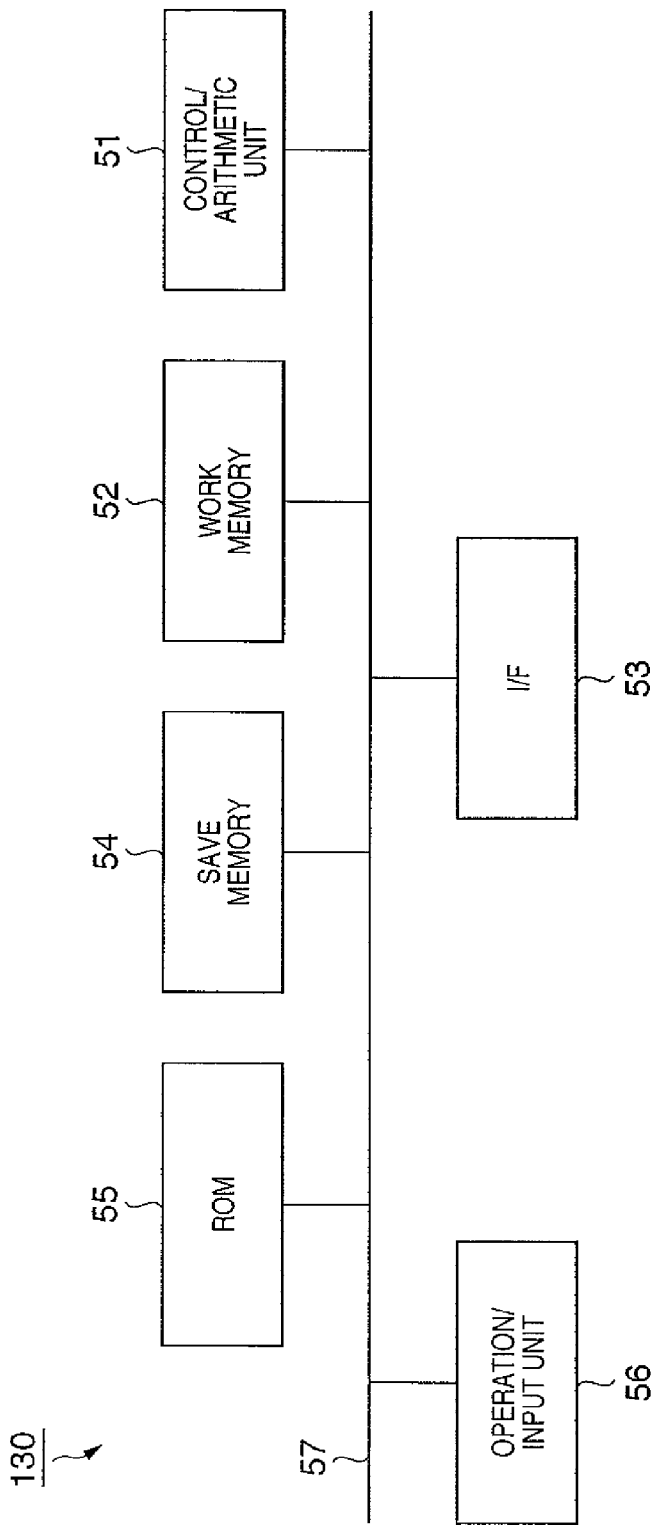
FIG. 4 is a block diagram showing the configuration of a database apparatus in the image verification system.

For example, as shown in FIG. 4, the database apparatus 130 comprises a control/arithmetic unit 51, work memory 52, save memory 54, interface 53, ROM 55, and operation/input unit 56. These constituents 51 to 56 are connected via a bus 57 so as to be able to communicate with each other.

The control/arithmetic unit 51 is formed from a CPU and the like which control the overall operation of the database apparatus 130. The control/arithmetic unit 51 reads out and executes a predetermined processing program stored in the ROM 55 in advance, and issues necessary control instructions to the constituents of the database apparatus 130.

For example, when the user designates activation of the database apparatus 130 via the operation/input unit 56, the control/arithmetic unit 51 reads out and executes a predetermined processing program (user authentication program) stored in the ROM 55 in advance, and requests the user to input data (e.g., password) for authentication.

The authentication data input from the user is temporarily converted in the work memory 52. The control/arithmetic unit 51 executes an authentication process by using the work memory 52, determines whether the process result is authentic, and only when the result is authentic, activates the database apparatus 130.

Public key corresponding to private key is stored as a database in the save memory 54. Registration and updating of the public key requires authentication.

The above-mentioned user authentication process, an authentication process for a received transmission request and registration request, and various arithmetic processes are done using the work memory 52.

The interface 53 interfaces external apparatuses such as the image verification apparatus 120 and key generation apparatus 140, and transmits/receives public key corresponding to private key necessary to verify image data.

More specifically when a transmission request for public key corresponding to private key is issued to the interface 53, the control/arithmetic unit 51 reads out and executes a predetermined processing program (transmission request authentication program) stored in the ROM 55 in advance. The control/arithmetic unit 51 executes an authentication process for the transmission request by using the work memory 52.

Only when the result of the authentication process is authentic, the control/arithmetic unit 51 reads out the requested public key corresponding to the private key from the save memory 54, and transmits the public key to the requesting source via the interface 53.

When a registration request for public key corresponding to private key is issued to the interface 53, the control/arithmetic unit 51 reads out and executes a predetermined processing program (registration request authentication program) stored in the ROM 55 in advance. The control/arithmetic unit 51 executes an authentication process for the registration request by using the work memory 52.

Only when the result of the authentication process is authentic, the control/arithmetic unit 51 receives the transmitted public key corresponding to the private key via the interface 53, and registers the public key.

The ROM 55 is a read only memory, and stores in advance processing programs (e.g., user authentication program, transmission request authentication program, registration request authentication program) and the like necessary to control the operation of the database apparatus 130, and private key necessary to verify digital signature data, public key corresponding to private key, and the like as needed.

The operation/input unit 56 accepts various instructions such as an activation instruction from the user.

<Configuration of Key Generation Apparatus 140>

Figure 5:
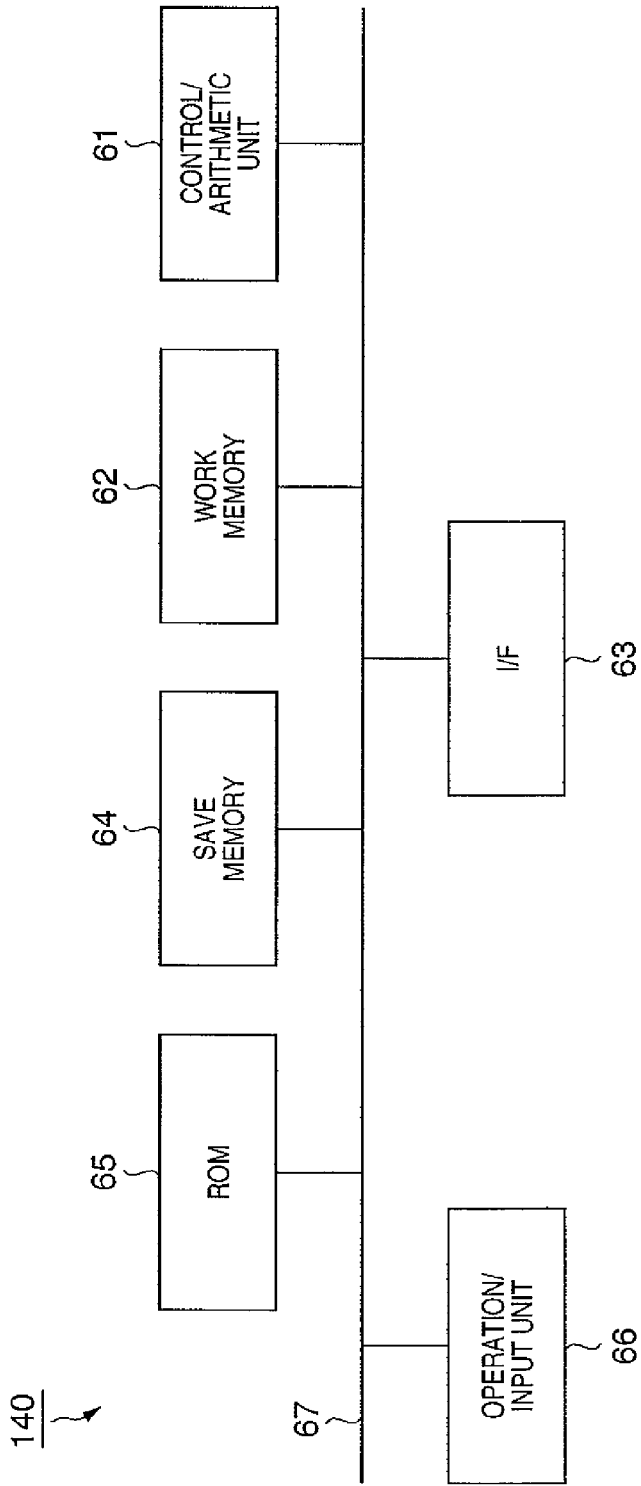
FIG. 5 is a block diagram showing the configuration of an key generation apparatus in the image verification system.

For example, as shown in FIG. 5, the key generation apparatus 140 comprises a control/arithmetic unit 61, work memory 62, save memory 64, interface 63, ROM 65, and operation/input unit 66. These constituents 61 to 66 are connected via a bus 67 so as to be able to communicate with each other.

The control/arithmetic unit 61 is formed from a CPU and the like which control the overall operation of the key generation apparatus 140. The control/arithmetic unit 61 reads out and executes a predetermined processing program stored in the ROM 65 in advance, and issues necessary control instructions to the constituents of the key generation apparatus 140.

For example, when the user designates activation of the key generation apparatus 140 via the operation/input unit 66, the control/arithmetic unit 61 reads out and executes a predetermined processing program (user authentication program) stored in the ROM 65 in advance, and requests the user to input data (e.g., password) for authentication.

The authentication data input from the user is converted in the work memory 62. The control/arithmetic unit 61 executes an authentication process by using the work memory 62, determines whether the result of the authentication process is authentic, and only when the result is authentic, activates the key generation apparatus 140.

The above-mentioned user authentication process, an information generation process, and various arithmetic processes are done using the work memory 62.

The interface 63 interfaces external apparatuses such as the database apparatus 130 and image input apparatus 110, and transmits public key corresponding to private key.

More specifically, when a generation request for public key corresponding to private key is issued to the interface 63, the control/arithmetic unit 61 reads out and executes a predetermined processing program (information generation program) stored in the ROM 65 in advance. The control/arithmetic unit 61 executes a generation process for the public key by using the work memory 62, and temporarily stores the public key in the save memory 64, which will be described in detail later.

The control/arithmetic unit 61 transmits a registration request to the database apparatus 130.

In the database apparatus 130, only when the registration request is authorized to be authentic, the control/arithmetic unit 61 reads out the public key corresponding to the private key from the save memory 64, and transmits the public key to the requesting source via the interface 63.

Alternatively, the control/arithmetic unit 61 reads out the public key corresponding to the private key from the save memory 64, and transmits the public key to the image input apparatus 110 via the interface 63.

After that, the control/arithmetic unit 61 erases the transmitted public key from the save memory 64.

The ROM 65 is a read only memory, and stores in advance processing programs (information generation program and the like) necessary to control the operation of the key generation apparatus 140.

The operation/input unit 66 accepts various instructions such as an activation instruction.

<Overall Operation of Image Verification System 100>

The operation of the image verification system 100 having the apparatuses 110 to 140 as shown in FIGS. 2 to 5 will be explained with reference to FIG. 1 by exemplifying an operation when public key cryptography is adopted for generation of digital signature data.

In the following description, "public key" corresponds to "public key corresponding to private key", and "private key" corresponds to "private key".

Step S201:

The key generation apparatus 140 generates a private key and public key necessary to generate digital signature data.

For example, when a plurality of image input apparatuses 110 exist and digital signature data are generated using different private keys for the respective apparatuses, the generated private keys and public keys, and pieces of information (e.g., the serial numbers of the image input apparatuses 110: to be referred to as serial numbers hereinafter) unique to the image input apparatuses 110 which use these pieces of private key are made to correspond to each other, as shown in FIG. 6. In this case, the user cannot execute key information operation and the like until he performs authentication with the key generation apparatus 140 by using a password or the like and is confirmed to be authentic.

Authentication is also done between the database apparatus 130 and the key generation apparatus 140, and only when authentication is successful, the key generation apparatus 140 transmits the serial number and public key to the database apparatus 130.

Step S202:

When the key generation apparatus 140 transmits a private key to the image input apparatus 110, the image input apparatus 110 stores the private key in the ROM 37.

As described above, the key generation apparatus 140 stores a private key in correspondence with the serial number of the image input apparatus. Private key data "0x987654321" corresponding to a serial number "0001" is transmitted to an image input apparatus having the serial number "0001", and stored.

If the key generation apparatus 140 transmits a serial number and public key to the database apparatus 130, the database apparatus 130 registers them.

In the example shown in FIG. 6, public key data "0x123456789" corresponding to the serial number "0001" is managed in association with the serial number "0001". In this case, the user (registrant) cannot execute key information registration operation and the like until he performs authentication with the database apparatus 130 by using a password or the like and is confirmed to be authentic.

Step S203:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S204:

The image input apparatus 110 performs a compression process using a hash function for the image data having undergone the image compression process in step S203, generating a hash value (digest).

As the hash function, MD-5, SHA-1, and the like are available. The hash value is represented by 128 bits when MD-5 is applied, and 160 bits when SHA-1 is applied.

Step S205:

The image input apparatus 110 generates digital signature data by public key cryptography using the hash value generated in step S204 and the private key stored in the ROM 37.

As described above, the generated digital signature data is safe unless the private key externally leaks from the ROM 37.

Step S206:

The image input apparatus 110 inserts the digital signature data generated in step S205 together with the serial number into the header of the image data formatted to the file in step S203.

More specifically, when the image data is data formatted to a JFIF file, the image input apparatus 110 sets the digital signature data and serial number at the header of image data as shown in FIG. 7.

In this case, the header of the image data is formed from an identifier area, length area, serial number area, and digital signature area.

The identifier area describes an identifier (marker) representing that the image data is not data associated with playback and display of an image.

The length area describes by bytes a total of the data lengths of the length area, serial number area, and digital signature area.

The serial number area describes the serial number of the image input apparatus 110, as shown in FIG. 6.

The digital signature area describes digital signature data generated in step S205.

Since the header as shown in FIG. 7 becomes invalid in playing back or displaying image data, setting of various data at the header does not cause degradation of the image quality, a change in image, or the like.

Step S207:

The image input apparatus 110 uses the interface 36 to convert the image data to which the digital signature data has been inserted in step S206 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S208:

The user who is to verify the image data sent from the image input apparatus 110 by the image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the serial number of the image input apparatus 110 serving as information for acquiring a public key corresponding to a private key used to generate the digital signature data.

The image verification apparatus 120 extracts the serial number from the serial number area of the header. By using the serial number, the image verification apparatus 120 generates request information for requesting a public key necessary for verification of the database apparatus 130, and transmits the request information to the database apparatus 130.

Step S209:

The database apparatus 130 receives the request information from the image verification apparatus 120, and determines from the request information in the above-described way whether the image verification apparatus 120 is authentic.

Only when the database apparatus 130 determines as a result of authentication that the image verification apparatus 120 is authentic, the database apparatus 130 searches for a public key which is stored in the save memory 54 and corresponds to the serial number contained in the received request information, and transmits the found public key to the image verification apparatus 120.

Step S210:

The image verification apparatus 120 receives the public key from the database apparatus 130, extracts the digital signature data from the digital signature area of the header of the image data received from the image input apparatus 110 in step S207, and performs an arithmetic process using the public key for the digital signature data.

The image verification apparatus 120 deletes the header from the image data, and generates a hash value by executing a compression process using a hash function for the resultant image data, i.e., data formed from only the image data.

The image verification apparatus 120 compares the hash value and the result of the arithmetic process using the public key. If the hash value and result coincide with each other, the image verification apparatus 120 determines that the image data has not been altered; if they do not coincide with each other, determines that the image data has been altered, and outputs the determination result.

<Operation of Image Input Apparatus 110>

Figure 8:
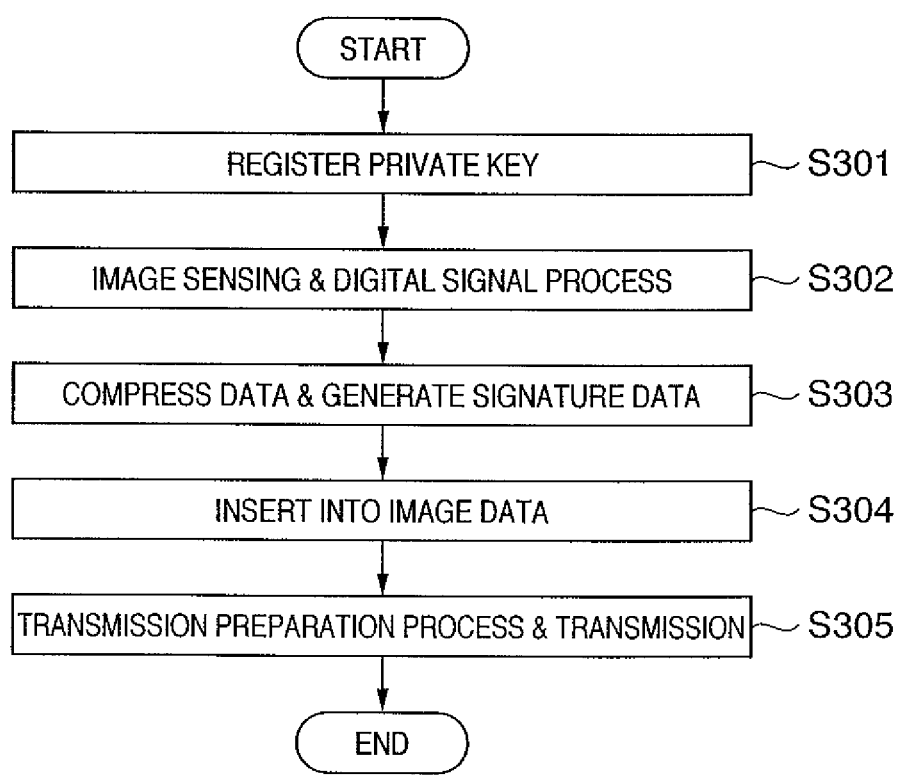
FIG. 8 is a flowchart for explaining the operation of the image input apparatus according to the first embodiment of the present invention.

FIG. 8 shows as an example of the operation of the image input apparatus 110 an operation of receiving and registering a private key, generating digital signature data by using a private key for sensed image data, and inserting the digital signature data into the image data.

Step S301:

The image input apparatus 110 receives a private key from the key generation apparatus 140, and stores (registers) the received private key in the ROM 37.

Step S302:

The image input apparatus 110 senses an object, executes an image compression process for the sensed image (image information) of the object subsequently to an electrical signal process, digital signal process, and the like, and formats the image to a file.

Step S303:

The image input apparatus 110 performs a compression process using a hash function for the image data having undergone the image compression process in step S302, generating a hash value.

The image input apparatus 110 generates digital signature data from the hash value and the private key stored in the ROM 37.

Step S304:

The image input apparatus 110 inserts the digital signature data generated in step S303 together with the serial number into the header of the image data formatted to the file in step S302.

Step S305:

The image input apparatus 110 performs a transmission preparation process for the image data to which the digital signature data has been inserted in step S304, and transmits the processed image data to the image verification apparatus 120.

The process then ends.

The transmission preparation process in step S305 is, e.g., a process of converting target data into data corresponding to the network protocol when the image input apparatus 110 and image verification apparatus 120 are connected via a network. The transmission preparation process also includes a process of recording target data on a storage medium when the image input apparatus 110 and image verification apparatus 120 are not connected via a network or the like and exchange data via a storage medium such as a memory card.

Creation of digital signature data and an insertion process into image data may be executed every image sensing, or at once for image data obtained by respective image sensing operations after the end of all image sensing operations.

<Operation of Image Verification Apparatus 120>

Figure 9:
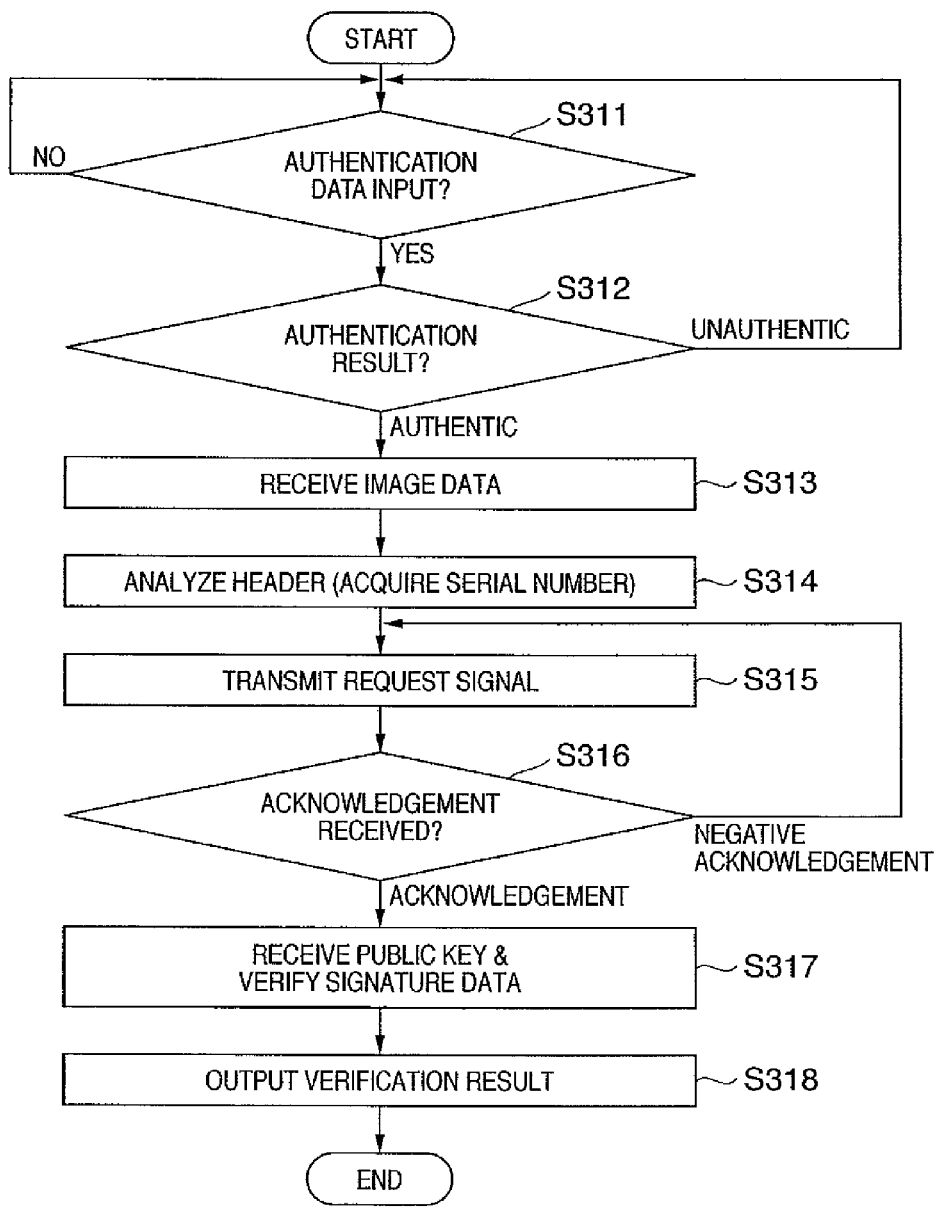
FIG. 9 is a flowchart for explaining the operation of the image verification apparatus according to the first embodiment of the present invention.

FIG. 9 shows as an example of the operation of the image verification apparatus 120 an operation of receiving image data containing digital signature data, receiving a public key used to verify the image data, and verifying the image data by using the public key.

Step S311:

The image verification apparatus 120 determines whether the user has input authentication data such as a password for authentication.

If authentication data is determined not to have been input, the image verification apparatus 120 waits for input of data; if authentication data is determined to have been input, advances to step S312.

Step S312:

If authentication data is determined in step S311 to have been input, the image verification apparatus 120 determines from the authentication data whether the user is an authentic user (verifier).

If the user is determined not to be authentic, the image verification apparatus 120 repetitively executes the process from step S311; if the user is determined to be authentic, advances to step S313.

Step S313:

If the user is determined in step S312 to be authentic, the image verification apparatus 120 receives image data containing digital signature data from the image input apparatus 110.

For example, when the image input apparatus 110 and image verification apparatus 120 are connected via a network, the image verification apparatus 120 receives image data via the network. When the image input apparatus 110 and image verification apparatus 120 are not connected via a network or the like and exchange data via a storage medium such as a memory card, the image verification apparatus 120 reads out image data from the storage medium.

Step S314:

The image verification apparatus 120 analyzes the header of the image data which is acquired in step S313 and contains the digital signature data, and acquires data (in this case, the serial number of the image input apparatus 110) necessary to acquire a public key corresponding to the private key used to generate the digital signature data from the database apparatus 130.

Step S315:

By using the serial number acquired in step S314, the image verification apparatus 120 generates request information for requesting a public key necessary for verification of the database apparatus 130, and transmits the request information to the database apparatus 130.

Step S316:

The image verification apparatus 120 determines whether the response from the database apparatus 130 to the request information transmitted in step S315 is acknowledgement or negative acknowledgement.

If the response is determined to be negative acknowledgement, the image verification apparatus 120 repetitively executes the process from step S315; if the response is determined to be acknowledgement, advances to step S317.

Step S317:

If it is determined in step S316 that the database apparatus 130 has transmitted acknowledgement, the image verification apparatus 120 receives a public key from the database apparatus 130, and verifies the digital signature data inserted in the header of the image data received in step S313 by using the public key.

Step S318:

The image verification apparatus 120 outputs the verification result of step S317.

The process then ends.

<Operation of Database Apparatus 130>

Figure 10:
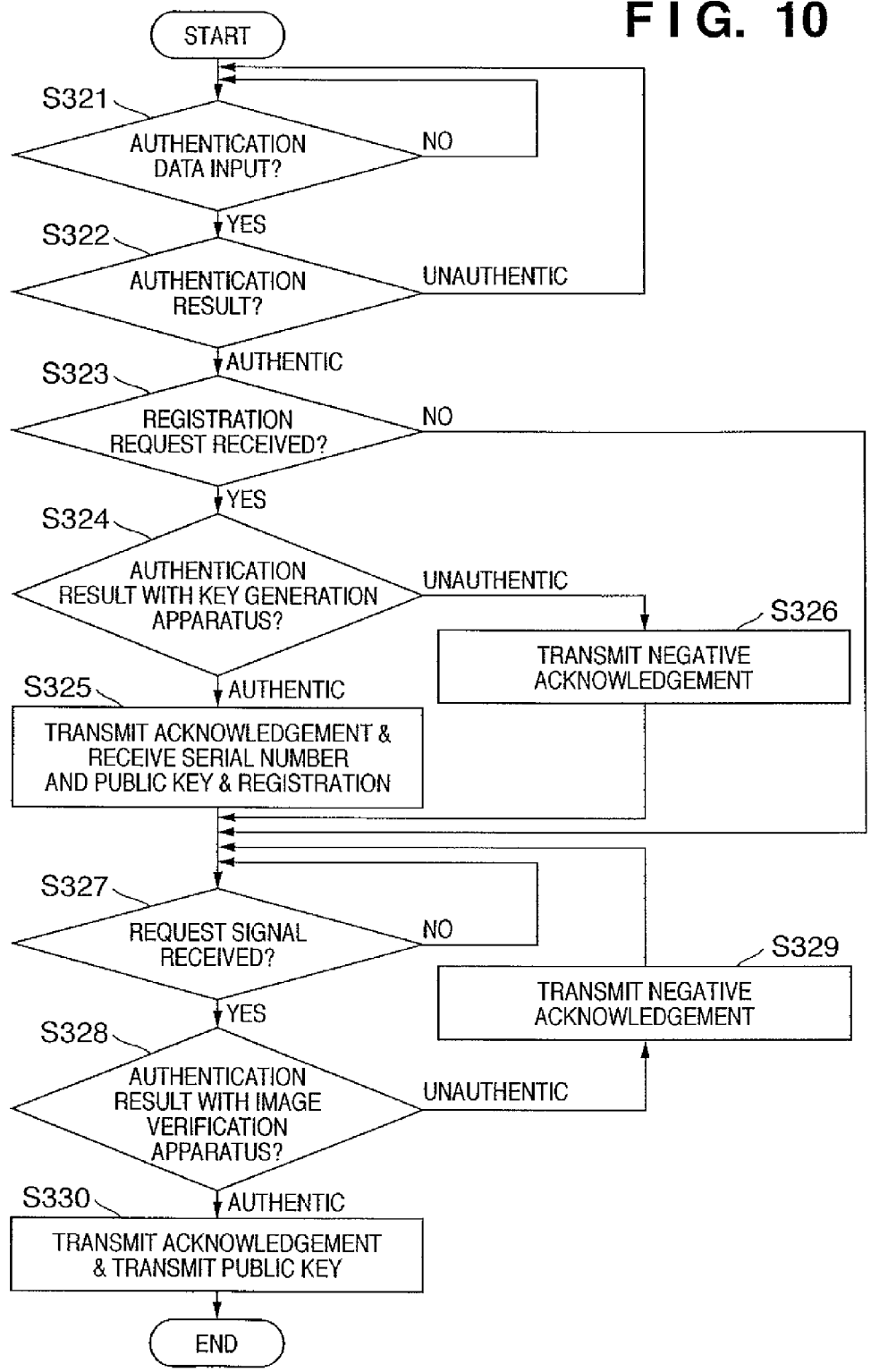
FIG. 10 is a flowchart for explaining the operation of the database apparatus according to the first embodiment of the present invention.

FIG. 10 shows as an example of the operation of the database apparatus 130 an operation of receiving and registering a public key from the key generation apparatus 140, and transmitting the public key to the image verification apparatus 120 in response to a request from the image verification apparatus 120.

Step S321:

The database apparatus 130 determines whether the user has input authentication data such as a password for authentication.

If authentication data is determined not to have been input, the database apparatus 130 waits for input of data; if authentication data is determined to have been input, advances to step S322.

Step S322:

If authentication data is determined in step S321 to have been input, the database apparatus 130 determines from the authentication data whether the user is authentic.

If the user is determined not to be authentic, the database apparatus 130 repetitively executes the process from step S321; if the user is determined to be authentic, advances to step S323.

Step S323:

If the user is determined in step S322 to be authentic, the database apparatus 130 determines whether it has received a public key registration request from the key generation apparatus 140.

If the public key registration request is determined to have been received, the database apparatus 130 advances to step S324; if the public key registration request is determined not to have been received, directly to step S327 without executing processes in steps S324 to S326.

Step S324:

If the public key registration request is determined in step S323 to have been received, the database apparatus 130 performs authentication using the public key registration request, and determines from the authentication result whether the key generation apparatus 140 which has transmitted the public key registration request is authentic.

If the key generation apparatus 140 is determined to be authentic, the database apparatus 130 advances to step S327 via step S325; if the key generation apparatus 140 is determined not to be authentic, to step S327 via step S326.

Step S325:

If the key generation apparatus 140 is determined in step S324 to be authentic, the database apparatus 130 transmits acknowledgement to the key generation apparatus 140. Also, the database apparatus 130 receives a serial number and corresponding public key from the key generation apparatus 140, and stores (registers) them in the save memory 54. The database apparatus 130 then advances to step S327.

Step S326:

If the key generation apparatus 140 is determined in step S324 not to be authentic, the database apparatus 130 transmits negative acknowledgement to the key generation apparatus 140. The database apparatus 130 then advances to step S327.

Step S327:

After the process in step S325 or S326, the database apparatus 130 determines whether it has received request information (request signal) from the image verification apparatus 120.

If the request signal is determined not to have been received, the database apparatus 130 waits for reception of a request signal; if the request signal is determined to have been received, advances to step S328.

Step S328:

If a request signal is determined in step S327 to have been received, the database apparatus 130 performs authentication using the request signal, and determines from the authentication result whether the image verification apparatus 120 which has transmitted the request signal is authentic.

If the image verification apparatus 120 is determined to be authentic, the database apparatus 130 advances to step S330; if the image verification apparatus 120 is determined not to be authentic, to step S327 via step S329.

Step S330:

If the image verification apparatus 120 is determined in step S328 to be authentic, the database apparatus 130 transmits acknowledgement to the image verification apparatus 120, and transmits the requested public key to the image verification apparatus 120. The process then ends.

Step S329:

If the image verification apparatus 120 is determined in step S328 not to be authentic, the database apparatus 130 transmits negative acknowledgement to the image verification apparatus 120. The database apparatus 130 then returns to step S327 to repetitively execute the subsequent processing steps.

<Operation of Key Generation Apparatus 140>

Figure 11:
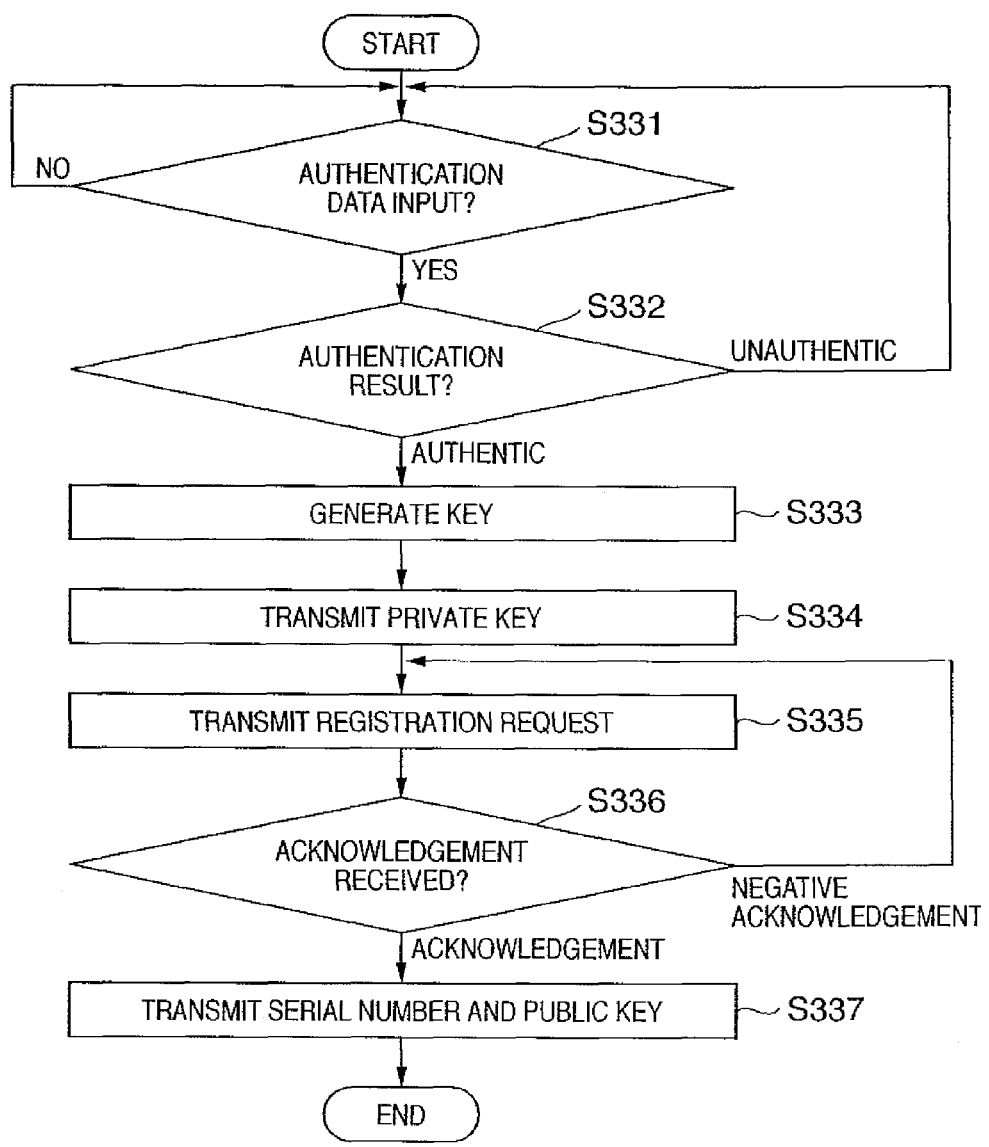
FIG. 11 is a flowchart for explaining the operation of the key generation apparatus according to the first embodiment of the present invention.

FIG. 11 shows as an example of the operation of the key generation apparatus 140 an operation of generating a public key and private key, transmitting the private key to the image input apparatus 110, and transmitting the public key to the database apparatus 130.

Step S331:

The key generation apparatus 140 determines whether the user has input authentication data such as a password for authentication.

If authentication data is determined not to have been input, the key generation apparatus 140 waits for input of data; if authentication data is determined to have been input, advances to step S332.

Step 332:

If authentication data is determined in step S331 to have been input, the key generation apparatus 140 determines from the authentication data whether the user is authentic.

If the user is determined not to be authentic, the key generation apparatus 140 repetitively executes the process from step S331; if the user is determined to be authentic, advances to step S333.

Step S333:

If the user is determined in step S332 to be authentic, the key generation apparatus 140 generates a private key and public key, and associates them with the serial number of the image input apparatus 110 which uses the private key. The generated private key is transmitted to the image input apparatus 110, whereas the public key is registered in the database apparatus 130 and finally used by the image verification apparatus 120 for verification of digital signature data generated using the private key.

For example, when RSA is employed as public key cryptography, the key generation apparatus 140 generates a private key and public key as follows.

Two arbitrary different large prime numbers p and q are generated, and their product n (=p·q) is calculated. A least common multiple L of (p−1) and (q−1) is calculated, and an arbitrary integer e which is prime to the least common multiple L and smaller than it is generated. An integer d which satisfies $$ed = 1 \pmod{L}$$

is calculated. The public key is set to (e,n), and the private key is set to (d,n).

In this case, public key cryptography is RSA, but is not limited to this, and can adopt an arbitrary method.

Step S334:

The key generation apparatus 140 transmits the private key generated in step S333 to the image input apparatus 110 having a serial number corresponding to the private key.

Step S335:

The key generation apparatus 140 transmits a registration request to the database apparatus 130 in order to register the public key generated in step S333 in the database apparatus 130.

Step S336:

The key generation apparatus 140 determines whether the response from the database apparatus 130 to the registration request transmitted in step S335 is acknowledgement or negative acknowledgement.

If the response is determined to be negative acknowledgement, the key generation apparatus 140 repetitively executes the process from step S335; if the response is determined to be acknowledgement, advances to step S337.

Step S337:

If the response is determined in step S336 to be acknowledgement, the key generation apparatus 140 transmits the public key and serial number generated in step S333 to the database apparatus 130. The process then ends.

In the first embodiment, the key generation apparatus 140 is arranged as an independent apparatus. However, the present invention is not limited to this, and the function of the key generation apparatus 140 may be provided to, e.g., the image input apparatus 110 or database apparatus 130. Also, for example, the functions of the image verification apparatus 120, database apparatus 130, and key generation apparatus 140 may be provided to one apparatus.

The manufacturer of the image input apparatus 110 may perform the key information generation process, and registration of the generated key information in the database apparatus 130, and manage the database apparatus 130. This guarantees the reliability of the public key.

Second Embodiment

In the first embodiment, the image verification system 100 in FIG. 1 generates digital signature data by public key cryptography.

In the second embodiment, an image verification system 100 in FIG. 1 generates digital signature data without using public key cryptography.

In the second embodiment, for example, image data undergoes a high-speed arithmetic process such as exclusive-OR calculation with private key, and then an arithmetic process using a hash function. The resultant output is used as digital signature data. This configuration can eliminate arithmetic processes such as residue calculation and power calculation, and implement a higher-speed process in comparison with the use of public key cryptography. The image verification system 100 according to the second embodiment will be explained in detail.

Only a configuration and operation different from those in the first embodiment will be explained in detail.

<Overall Operation of Image Verification System 100>

The operation of the image verification system 100 according to the second embodiment will be explained with reference to FIG. 12 by exemplifying an operation when an exclusive-OR arithmetic process with private key is executed for image data without using public key cryptography in generating digital signature data, then an arithmetic process using a hash function is executed, and the resultant output is set as digital signature data.

Step S401:

A key generation apparatus 140 generates private key used to generate and verify digital signature data. At this time, when digital signature data are generated using different pieces of private key for respective image input apparatuses, pieces of generated private key and pieces of information (in this case, the serial numbers of image input apparatuses 110, similar to the first embodiment) unique to the image input apparatuses 110 which use these pieces of private key are made to correspond to each other, as shown in FIG. 13. The user who is to perform this operation cannot execute this operation until he is confirmed to be authentic as a result of authentication with the key generation apparatus 140 by using a password or the like.

Step S402:

The image input apparatus 110 receives the private key from the key generation apparatus 140, and stores it in a ROM 37.

As described above, since private key is stored in correspondence with the serial number of the image input apparatus 110, private key data "0x987654321" corresponding to a serial number "0001" is transmitted to an image input apparatus having the serial number "0001", and stored.

If the key generation apparatus 140 is authenticated, a database apparatus 130 registers the serial number and private key from the key generation apparatus 140.

In the example shown in FIG. 13, the private key "0x987654321" corresponding to the serial number "0001" is managed in association with the serial number "0001". In this case, the user (registrant) cannot execute private key registration operation and the like until he performs authentication with the database apparatus 130 by using a password or the like and is confirmed to be authentic.

Step S403:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S404:

The image input apparatus 110 performs exclusive-OR calculation between the image data having undergone the image compression process in step S403 and the private key acquired in step S402. The image input apparatus 110 executes a compression process using a hash function for the result to generate a hash value (digest) and set it as digital signature data.

As the hash function, MD-5, SHA-1, and the like are available. The hash value is represented by 128 bits when MD-5 is applied, and 160 bits when SHA-1 is applied.

Step S405:

The image input apparatus 110 inserts the digital signature data generated in step S404 together with the serial number into the header of the image data formatted to the file in step S403 (see FIG. 7).

Step S406:

The image input apparatus 110 uses an interface 36 to convert the image data to which the digital signature data has been inserted in step S405 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S407:

The user who is to verify the image data sent from the image input apparatus 110 by an image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the serial number of the image input apparatus 110 serving as information for acquiring private key used to generate the digital signature data.

The image verification apparatus 120 extracts the serial number from the serial number area of the header. By using the serial number, the image verification apparatus 120 generates request information for requesting private key necessary for verification of the database apparatus 130, and transmits the request information to the database apparatus 130.

Step S408:

The database apparatus 130 receives the request information from the image verification apparatus 120, and determines from the request information in the above-described manner whether the image verification apparatus 120 is authentic.

Only when the database apparatus 130 determines as a result of authentication that the image verification apparatus 120 is authentic, the database apparatus 130 searches for private key which is stored in a save memory 54 and corresponds to the serial number contained in the received request information, and transmits the found private key to the image verification apparatus 120.

Step S409:

The image verification apparatus 120 receives the private key from the database apparatus 130, and extracts the digital signature data from the digital signature area of the header of the image data received from the image input apparatus 110 in step S406.

The image verification apparatus 120 deletes the header containing the digital signature data from the image data, and generates digital signature data by using the private key for the resultant image data, i.e., data formed from only the image data.

The image verification apparatus 120 compares the generated digital signature data and the digital signature data extracted from the image data. If these digital signature data coincide with each other, the image verification apparatus 120 determines that the image data has not been altered; if they do not coincide with each other, determines that the image data has been altered, and outputs the determination result.

<Operation of Image Input Apparatus 110>

Figure 14:
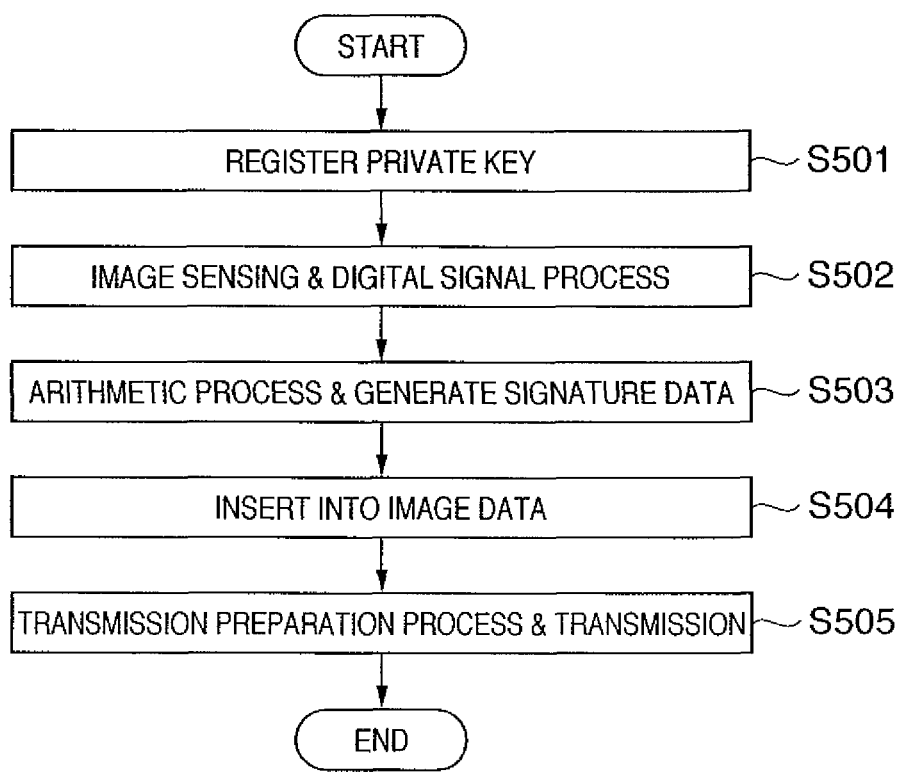
FIG. 14 is a flowchart for explaining the operation of an image input apparatus in the image verification system according to the second embodiment of the present invention.

FIG. 14 shows as an example of the operation of the image input apparatus 110 an operation of receiving and registering private key, generating digital signature data by using the private key for sensed image data, and inserting the digital signature data into the image data.

Step S501:

The image input apparatus 110 receives private key from the key generation apparatus 140, and stores (registers) the received private key in the ROM 37.

Step S502:

The image input apparatus 110 senses an object, executes an image compression process for the sensed image (image information) of the object subsequently to an electrical signal process, digital signal process, and the like, and formats the image to a file.

Step S503:

The image input apparatus 110 generates digital signature data by using the image data having undergone the image compression process in step S502 and the private key acquired in step S501.

Step S504:

The image input apparatus 110 inserts the digital signature data generated in step S503 together with the serial number into the header of the image data formatted to the file in step S502.

Step S505:

The image input apparatus 110 performs a transmission preparation process for the image data to which the digital signature data has been inserted in step S504, and transmits the processed image data to the image verification apparatus 120.

The process then ends.

The transmission preparation process in step S505 is, e.g., a process of converting target data into data corresponding to the network protocol when the image input apparatus 110 and image verification apparatus 120 are connected via a network. The transmission preparation process also includes a process of recording target data on a storage medium when the image input apparatus 110 and image verification apparatus 120 are not connected via a network or the like and exchange data via a storage medium such as a memory card.

<Operation of Image Verification Apparatus 120>

Figure 15:
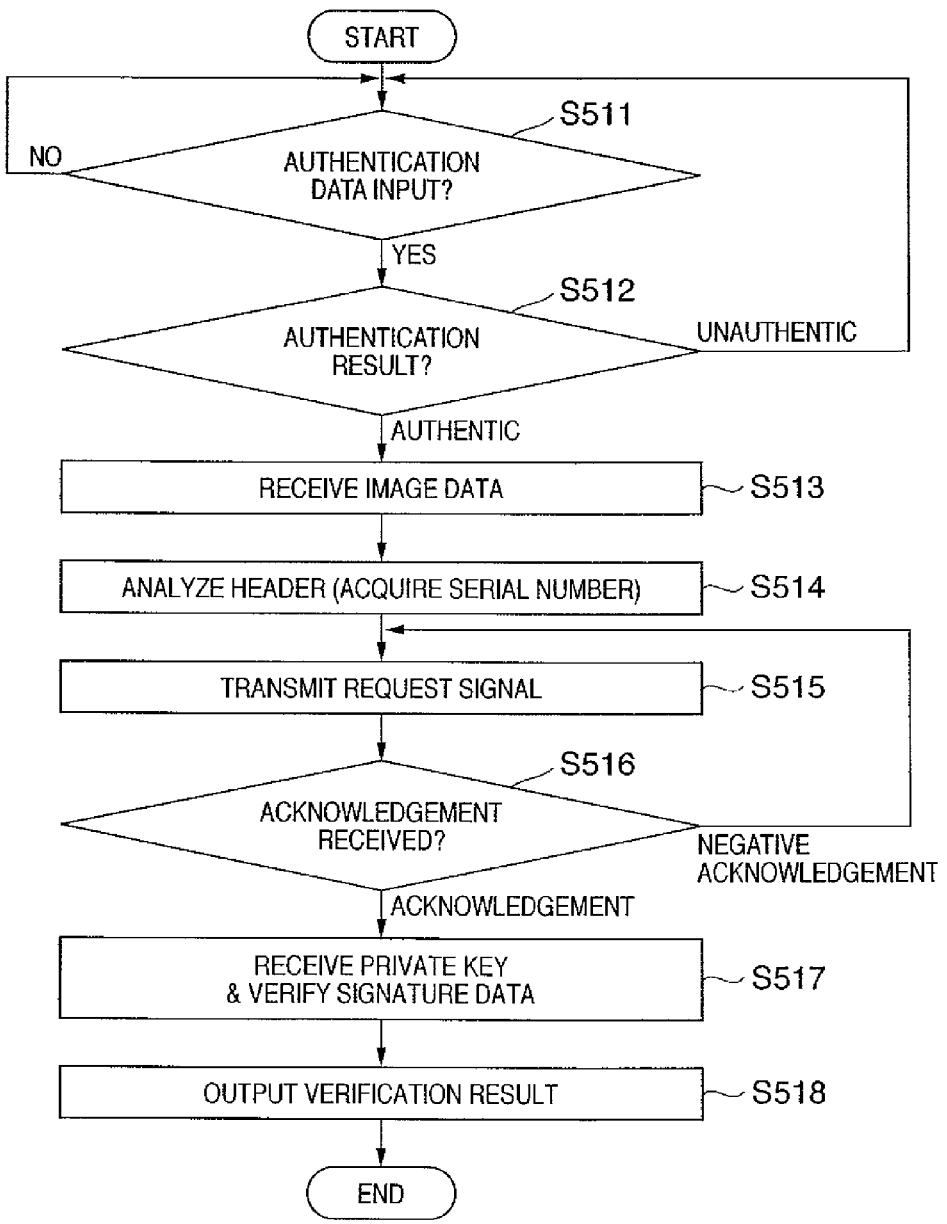
FIG. 15 is a flowchart for explaining the operation of an image verification apparatus in the image verification system according to the second embodiment of the present invention.

FIG. 15 shows as an example of the operation of the image verification apparatus 120 an operation of receiving image data containing digital signature data, receiving private key used to verify the image data, and verifying the image data by using the private key.

Step S511:

The image verification apparatus 120 determines whether the user has input authentication data such as a password for authentication.

If authentication data is determined not to have been input, the image verification apparatus 120 waits for input of data; if authentication data is determined to have been input, advances to step S512.

Step S512:

If authentication data is determined in step S511 to have been input, the image verification apparatus 120 determines from the authentication data whether the user is an authentic user (verifier).

If the user is determined not to be authentic, the image verification apparatus 120 repetitively executes the process from step S511; if the user is determined to be authentic, advances to step S513.

Step S513:

If the user is determined in step S512 to be authentic, the image verification apparatus 120 receives image data containing digital signature data from the image input apparatus 110.

For example, when the image input apparatus 110 and image verification apparatus 120 are connected via a network, the image verification apparatus 120 receives image data via the network. When the image input apparatus 110 and image verification apparatus 120 are not connected via a network or the like and exchange data via a storage medium such as a memory card, the image verification apparatus 120 reads out image data from the storage medium.

Step S514:

The image verification apparatus 120 analyzes the header of the image data which is acquired in step S513 and contains the digital signature data, and acquires data (in this case, the serial number of the image input apparatus 110) necessary to acquire the private key used to generate the digital signature data from the database apparatus 130.

Step S515:

By using the serial number acquired in step S514, the image verification apparatus 120 generates request information for requesting the private key of the database apparatus 130, and transmits the request information to the database apparatus 130.

Step S516:

The image verification apparatus 120 determines whether the response from the database apparatus 130 to the request information transmitted in step S515 is acknowledgement or negative acknowledgement.

If the response is determined to be negative acknowledgement, the image verification apparatus 120 repetitively executes the process from step S515; if the response is determined to be acknowledgement, advances to step S517.

Step S517:

If it is determined in step S516 that the database apparatus 130 has transmitted acknowledgement, the image verification apparatus 120 receives private key from the database apparatus 130, and verifies the digital signature data inserted in the header of the image data received in step S513 by using the private key.

Step S518:

The image verification apparatus 120 outputs the verification result of step S517.

The process then ends.

<Operation of Database Apparatus 130>

Figure 16:
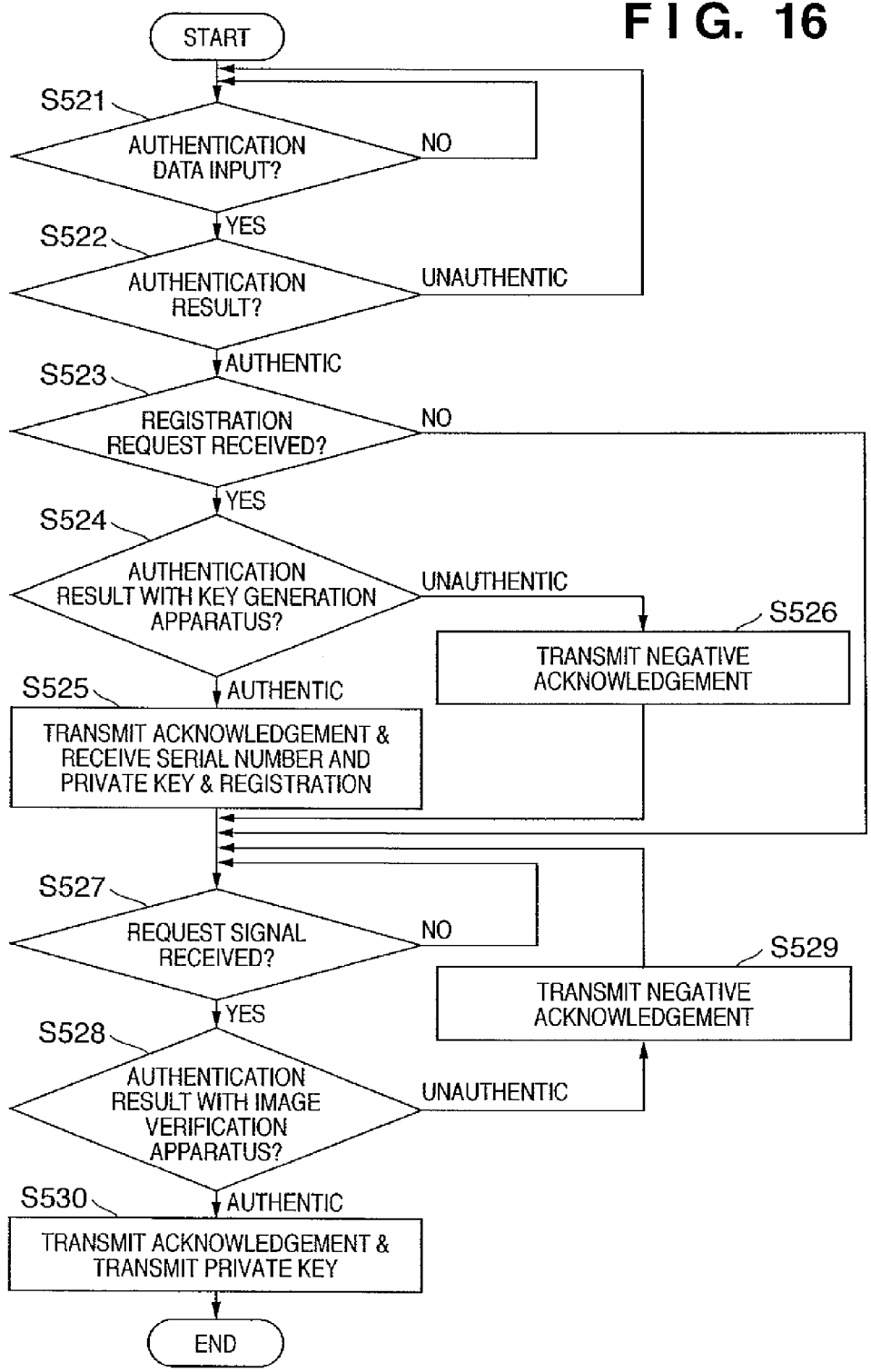
FIG. 16 is a flowchart for explaining the operation of a database apparatus in the image verification system according to the second embodiment of the present invention.

FIG. 16 shows as an example of the operation of the database apparatus 130 an operation of receiving and registering private key from the key generation apparatus 140, and transmitting the private key to the image verification apparatus 120 in response to a request from the image verification apparatus 120.

Step S521:

The database apparatus 130 determines whether the user has input authentication data such as a password for authentication.

If authentication data is determined not to have been input, the database apparatus 130 waits for input of data; if authentication data is determined to have been input, advances to step S522.

Step S522:

If authentication data is determined in step S521 to have been input, the database apparatus 130 determines from the authentication data whether the user is authentic.

If the user is determined not to be authentic, the database apparatus 130 repetitively executes the process from step S521; if the user is determined to be authentic, advances to step S523.

Step S523:

If the user is determined in step S522 to be authentic, the database apparatus 130 determines whether it has received a private key registration request from the key generation apparatus 140.

If the private key registration request is determined to have been received, the database apparatus 130 advances to step S524; If the private key registration request is determined not to have been received, directly to step S527 without executing processes in steps S524 to S526.

Step S524:

If the private key registration request is determined in step S523 to have been received, the database apparatus 130 performs authentication using the private key registration request, and determines from the authentication result whether the key generation apparatus 140 which has transmitted the private key registration request is authentic.

If the key generation apparatus 140 is determined to be authentic, the database apparatus 130 advances to step S527 via step S525; if the key generation apparatus 140 is determined not to be authentic, to step S527 via step S526.

Step S525:

If the key generation apparatus 140 is determined in step S524 to be authentic, the database apparatus 130 transmits acknowledgement to the key generation apparatus 140. Also, the database apparatus 130 receives a serial number and corresponding private key from the key generation apparatus 140, and stores (registers) them in the save memory 54. The database apparatus 130 then advances to step S527.

Step S526:

If the key generation apparatus 140 is determined in step S524 not to be authentic, the database apparatus 130 transmits negative acknowledgement to the key generation apparatus 140. The database apparatus 130 then advances to step S527.

Step S527:

After the process in step S525 or S526, the database apparatus 130 determines whether it has received request information (request signal) from the image verification apparatus 120.

If the request signal is determined not to have been received, the database apparatus 130 waits for reception of a request signal; if the request signal is determined to have been received, advances to step S528.

Step S528:

If a request signal is determined in step S527 to have been received, the database apparatus 130 performs authentication using the request signal, and determines from the authentication result whether the image verification apparatus 120 which has transmitted the request signal is authentic.

If the image verification apparatus 120 is determined to be authentic, the database apparatus 130 advances to step S530;

if the image verification apparatus 120 is determined not to be authentic, to step S527 via step S529.

Step S530:

If the image verification apparatus 120 is determined in step S528 to be authentic, the database apparatus 130 transmits acknowledgement to the image verification apparatus 120, and transmits the requested private key to the image verification apparatus 120. The process then ends.

Step S529;

If the image verification apparatus 120 is determined in step S528 not to be authentic, the database apparatus 130 transmits negative acknowledgement to the image verification apparatus 120. The database apparatus 130 then returns to step S527 to repetitively execute the subsequent processing steps.

<Operation of Key Generation Apparatus 140>

Figure 17:
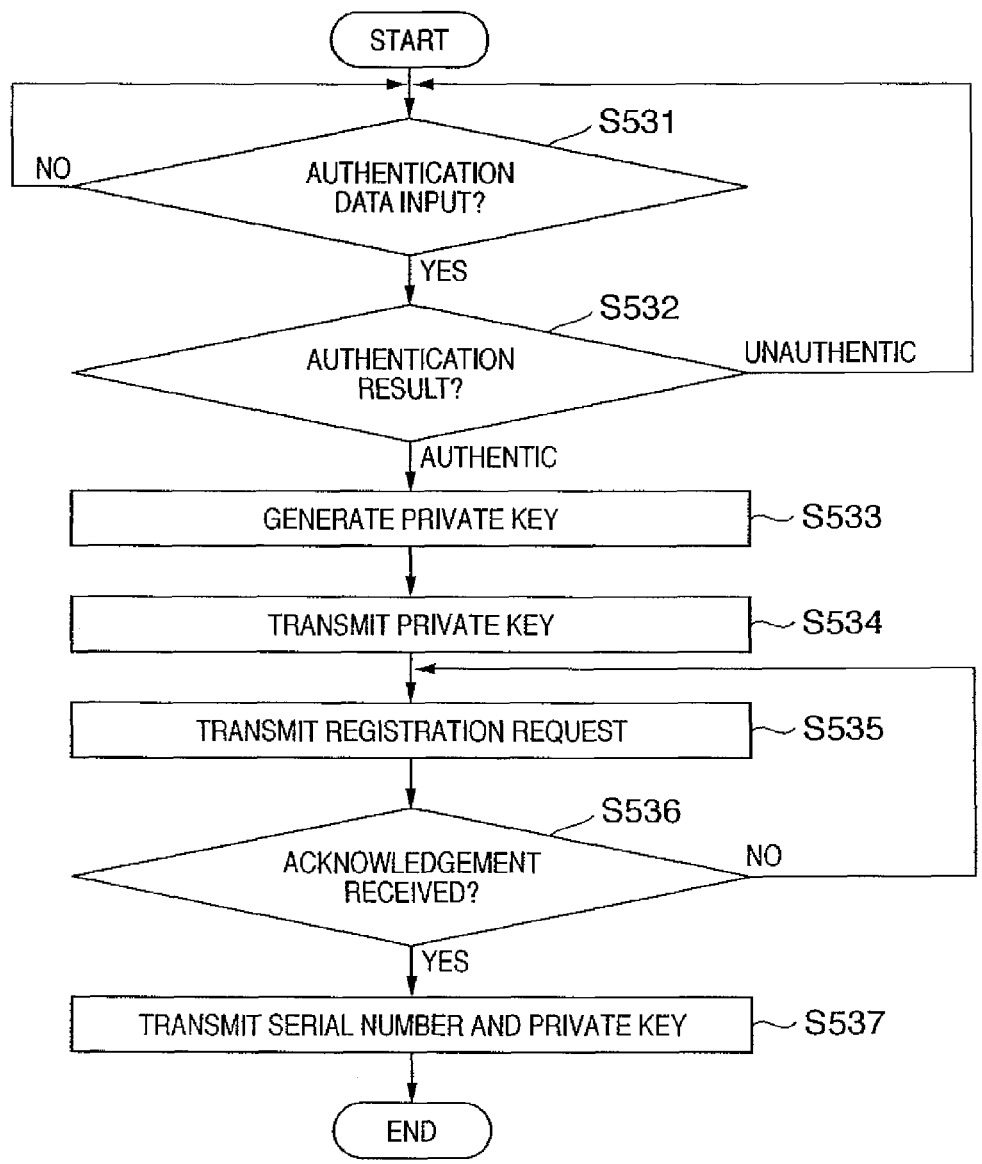
FIG. 17 is a flowchart for explaining the operation of the key generation apparatus according to the second embodiment of the present invention.

FIG. 17 shows as an example of the operation of the key generation apparatus 140 an operation of generating private key, and transmitting it to the image input apparatus 110 and database apparatus 130.

Step S531:

The key generation apparatus 140 determines whether the user has input authentication data such as a password for authentication.

If authentication data is determined not to have been input, the key generation apparatus 140 waits for input of data; if authentication data is determined to have been input, advances to step S532.

Step S532:

If authentication data is determined in step S531 to have been input, the key generation apparatus 140 determines from the authentication data whether the user is authentic.

If the user is determined not to be authentic, the key generation apparatus 140 repetitively executes the process from step S531; if the user is determined to be authentic, advances to step S533.

Step S533:

If the user is determined in step S532 to be authentic, the key generation apparatus 140 generates private key, and associates it with the serial number of the image input apparatus 110 which uses the private key. The generated private key is registered in the image input apparatus 110 and database apparatus 130, and finally used by the image verification apparatus 120 for verification of digital signature data.

For example, a random number is generated and used as private key. A generation means (random number generation algorithm) for generating a random number cannot employ a generation method which allows predicting the next random number from a random number generated in the past. In addition, whether private key to be newly generated coincides with private key generated in the past must be checked not to generate the same private key.

As the private key generation method, the random number generation method is adopted. However, the method is not limited to this and can be arbitrarily selected as far as the method can generate data with which private key generated in the past and private key to be generated next are not associated or correlated with each other and private key to be generated next cannot be predicted from private key generated in the past.

Step S534:

The key generation apparatus 140 transmits the private key generated in step S533 to the image input apparatus 110 having a serial number corresponding to the private key.

Step S535:

The key generation apparatus 140 transmits a registration request to the database apparatus 130 in order to register the private key generated in step S533 in the database apparatus 130.

Step S536:

The key generation apparatus 140 determines whether the response from the database apparatus 130 to the registration request transmitted in step S535 is acknowledgement or negative acknowledgement.

If the response is determined to be negative acknowledgement, the key generation apparatus 140 repetitively executes the process from step S535; if the response is determined to be acknowledgement, advances to step S537.

Step S537:

If the response is determined in step S536 to be acknowledgement, the key generation apparatus 140 transmits the private key and serial number generated in step S533 to the database apparatus 130. The process then ends.

Third Embodiment

In the second embodiment, the image verification system 100 in FIG. 1 adopts a method of "executing a high-speed arithmetic process called exclusive-OR calculation with private key for image data, executing an arithmetic process using a hash function, and setting the resultant output as digital signature data", as a method of generating digital signature data without using public key cryptography. In the third embodiment, an image verification system 100 in FIG. 1 generates digital signature data by a method of "executing an arithmetic process using a keyed hash function for image data and setting the resultant output as digital signature data". Similar to the second embodiment, the third embodiment need not perform arithmetic processes such as residue calculation and power calculation, and achieve a higher-speed process in comparison with the use of public key cryptography. The image verification system 100 according to the third embodiment will be explained in detail.

Only a configuration and operation different from those in the first and second embodiments will be explained in detail.

Figure 12:
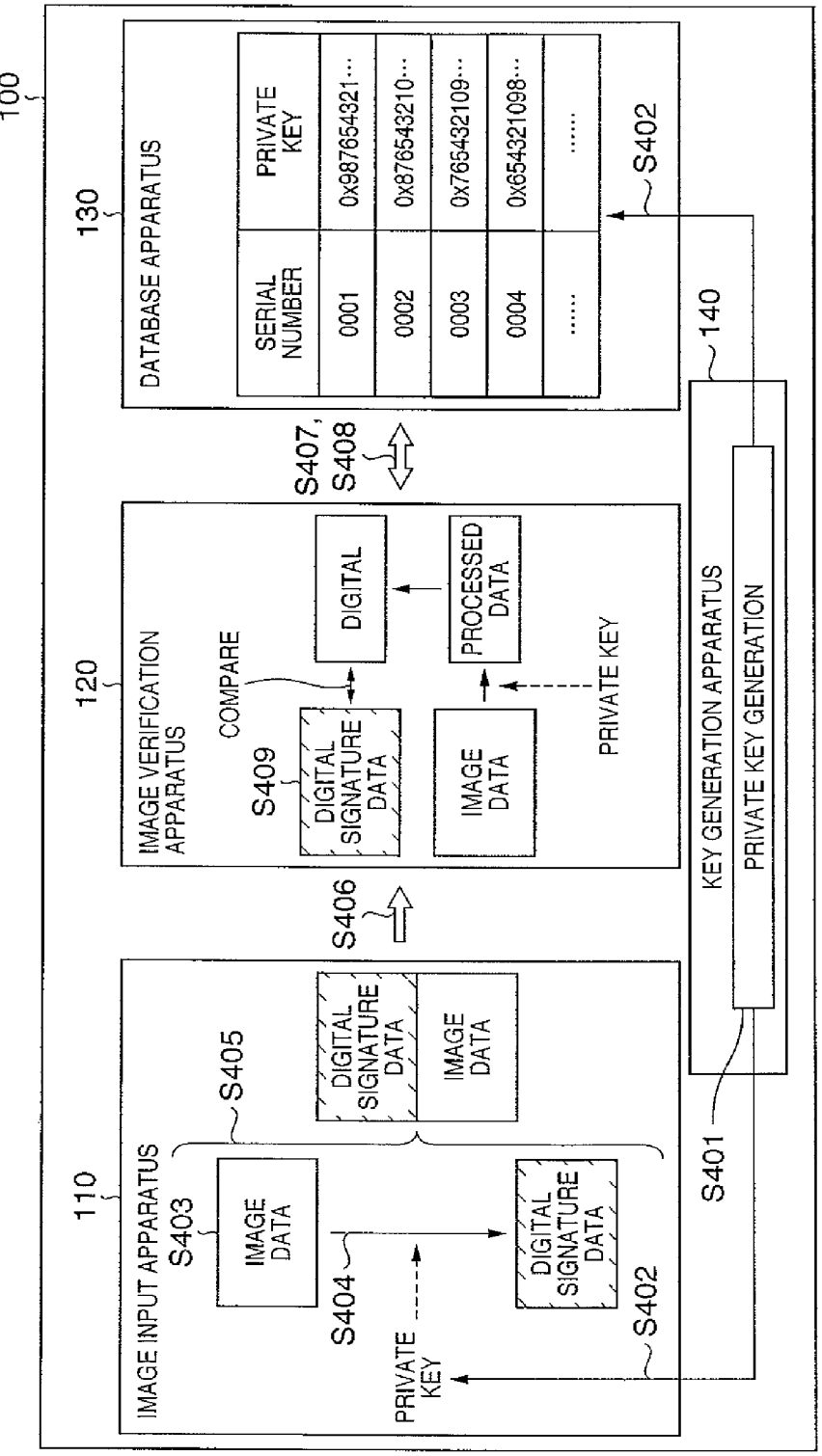
FIG. 12 is a block diagram showing the configuration of an image verification system to which the present invention is applied, and schematic processing procedures executed within and between apparatuses which form the image verification system according to the second embodiment of the present invention.

The outline of the overall operation of the image verification system 100 according to the third embodiment is illustrated in FIG. 12. The overall operation of the image verification system 100 (operation in an application of a method of executing an arithmetic process using a keyed hash function for image data, and setting the resultant output as digital signature data) will be explained with reference to FIG. 12.

<Overall Operation of Image Verification System 100>

Step S401:

A key generation apparatus 140 generates private key used to generate and verify digital signature data. At this time, when digital signature data are generated using different pieces of private key for respective image input apparatuses, pieces of generated private key and pieces of information (in this case, the serial numbers of image input apparatuses 110, similar to the first embodiment) unique to the image input apparatuses 110 which use these pieces of private key are made to correspond to each other, as shown in FIG. 13. The user who is to perform this operation cannot execute this operation until he is confirmed to be authentic as a result of authentication with the key generation apparatus 140 by using a password or the like.

Step S402:

The image input apparatus 110 receives the private key from the key generation apparatus 140, and stores it in a ROM 37.

As described above, since private key is stored in correspondence with the serial number of the image input apparatus 110, private key data "0x987654321" corresponding to a serial number "0001" is transmitted to an image input apparatus having the serial number "0001", and stored.

If the key generation apparatus 140 is authenticated, a database apparatus 130 registers the serial number and private key from the key generation apparatus 140.

In the example shown in FIG. 13, the private key "0x987654321" corresponding to the serial number "0001" is managed in association with the serial number "0001". In this case, the user (registrant) cannot execute private key registration operation and the like until he performs authentication with the database apparatus 130 by using a password or the like and is confirmed to be authentic.

Step S403:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S404:

The image input apparatus 110 performs an arithmetic process by a keyed hash function using private key for the image data having undergone the image compression process in step S403, and sets the result as digital signature data.

According to the keyed hash function, the transmitting and receiving sides share a common key (in this case, private key), and the transmitting side generates message verification data by using the key for message data (in this case, image data). The message verification data is attached to the message data (image data) and transmitted. The receiving side executes the same process (process using the keyed hash function) as that on the transmitting side for the received message data. When message verification data generated from the shared key and message data coincides with the received verification data, the receiving side determines that the message data has not been altered.

Figure 18:
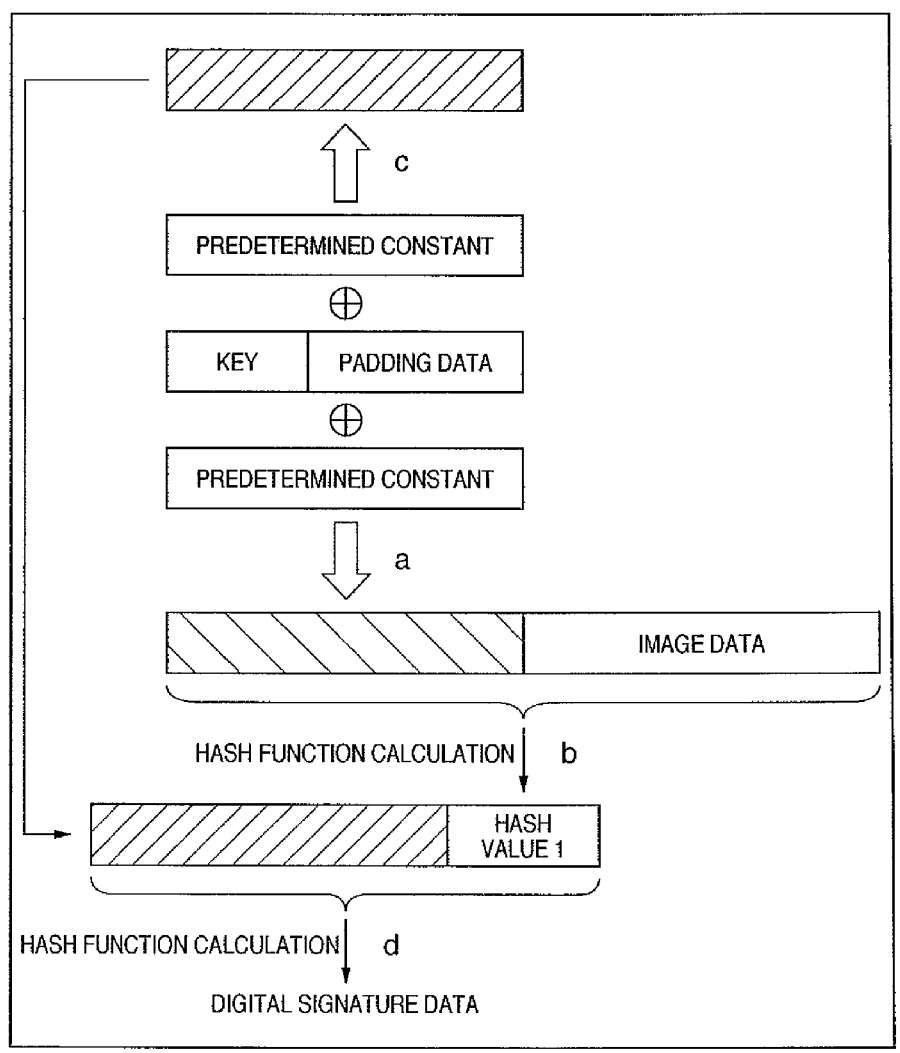
FIG. 18 is a view for explaining a digital signature data generation process according to the third embodiment of the present invention.

The digital signature data generation process using the keyed hash function is represented by processes (a) to (d) as shown in FIG. 18.

Process (a):

Private key (key) is padded, and an exclusive-OR arithmetic process is executed between the padded private key and a predetermined constant laid open to the public.

Process (b):

The resultant data of the exclusive-OR arithmetic process in process (a) and image data are concatenated. The concatenated data undergoes a compression process using a hash function, and resultant hash value 1 (digest 1) is output.

Process (c):

An exclusive-OR arithmetic process is executed between the private key padded in process (a) and a predetermined constant laid open to the public that is different from the constant used in the exclusive-OR arithmetic process in process (a).

Process (d):

The resultant data of the exclusive-OR arithmetic process in process (c) and hash value 1 (digest 1) in process (b) are concatenated. The concatenated data undergoes a compression process using a hash function, and resultant hash value 2 (digest 2) is output as digital signature data. The digital signature data is safe unless private key externally leaks, as described above.

The hash value is represented by 128 bits when MD-5 is used as the hash function, and 160 bits when SHA-1 is used.

Step S405:

The image input apparatus 110 inserts the digital signature data generated in step S404 together with the serial number into the header of the image data formatted to the file in step S403 (see FIG. 7).

Step S406:

The image input apparatus 110 uses an interface 36 to convert the image data to which the digital signature data has been inserted in step S405 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S407:

The user who is to verify the image data sent from the image input apparatus 110 by an image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the serial number of the image input apparatus 110 serving as information for acquiring private key used to generate the digital signature data.

The image verification apparatus 120 extracts the serial number from the serial number area of the header. By using the serial number, the image verification apparatus 120 generates request information for requesting private key necessary for verification of the database apparatus 130, and transmits the request information to the database apparatus 130.

Step S408:

The database apparatus 130 receives the request information from the image verification apparatus 120, and determines from the request information in the above-described manner whether the image verification apparatus 120 is authentic.

Only when the database apparatus 130 determines as a result of authentication that the image verification apparatus 120 is authentic, the database apparatus 130 searches for private key which is stored in a save memory 54 and corresponds to the serial number contained in the received request information, and transmits the found private key to the image verification apparatus 120.

Step S409:

The image verification apparatus 120 receives the private key from the database apparatus 130, and extracts the digital signature data from the digital signature area of the header of the image data received from the image input apparatus 110 in step S406.

The image verification apparatus 120 deletes the header containing the digital signature data from the image data, and generates digital signature data by performing a process using the keyed hash function for the resultant image data, i.e., data formed from only the image data.

The image verification apparatus 120 compares the generated digital signature data and the digital signature data extracted from the image data. If these digital signature data coincide with each other, the image verification apparatus 120 determines that the image data has not been altered; if they do not coincide with each other, determines that the image data has been altered, and outputs the determination result.

The third embodiment uses a keyed hash function to generate digital signature data. However, the present invention is not limited to this, and can employ an arbitrary method as far as data of a predetermined length can be obtained from image data and private key. For example, the following method is available as another digital signature data generation method.

Image data (input data) undergoes a process using an encryption function. At this time, private key is used as an encryption key. A specific part of the resultant data of the process is set as digital signature data.

Data for verifying the integrity of data (data has not been altered) is called MAC (Message Authentication Code), and generally used as data for detecting alteration. A standardization organization standardizes that DES (Data Encryption Standard) is used as the encryption function and the last 32 bits are used as the specific part.

In the second and third embodiments, the manufacturer of the image input apparatus 110 may perform the private key generation process, and registration of the image input apparatus 110 in the database apparatus 130, and manage the database apparatus 130. This guarantees the reliability of the private key.

In the first to third embodiments, key information and private key are made to correspond to the serial number of an image input apparatus which uses these pieces of information. However, the information is not limited to the serial number, and any information other than the serial number may be used as far as the information is unique information capable of specifying an image input apparatus.

Key information and private key are preferably different between respective image input apparatuses. In order to only verify alteration of an image acquired from an image input apparatus, a plurality of image input apparatuses can also use the same key information and private key. In this case, a public key and private key to be shared are managed in association with a plurality of serial numbers.

Fourth Embodiment

In the first embodiment, the image verification system 100 in FIG. 1 manages one public key and one private key for each image input apparatus by making the serial number of the image input apparatus 110 correspond to a private key used to generate digital signature data in public key cryptography and a public key used to verify digital signature data.

In the fourth embodiment, an image verification system 100 in FIG. 1 makes unique user information correspond to each public key and each private key for use. Compared to the first embodiment, the fourth embodiment can manage private keys or pieces of private key for respective image input apparatuses.

The image verification system 100 according to the fourth embodiment will be described in detail.

Figure 22:
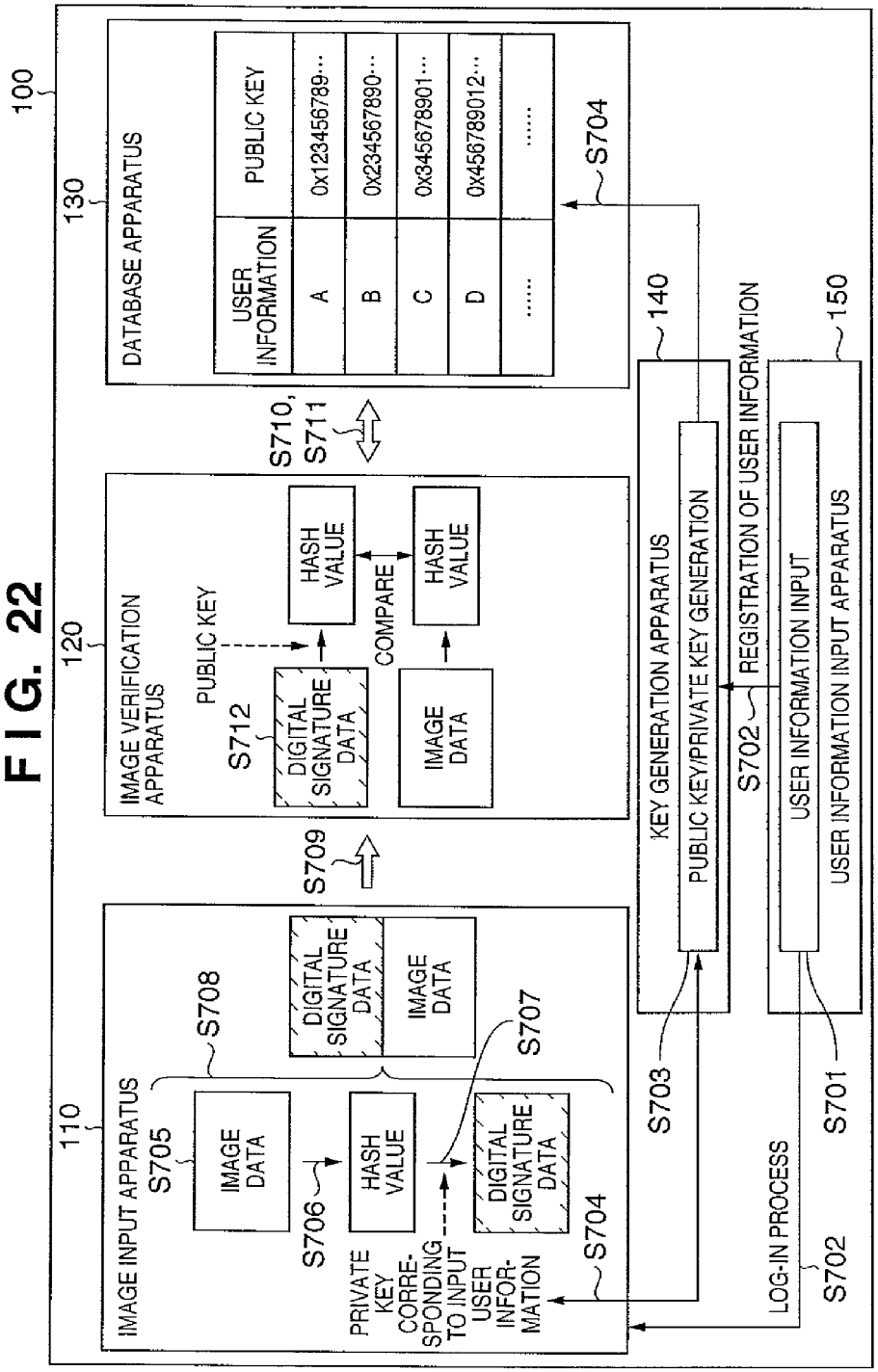
FIG. 22 is a block diagram showing the configuration of an image verification system to which the present invention is applied, and schematic processing procedures executed within and between apparatuses which form the image verification system according to the fourth embodiment of the present invention.

In the fourth embodiment, as shown in FIG. 22, the image verification system 100 comprises a user information input apparatus 150 in addition to the configuration shown in FIG. 1. The remaining configuration is the same as that shown in FIG. 1, and a description thereof will be omitted. Only a configuration and operation different from those in the first embodiment will be explained in detail.

<Configuration of User Information Input Apparatus 150>

Figure 23:
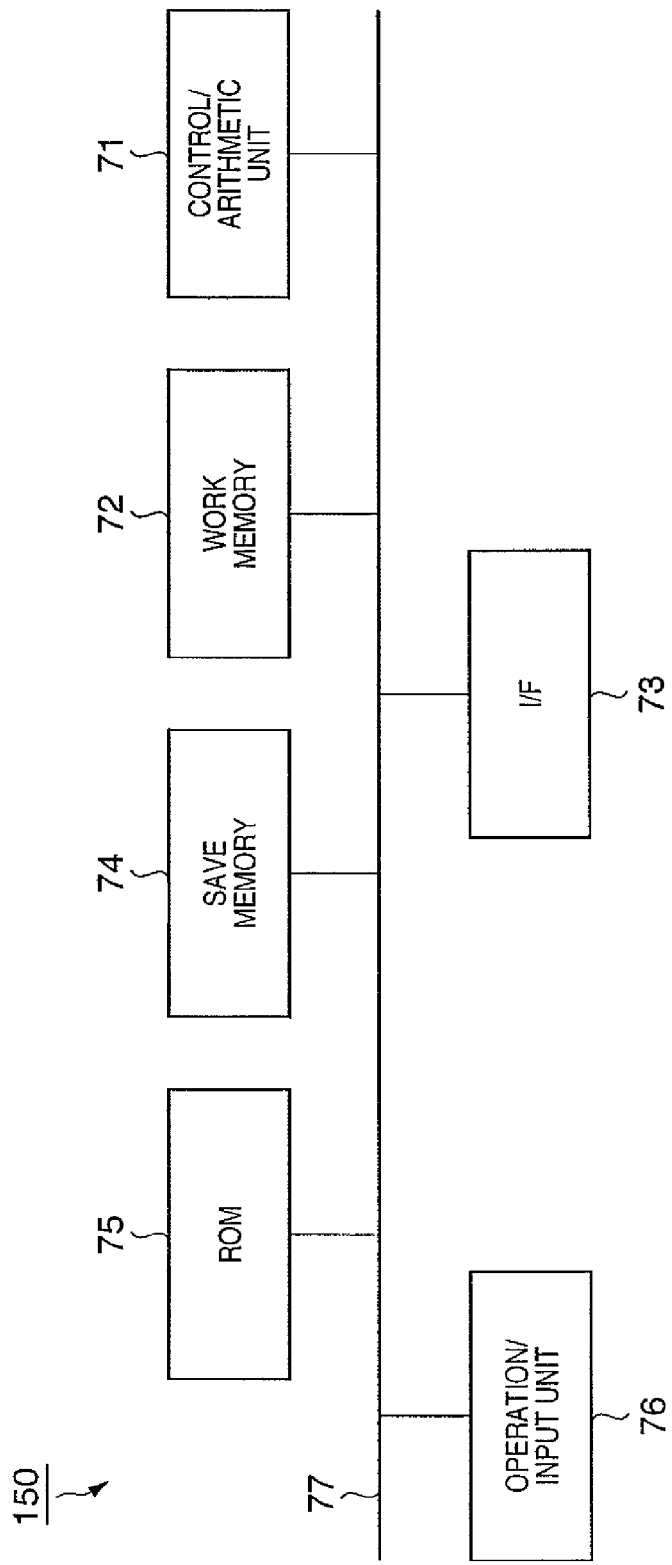
FIG. 23 is a block diagram showing the configuration of a user information input apparatus in the image verification system according to the fourth embodiment of the present invention.

For example, as shown in FIG. 23, the user information input apparatus 150 comprises a control/arithmetic unit 71, work memory 72, interface 73, save memory 74, ROM 75, and operation/input unit 76. These constituents 71 to 76 are connected via a bus 77 so as to be able to communicate with each other.

The control/arithmetic unit 71 is formed from a CPU and the like which control the overall operation of the user information input apparatus 150. For example, the control/arithmetic unit 71 reads out and executes a predetermined processing program stored in the ROM 75 in advance, and issues necessary control instructions to the constituents of the user information input apparatus 150.

For example, when the user inputs user information to the user information input apparatus 150 via the operation/input unit 76, the control/arithmetic unit 71 reads out and executes a predetermined processing program (user authentication program) stored in the ROM 75 in advance, and requests the user to input data (e.g., password) for authentication.

The authentication data input from the user is temporarily converted in the work memory 72. The control/arithmetic unit 71 executes an authentication process by using the work memory 72, and determines whether the process result is authentic. Only when the result is authentic, the control/arithmetic unit 71 accepts the user information, and temporarily stores it in the save memory 74.

The above-mentioned user authentication process, a generation request for private key and public key corresponding to the user information, a user information transmission process, and various arithmetic processes are done using the work memory 72.

The interface 73 interfaces external apparatuses such as an image input apparatus 110 and key generation apparatus 140, and transmits user information.

More specifically, the control/arithmetic unit 71 transmits a generation request for private key and public key corresponding to the user information to the key generation apparatus 140 via the interface 73. When the key generation apparatus 140 authorizes the registration request to be authentic, the control/arithmetic unit 71 reads out the user information from the save memory 74, and transmits the user information to the requesting source via the interface 73. At the same time, the control/arithmetic unit 71 performs a log-in process to the image input apparatus 110 via the interface 73 on the basis of the user information. The control/arithmetic unit 71 then erases the transmitted user information from the save memory.

The ROM 75 is a read only memory, and stores in advance processing programs (e.g., authentication program) and the like necessary to control the operation of the user information input apparatus 150.

The operation/input unit 76 accepts various instructions such as an authentication instruction from the user.

<Overall Operation of Image Verification System 100>

The operation of the image verification system 100 having the above configuration will be described with reference to FIG. 22 by exemplifying an operation when public key cryptography is used to generate digital signature data and unique user information is made to correspond to each public key and each private key for use.

Step S701:

The user information input apparatus 150 accepts and delivers user information unique to a public key and private key necessary to generate digital signature data, and executes log-in work. At this time, the user who is to perform this operation cannot execute this operation until he is confirmed to be authentic as a result of authentication with the user information input apparatus 150 by using a password or the like.

Step S702:

When the user information input apparatus 150 transmits the user information to the key generation apparatus 140, the key generation apparatus 140 stores the user information in a ROM 65.

When the user information input apparatus 150 transmits a log-in request for the user information to the image input apparatus 110, the image input apparatus 110 accepts log-in of the user information, and stores the user information in a ROM 37.

Step S703:

The key generation apparatus 140 generates a private key and public key necessary to generate digital signature data.

For example, when pieces of unique user information exist and digital signature data are generated using different private keys for these pieces of user information, the generated private keys and public keys, and the pieces of user information for managing them are made to correspond to each other, as shown in FIG. 24. In this case, the user cannot execute key information operation and the like until he performs authentication with the key generation apparatus 140 by using a password or the like and is confirmed to be authentic.

Authentication is also done between a database apparatus 130 and the key generation apparatus 140, and only when authentication is successful, the key generation apparatus 140 transmits the user information and public key to the database apparatus 130.

Step S704:

The image input apparatus 110 requests a corresponding private key of the key generation apparatus 140 by using the user information stored in the ROM 37 in step S702. If the key generation apparatus 140 transmits the private key corresponding to the user information to the image input apparatus 110, the image input apparatus 110 stores the private key in the ROM 37.

As described above, the key generation apparatus 140 stores a private key in correspondence with user information. In the example shown in FIG. 24, private key data "0x987654321" corresponding to user information "A" is transmitted to an image input apparatus having the user information "A" stored in the ROM 37, and stored.

If the key generation apparatus 140 transmits user information and a public key to the database apparatus 130, the database apparatus 130 registers them.

In the example shown in FIG. 24, public key data "0x123456789" corresponding to the user information "A" is managed in association with the user information "A". In this case, the user (registrant) cannot execute key information registration operation and the like until he performs authentication with the database apparatus 130 by using a password or the like and is confirmed to be authentic.

Step S705:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S706:

The image input apparatus 110 performs a compression process using a hash function for the image data having undergone the image compression process in step S705, generating a hash value (digest).

As the hash function, MD-5, SHA-1, and the like are available. The hash value is represented by 128 bits when MD-5 is applied, and 160 bits when SHA-1 is applied.

Step S707:

The image input apparatus 110 generates digital signature data by public key cryptography using the hash value generated in step S706 and the private key stored in the ROM 37.

As described above, the generated digital signature data is safe unless the private key externally leaks from the ROM 37.

Step S708:

The image input apparatus 110 inserts the digital signature data generated in step S707 together with the user information stored in the ROM 37 into the header of the image data formatted to the file in step S705.

Figure 25:
FIG. 25 is a view for explaining digital signature data generated by an image input apparatus in the image verification system according to the fourth embodiment of the present invention.

More specifically, when the image data is data formatted to a JFIF file, the image input apparatus 110 sets the digital signature data and user information at the header of image data as shown in FIG. 25.

In this case, the header of the image data is formed from an identifier area, length area, user information area, and digital signature area.

The identifier area describes an identifier (marker) representing that the image data is not data associated with playback and display of an image.

The length area describes by bytes a total of the data lengths of the length area, user information area, and digital signature area.

The user information area describes user information, as shown in FIG. 24.

The digital signature area describes digital signature data generated in step S707.

Since the header as shown in FIG. 25 becomes invalid in playing back or displaying image data, setting of various data at the header does not cause degradation of the image quality, a change in image, or the like.

Step S709:

The image input apparatus 110 uses an interface 36 to convert the image data to which the digital signature data has been inserted in step S708 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S710:

The user who is to verify the image data sent from the image input apparatus 110 by an image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the user information serving as information for acquiring a public key corresponding to a private key used to generate the digital signature data.

The image verification apparatus 120 extracts the user information from the user information area of the header. By using the user information, the image verification apparatus 120 generates request information for requesting a public key necessary for verification of the database apparatus 130, and transmits the request information to the database apparatus 130.

Step S711:

The database apparatus 130 receives the request information from the image verification apparatus 120, and determines from the request information in the above-described way whether the image verification apparatus 120 is authentic.

Only when the database apparatus 130 determines as a result of authentication that the image verification apparatus 120 is authentic, the database apparatus 130 searches for a public key which is stored in a save memory 54 and corresponds to the user information contained in the received request information, and transmits the found public key to the image verification apparatus 120.

Step S712:

The image verification apparatus 120 receives the public key from the database apparatus 130, extracts the digital signature data from the digital signature area of the header of the image data received from the image input apparatus 110 in step S709, and performs an arithmetic process using the public key for the digital signature data.

The image verification apparatus 120 deletes the header from the image data, and generates a hash value by executing a compression process using a hash function for the resultant image data, i.e., data formed from only the image data.

The image verification apparatus 120 compares the hash value and the result of the arithmetic process using the public key. If the hash value and result coincide with each other, the image verification apparatus 120 determines that the image data has not been altered; if they do not coincide with each other, determines that the image data has been altered, and outputs the determination result.

<Operation of Image Input Apparatus 110>

Figure 26:
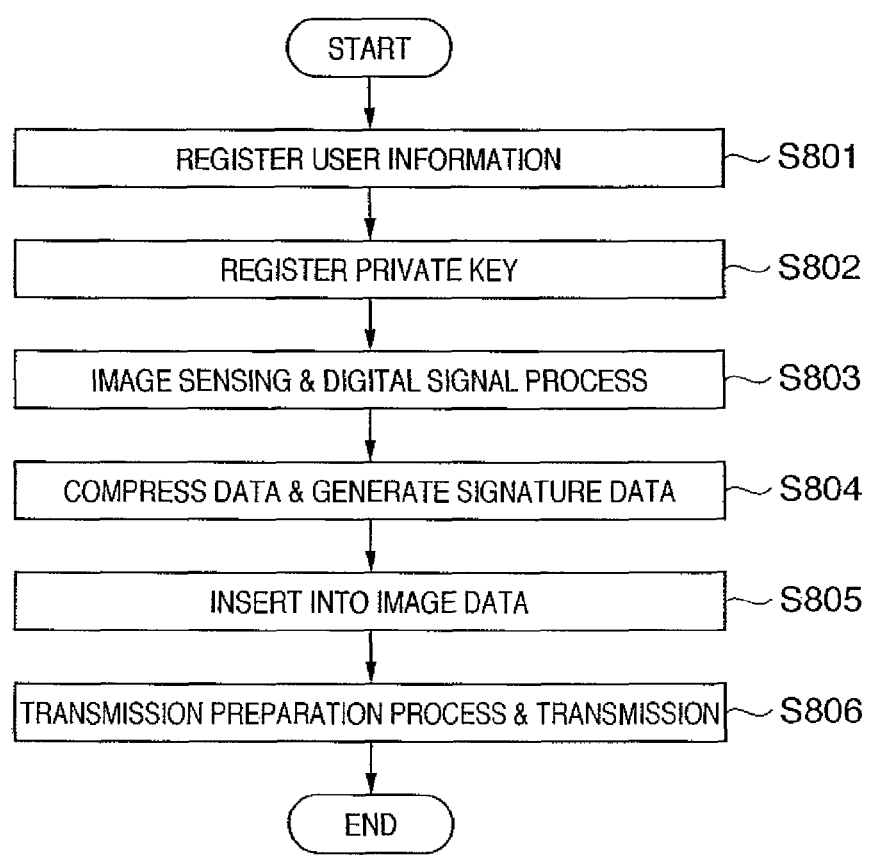
FIG. 26 is a flowchart for explaining the operation of the image input apparatus in the image verification system according to the fourth embodiment of the present invention.

FIG. 26 shows as an example of the operation of the image input apparatus 110 an operation of receiving and registering a private key, generating digital signature data by using a private key for sensed image data, and inserting the digital signature data into the image data.

Step S801:

The image input apparatus 110 receives a log-in request and user information from the user information input apparatus 150, and stores (registers) the received user information in the ROM 37.

Step S802:

The image input apparatus 110 receives a private key from the key generation apparatus 140 by using the user information, and stores (registers) the received private key in the ROM 37.

Step S803:

The image input apparatus 110 senses an object, executes an image compression process for the sensed image (image information) of the object subsequently to an electrical signal process, digital signal process, and the like, and formats the image to a file.

Step S804:

The image input apparatus 110 performs a compression process using a hash function for the image data having undergone the image compression process in step S803, generating a hash value.

The image input apparatus 110 generates digital signature data from the hash value and the private key stored in the ROM 37.

Step S805:

The image input apparatus 110 inserts the digital signature data generated in step S804 together with the user information into the header of the image data formatted to the file in step S803.

Step S806:

The image input apparatus 110 performs a transmission preparation process for the image data to which the digital signature data has been inserted in step S805, and transmits the processed image data to the image verification apparatus 120.

The process then ends.

The transmission preparation process in step S806 is, e.g., a process of converting target data into data corresponding to the network protocol when the image input apparatus 110 and image verification apparatus 120 are connected via a network. The transmission preparation process also includes a process of recording target data on a storage medium when the image input apparatus 110 and image verification apparatus 120 are not connected via a network or the like and exchange data via a storage medium such as a memory card.

Creation of digital signature data and an insertion process into image data may be executed every image sensing, or at once for image data obtained by respective image sensing operations after the end of all image sensing operations.

<Operation of Image Verification Apparatus 120>

Figure 27:
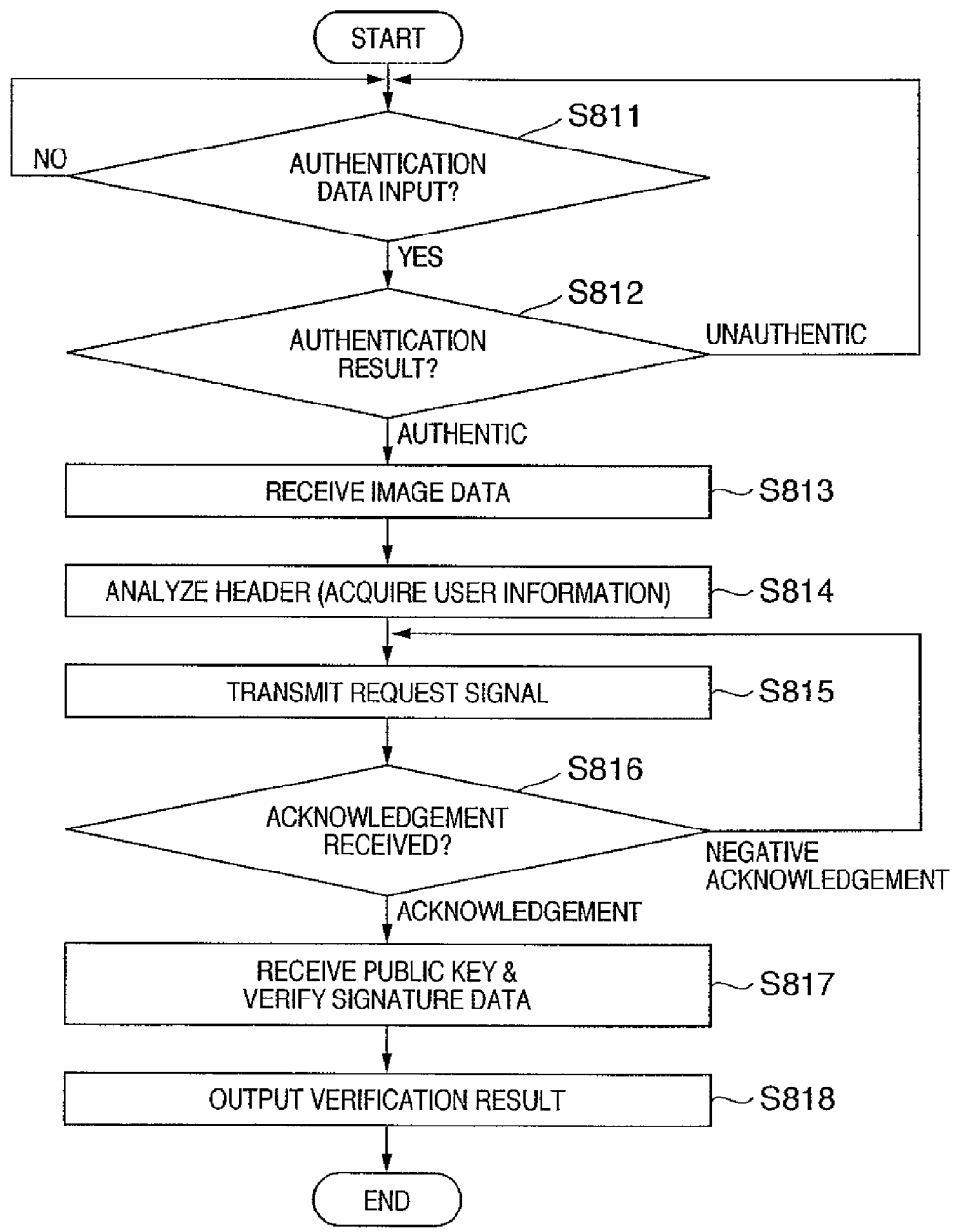
FIG. 27 is a flowchart for explaining the operation of an image verification apparatus in the image verification system according to the fourth embodiment of the present invention.

FIG. 27 shows as an example of the operation of the image verification apparatus 120 an operation of receiving image data containing digital signature data, receiving a public key used to verify the image data, and verifying the image data by using the public key.

Step S811:

The image verification apparatus 120 determines whether the user has input authentication data such as a password for authentication.

If authentication data is determined not to have been input, the image verification apparatus 120 waits for input of data; if authentication data is determined to have been input, advances to step S812.

Step S812:

If authentication data is determined in step S811 to have been input, the image verification apparatus 120 determines from the authentication data whether the user is an authentic user (verifier).

If the user is determined not to be authentic, the image verification apparatus 120 repetitively executes the process from step S811; if the user is determined to be authentic, advances to step S813.

Step S813:

If the user is determined in step S812 to be authentic, the image verification apparatus 120 receives image data containing digital signature data from the image input apparatus 110.

For example, when the image input apparatus 110 and image verification apparatus 120 are connected via a network, the image verification apparatus 120 receives image data via the network. When the image input apparatus 110 and image verification apparatus 120 are not connected via a network or the like and exchange data via a storage medium such as a memory card, the image verification apparatus 120 reads out image data from the storage medium.

Step S814:

The image verification apparatus 120 analyzes the header of the image data which is acquired in step S813 and contains the digital signature data, and acquires data (in this case, user information) necessary to acquire a public key corresponding to the private key used to generate the digital signature data from the database apparatus 130.

Step S815:

By using the user information acquired in step S814, the image verification apparatus 120 generates request information for requesting a public key necessary for verification of the database apparatus 130, and transmits the request information to the database apparatus 130.

Step S816:

The image verification apparatus 120 determines whether the response from the database apparatus 130 to the request information transmitted in step S815 is acknowledgement or negative acknowledgement.

If the response is determined to be negative acknowledgement, the image verification apparatus 120 repetitively executes the process from step S815; if the response is determined to be acknowledgement, advances to step S817.

Step S817:

If it is determined in step S816 that the database apparatus 130 has transmitted acknowledgement, the image verification apparatus 120 receives a public key from the database apparatus 130, and verifies the digital signature data inserted in the header of the image data received in step S813 by using the public key.

Step S818:

The image verification apparatus 120 outputs the verification result of step S817.

The process then ends.

<Operation of Database Apparatus 130>

Figure 28:
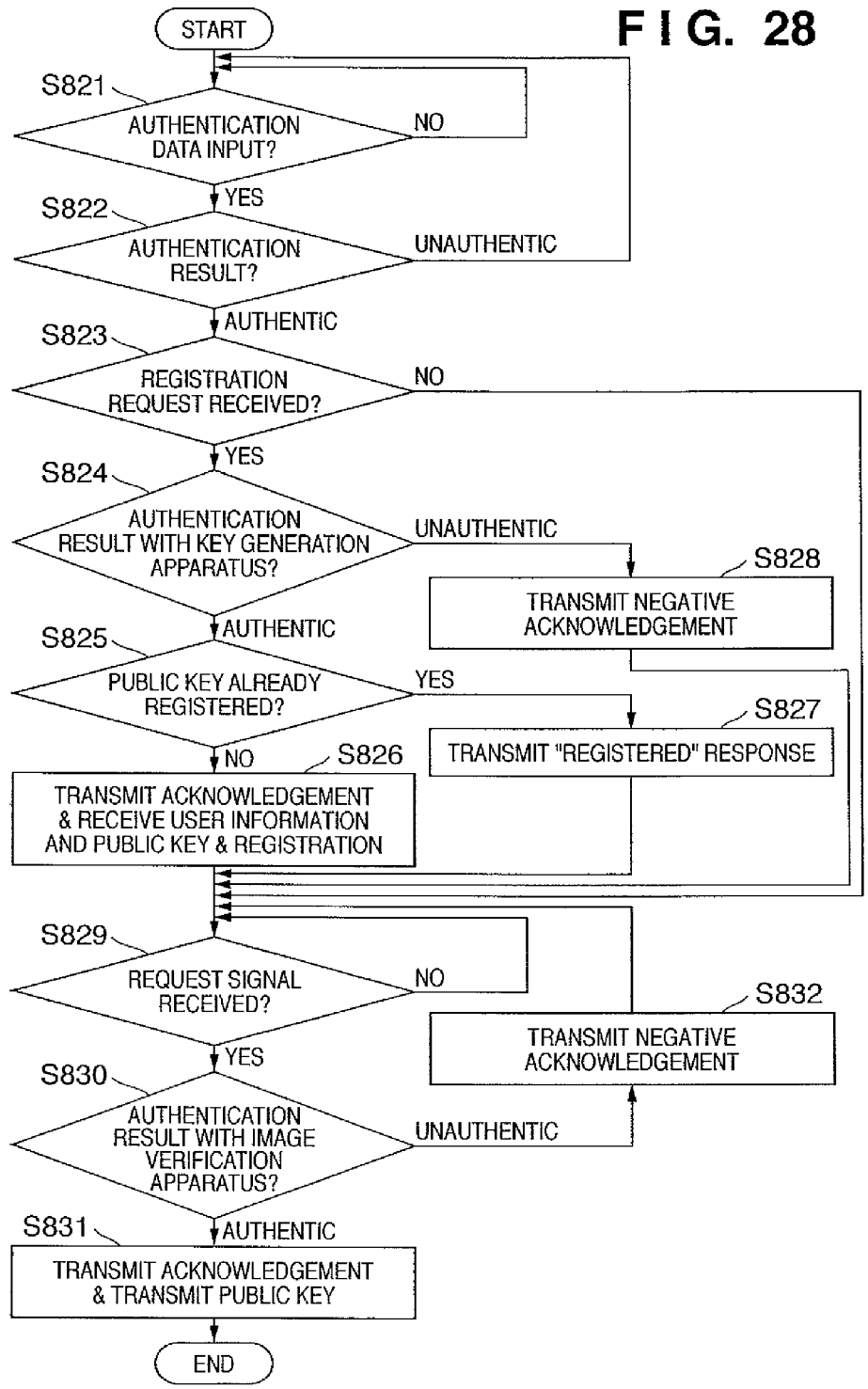
FIG. 28 is a flowchart for explaining the operation of a database apparatus in the image verification system according to the fourth embodiment of the present invention.

FIG. 28 shows as an example of the operation of the database apparatus 130 an operation of receiving and registering a public key from the key generation apparatus 140, and transmitting the public key to the image verification apparatus 120 in response to a request from the image verification apparatus 120.

Step S821:

The database apparatus 130 determines whether the user has input authentication data such as a password for authentication.

If authentication data is determined not to have been input, the database apparatus 130 waits for input of data; if authentication data is determined to have been input, advances to step S822.

Step S822:

If authentication data is determined in step S821 to have been input, the database apparatus 130 determines from the authentication data whether the user is authentic.

If the user is determined not to be authentic, the database apparatus 130 repetitively executes the process from step S821; if the user is determined to be authentic, advances to step S823.

Step S823:

If the user is determined in step S822 to be authentic, the database apparatus 130 determines whether it has received a public key registration request from the key generation apparatus 140.

If the public key registration request is determined to have been received, the database apparatus 130 advances to step S824; if the public key registration request is determined not to have been received, directly to step S829 without executing processes in steps S824 to S828.

Step S824:

If the public key registration request is determined in step S823 to have been received, the database apparatus 130 performs authentication using the public key registration request, and determines from the authentication result whether the key generation apparatus 140 which has transmitted the public key registration request is authentic.

If the key generation apparatus 140 is determined to be authentic, the database apparatus 130 advances to step S825; if the key generation apparatus 140 is determined not to be authentic, to step S829 via step S828.

Step S825:

If the key generation apparatus 140 is determined in step S824 to be authentic, the database apparatus 130 determines whether the registration-requested public key has been registered.

If the registration-requested public key is determined not to have been registered, the database apparatus 130 advances to step S829 via step S826; if the registration-requested public key is determined to have been registered, advances to step S829 via step S827.

Step S826:

If the registration-requested public key is determined in step S825 not to have been registered, the database apparatus 130 transmits acknowledgement to the key generation apparatus 140. The database apparatus 130 receives user information and a corresponding public key from the key generation apparatus 140, and stores (registers) them in the save memory 54. The database apparatus 130 then advances to step S829.

Step S827:

If the registration-requested public key is determined in step S825 to have been registered, the database apparatus 130 transmits to the key generation apparatus 140 a response ("registered" response) representing that the requested public key has been registered. The database apparatus 130 then advances to step S829.

Step S828:

If the key generation apparatus 140 is determined in step S824 not to be authentic, the database apparatus 130 transmits negative acknowledgement to the key generation apparatus 140. The database apparatus 130 then advances to step S829.

Step S829:

After the process in step S826, S827, or S828, the database apparatus 130 determines whether it has received request information (request signal) from the image verification apparatus 120.

If the request signal is determined not to have been received, the database apparatus 130 waits for reception of a request signal; if the request signal is determined to have been received, advances to step S830.

Step S830:

If a request signal is determined in step S829 to have been received, the database apparatus 130 performs authentication using the request signal, and determines from the authentication result whether the image verification apparatus 120 which has transmitted the request signal is authentic.

If the image verification apparatus 120 is determined to be authentic, the database apparatus 130 advances to step S832; if the image verification apparatus 120 is determined not to be authentic, to step S829 via step S831.

Step S831:

If the image verification apparatus 120 is determined in step S830 to be authentic, the database apparatus 130 transmits acknowledgement to the image verification apparatus 120, and transmits the requested public key to the image verification apparatus 120. The process then ends.

Step S832:

If the image verification apparatus 120 is determined in step S830 not to be authentic, the database apparatus 130 transmits negative acknowledgement to the image verification apparatus 120. The database apparatus 130 then returns to step S829 to repetitively execute the subsequent processing steps.

<Operation of Key Generation Apparatus 140>

Figure 29:
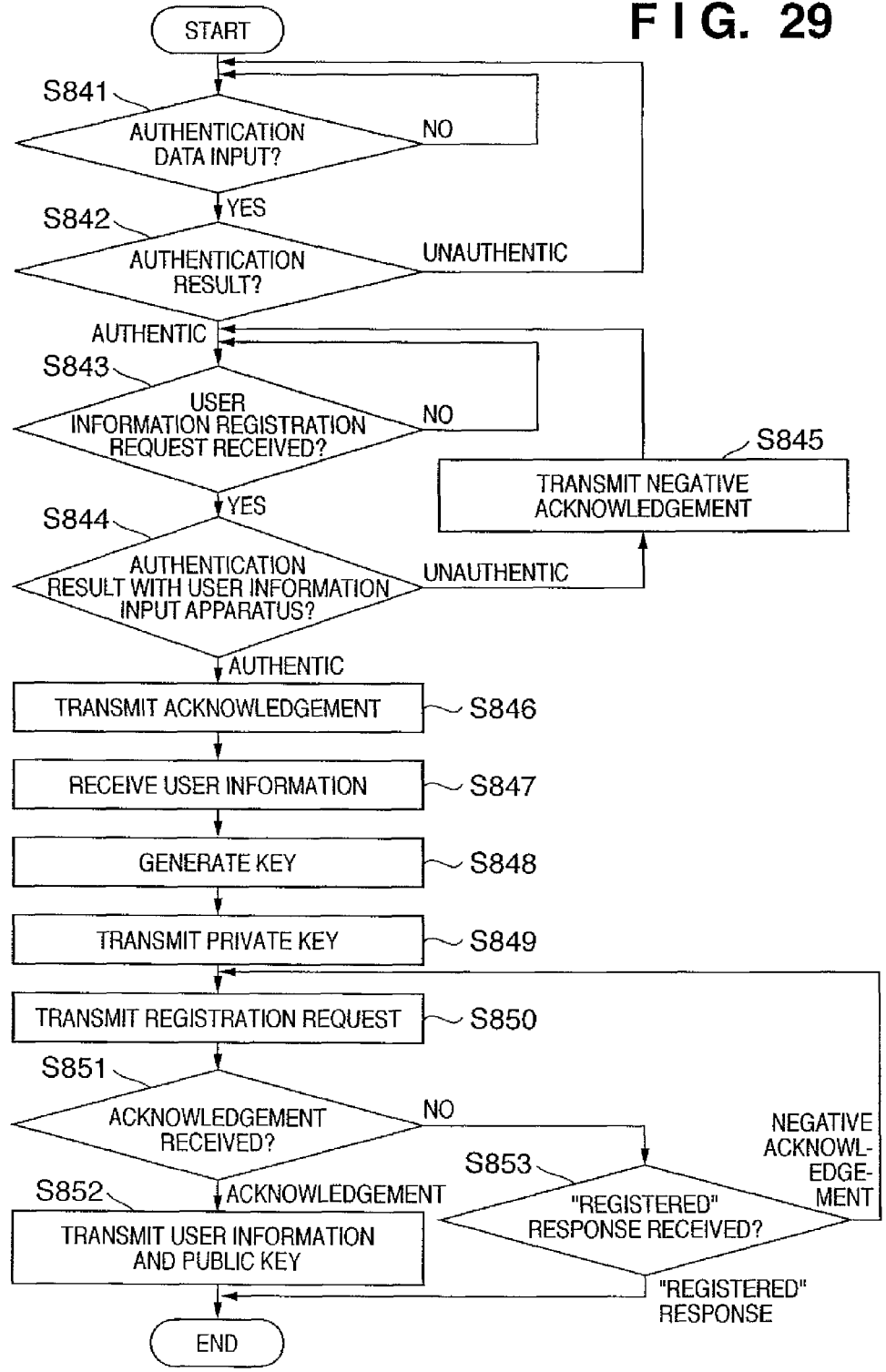
FIG. 29 is a flowchart for explaining the operation of the key generation apparatus in the image verification system according to the fourth embodiment of the present invention.

FIG. 29 shows as an example of the operation of the key generation apparatus 140 an operation of generating a public key and private key, transmitting the private key to the image input apparatus 110, and transmitting the public key to the database apparatus 130.

Step S841:

The key generation apparatus 140 determines whether the user has input authentication data such as a password for authentication.

If authentication data is determined not to have been input, the key generation apparatus 140 waits for input of data; if authentication data is determined to have been input, advances to step S842.

Step S842:

If authentication data is determined in step S841 to have been input, the key generation apparatus 140 determines from the authentication data whether the user is authentic.

If the user is determined not to be authentic, the key generation apparatus 140 repetitively executes the process from step S841; if the user is determined to be authentic, advances to step S843.

Step S843:

If the user is determined in step S842 to be authentic, the key generation apparatus 140 determines whether it has received a user information registration request from the user information input apparatus 150. If the user information registration request is determined not to have been received, the key generation apparatus 140 waits for the request; if the user information registration request is determined to have been received, advances to step S844.

Step S844:

If the user information registration request is determined in step S843 to have been received, the key generation apparatus 140 performs authentication using the user registration request, and determines from the authentication result whether the user information input apparatus 150 which has transmitted the user information registration request is authentic.

If the user information input apparatus 150 is determined to be authentic, the key generation apparatus 140 advances to step S846; if the user information input apparatus 150 is determined not to be authentic, to step S843 via step S845.

Step S845:

If the user information input apparatus 150 is determined in step S844 not to be authentic, the key generation apparatus 140 transmits negative acknowledgement to the user information input apparatus 150. The key generation apparatus 140 then returns to step S843 to repetitively execute the subsequent processing steps.

Step S846:

If the user information input apparatus 150 is determined in step S844 to be authentic, the key generation apparatus 140 transmits acknowledgement to the user information input apparatus 150. The key generation apparatus 140 then advances to step S847.

Step S847:

If the user information input apparatus 150 is determined in step S844 to be authentic, the key generation apparatus 140 receives the user information.

Step S848:

The key generation apparatus 140 generates a private key and public key, and associates them with the user information. The generated private key is transmitted to the image input apparatus 110, whereas the public key is registered in the database apparatus 130 and finally used by the image verification apparatus 120 for verification of digital signature data generated using the private key. A method of generating a private key and public key is the same as that described in the first embodiment, and a description thereof will be omitted.

Step S849:

The key generation apparatus 140 transmits the private key generated in step S848 to the image input apparatus 110 having user information corresponding to the private key.

Step S850:

The key generation apparatus 140 transmits a registration request to the database apparatus 130 in order to register the public key generated in step S848 in the database apparatus 130.

Step S851:

The key generation apparatus 140 determines whether the response from the database apparatus 130 to the registration request transmitted in step S850 is acknowledgement or negative acknowledgement.

If the response is determined to be acknowledgement, the key generation apparatus 140 advances to step S852; if the response is determined to be negative acknowledgement, to step S853

Step S852:

If the response is determined in step S851 to be acknowledgement, the key generation apparatus 140 transmits the public key and user information generated in step S848 to the database apparatus 130. The process then ends.

Step S853:

If the response is determined in step S851 to be negative acknowledgement, the key generation apparatus 140 determines whether the response from the database apparatus 130 to the registration request transmitted in step S850 is a "registered" response or negative acknowledgement. If the response is determined to be negative acknowledgement, the key generation apparatus 140 repetitively executes the process from step S850; if the response is determined to be the "registered" response, the process ends.

<Operation of User Information Input Apparatus 150>

Figure 30:
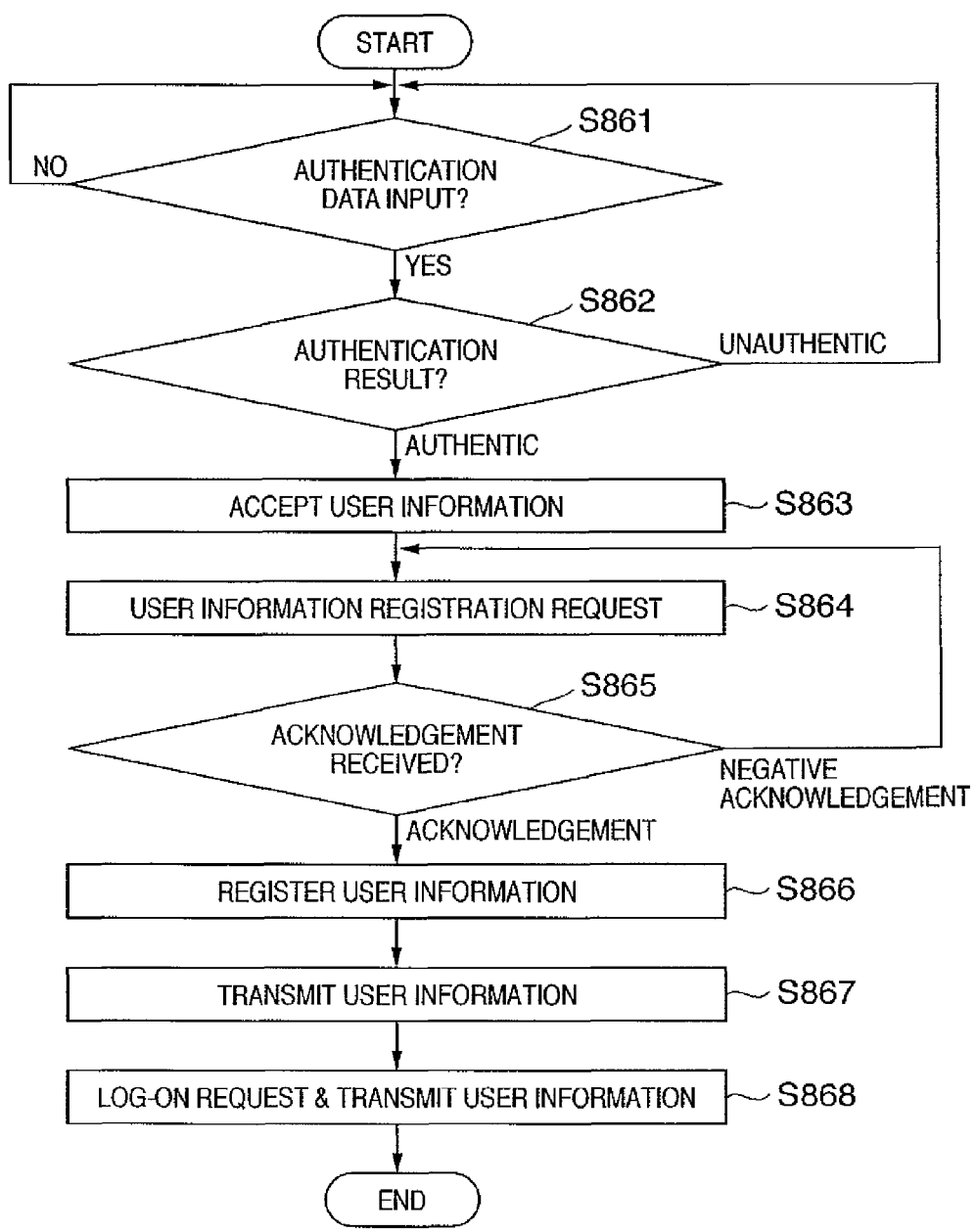
FIG. 30 is a flowchart for explaining the operation of the user information input apparatus according to the fourth embodiment of the present invention.

FIG. 30 shows as an example of the operation of the user information input apparatus 150 an operation of receiving user information and transmitting it to the image input apparatus 110 and key generation apparatus 140.

Step S861:

The user information input apparatus 150 determines whether the user has input authentication data such as a password for authentication.

If authentication data is determined not to have been input, the user information input apparatus 150 waits for input of data; if authentication data is determined to have been input, advances to step S862.

Step S862:

If authentication data is determined in step S861 to have been input, the user information input apparatus 150 determines from the authentication data whether the user is authentic. If the user is determined not to be authentic, the user information input apparatus 150 repetitively executes the process from step S861; if the user is determined to be authentic, advances to step S863.

Step S863:

If the user is determined in step S862 to be authentic, the user information input apparatus 150 accepts user information from the user, and advances to step S864.

Step S864;

The user information input apparatus 150 transmits a registration request to the key generation apparatus 140 in order to register the user information accepted in step S863 in the key generation apparatus 140.

Step S865:

The user information input apparatus 150 determines whether the response from the key generation apparatus 140 to the registration request transmitted in step S864 is acknowledgement or negative acknowledgement. If the response is determined to be negative acknowledgement, the user information input apparatus 150 repetitively executes the process from step S864; if the response is determined to be acknowledgement, advances to step S866.

Step S866:

The user information input apparatus 150 transmits the user information accepted in step S863 to the key generation apparatus 140. The user information input apparatus 150 then advances to step S867.

Step S867:

The user information input apparatus 150 transmits the user information accepted in step S863 to the image input apparatus 110, and at the same time logs in to the image input apparatus 110 on the basis of the user information. The process then ends.

In the fourth embodiment, the key generation apparatus 140 and user information input apparatus 150 are arranged as independent apparatuses. However, the present invention is not limited to this, and the functions of the key generation apparatus 140 and user information input apparatus 150 may be provided to the image input apparatus 110 or database apparatus 130. Also, for example, the functions of the image verification apparatus 120, database apparatus 130, key generation apparatus 140, and user information input apparatus 150 may be provided to one apparatus.

Fifth Embodiment

In the fourth embodiment, the image verification system 100 in FIG. 22 generates digital signature data by public key cryptography.

In the fifth embodiment, a high-speed arithmetic process such as exclusive-OR calculation with private key, as described in the second embodiment, is performed, then an arithmetic process using a hash function is done, and the resultant output is set as digital signature data. An image verification system 100 according to the fifth embodiment will be explained in detail.

Only a configuration and operation different from those in the second and fourth embodiments will be explained in detail.

<Overall Operation of Image Verification System 100>

The operation of the image verification system 100 according to the fifth embodiment will be explained with reference to FIG. 31 by exemplifying operations when an exclusive-OR arithmetic process with private key is executed for image data without using public key cryptography in generating digital signature data, then an arithmetic process using a hash function is executed, and the resultant output is set as digital signature data, and when pieces of unique user information are made to correspond to pieces of private key for use.

Step S901:

A user information input apparatus 150 accepts and delivers user information unique to private key necessary to generate digital signature data, and executes log-in work. At this time, the user who is to perform this operation cannot execute this operation until he is confirmed to be authentic as a result of authentication with the user information input apparatus 150 by using a password or the like.

Step S902:

When the user information input apparatus 150 transmits the user information to a key generation apparatus 140, the key generation apparatus 140 stores the user information in a ROM 65.

When the user information input apparatus 150 transmits a log-in request for the user information to an image input apparatus 110, the image input apparatus 110 accepts log-in of the user information, and stores the user information in a ROM 37.

Step S903:

The key generation apparatus 140 generates private key used to generate and verify digital signature data. For example, when digital signature data are generated using different pieces of private key for pieces of user information, the pieces of generated private key and the pieces of user information for managing them are made to correspond to each other, as shown in FIG. 32. The user who is to perform this operation cannot execute this operation until he is confirmed to be authentic as a result of authentication with the key generation apparatus 140 by using a password or the like.

Step S904:

The image input apparatus 110 requests corresponding private key of the key generation apparatus 140 by using the user information stored in the ROM 37 in step S902. The image input apparatus 110 receives the private key corresponding to the user information from the key generation apparatus 140, and stores it in the ROM 37.

As described above, the key generation apparatus 140 stores private key in correspondence with user information. In the example shown in FIG. 32, private key "0x987654321" corresponding to unique user information "A" stored in the ROM 37 is transmitted and stored.

If a database apparatus 130 authenticates the key generation apparatus 140, the database apparatus 130 registers the user information and private key sent from the key generation apparatus 140.

In the example shown in FIG. 32, the private key "0x987654321" corresponding to the user information "A" is managed in association with the user information "A". In this case, the user (registrant) cannot execute private key registration operation and the like until he performs authentication with the database apparatus 130 by using a password or the like and is confirmed to be authentic.

Step S905:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S906:

The image input apparatus 110 sets as digital signature data a result obtained by applying either the method of the second embodiment in which exclusive-OR calculation is performed between the image data having undergone the image compression process in step S905 and the private key acquired in step S904 and a compression process using a hash function is executed for the result to generate a hash value (digest), or the method of the third embodiment in which an arithmetic process (represented by a keyed hash function, MAC, or the like) for generating data of a predetermined length from image data and private key is done for the image data.

As the hash function, MD-5, SHA-1, and the like are available. The hash value is represented by 128 bits when MD-5 is applied, and 160 bits when SHA-1 is applied.

Step S907:

The image input apparatus 110 inserts the digital signature data generated in step S906 together with the user information into the header of the image data formatted to the file in step S905 (see FIG. 25).

Step S908:

The image input apparatus 110 uses an interface 36 to convert the image data to which the digital signature data has been inserted in step S907 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S909:

The user who is to verify the image data sent from the image input apparatus 110 by an image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the user information serving as information for acquiring private key used to generate the digital signature data.

The image verification apparatus 120 extracts the user information from the user information area of the header. By using the user information, the image verification apparatus 120 generates request information for requesting private key necessary for verification of the database apparatus 130, and transmits the request information to the database apparatus 130.

Step S910:

The database apparatus 130 receives the request information from the image verification apparatus 120, and determines from the request information in the above-described manner whether the image verification apparatus 120 is authentic.

Only when the database apparatus 130 determines as a result of authentication that the image verification apparatus 120 is authentic, the database apparatus 130 searches for private key which is stored in a save memory 54 and corresponds to the user information contained in the received request information, and transmits the found private key to the image verification apparatus 120.

Step S911:

The image verification apparatus 120 receives the private key from the database apparatus 130, and extracts the digital signature data from the digital signature area of the header of the image data received from the image input apparatus 110 in step S909.

The image verification apparatus 120 deletes the header containing the digital signature data from the image data, and generates digital signature data for the resultant image data, i.e., data formed from only the image data by performing an arithmetic process for the image data used in step S906.

The image verification apparatus 120 compares the generated digital signature data and the digital signature data extracted from the image data. If these digital signature data coincide with each other, the image verification apparatus 120 determines that the image data has not been altered; if they do not coincide with each other, determines that the image data has been altered, and outputs the determination result.

<Operation of Image Input Apparatus 110>

Figure 33:
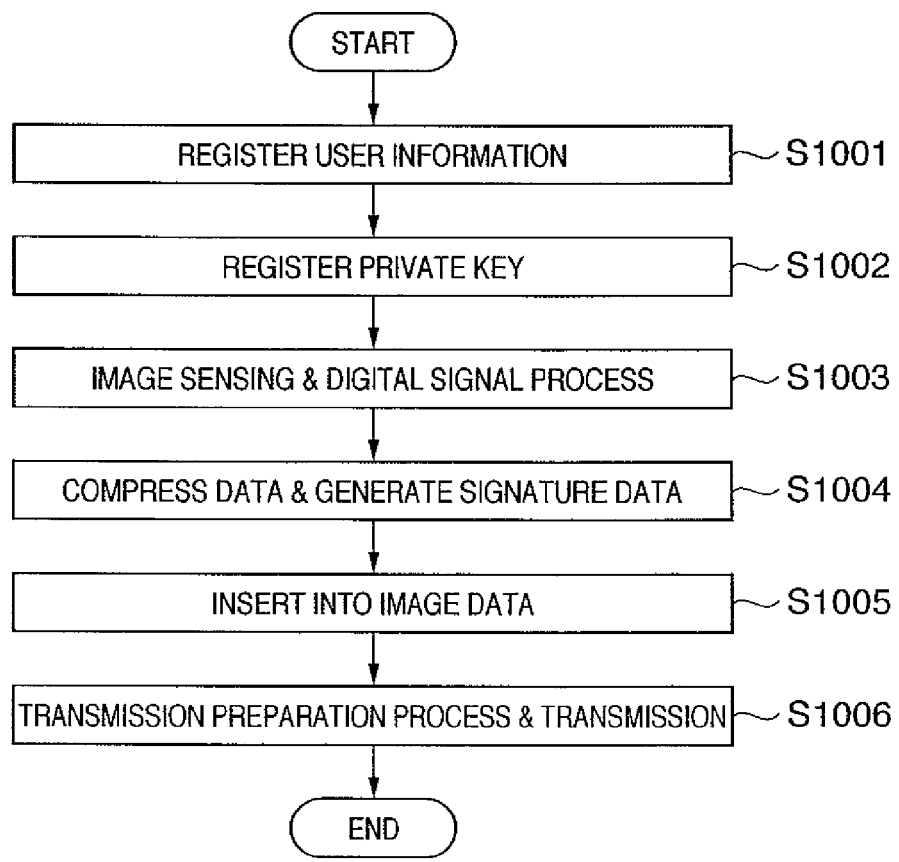
FIG. 33 is a flowchart for explaining the operation of an image input apparatus in the image verification system according to the fifth embodiment of the present invention.

FIG. 33 shows as an example of the operation of the image input apparatus 110 an operation of receiving and registering private key, generating digital signature data by using the private key for sensed image data, and inserting the digital signature data into the image data.

Step S1001:

The image input apparatus 110 receives a log-in request and user information from the user information input apparatus 150, and stores (registers) the received user information in the ROM 37.

Step S1002:

The image input apparatus 110 receives private key from the key generation apparatus 140 by using the user information, and stores (registers) the received private key in the ROM 37.

Step S1003;

The image input apparatus 110 senses an object, executes an image compression process for the sensed image (image information) of the object subsequently to an electrical signal process, digital signal process, and the like, and formats the image to a file.

Step S1004:

The image input apparatus 110 generates digital signature data by using the image data having undergone the image compression process in step S1003 and the private key acquired in step S1002.

Step S1005:

The image input apparatus 110 inserts the digital signature data generated in step S1004 together with the user information into the header of the image data formatted to the file in step S1003.

Step S1006:

The image input apparatus 110 performs a transmission preparation process for the image data to which the digital signature data has been inserted in step S1005, and transmits the processed image data to the image verification apparatus 120. The process then ends.

The transmission preparation process in step S1006 is, e.g., a process of converting target data into data corresponding to the network protocol when the image input apparatus 110 and image verification apparatus 120 are connected via a network. The transmission preparation process also includes a process of recording target data on a storage medium when the image input apparatus 110 and image verification apparatus 120 are not connected via a network or the like and exchange data via a storage medium such as a memory card.

<Operation of Image Verification Apparatus 120>

Figure 34:
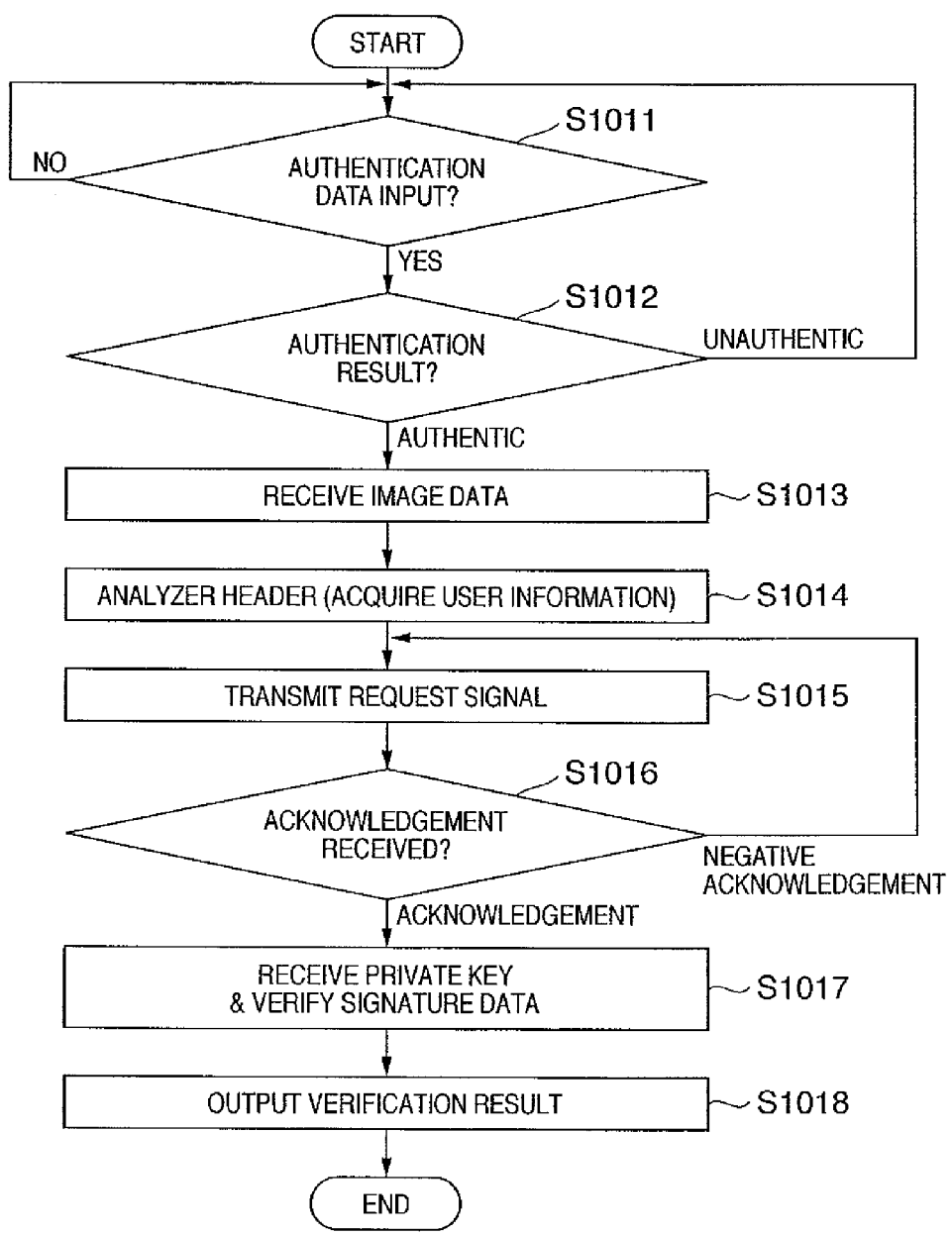
FIG. 34 is a flowchart for explaining the operation of an image verification apparatus in the image verification system according to the fifth embodiment of the present invention.

FIG. 34 shows as an example of the operation of the image verification apparatus 120 an operation of receiving image data containing digital signature data, receiving private key used to verify the image data, and verifying the image data by using the private key.

Step S1011:

The image verification apparatus 120 determines whether the user has input authentication data such as a password for authentication.

If authentication data is determined not to have been input, the image verification apparatus 120 waits for input of data; if authentication data is determined to have been input, advances to step S1012.

Step S1012:

If authentication data is determined in step S1011 to have been input, the image verification apparatus 120 determines from the authentication data whether the user is an authentic user (verifier).

If the user is determined not to be authentic, the image verification apparatus 120 repetitively executes the process from step S1011; if the user is determined to be authentic, advances to step S1013.

Step S1013:

If the user is determined in step S1012 to be authentic, the image verification apparatus 120 receives image data containing digital signature data from the image input apparatus 110.

For example, when the image input apparatus 110 and image verification apparatus 120 are connected via a network, the image verification apparatus 120 receives image data via the network. When the image input apparatus 110 and image verification apparatus 120 are not connected via a network or the like and exchange data via a storage medium such as a memory card, the image verification apparatus 120 reads out image data from the storage medium.

Step S1014:

The image verification apparatus 120 analyzes the header of the image data which is acquired in step S1013 and contains the digital signature data, and acquires data (in this case, user information) necessary to acquire the private key used to generate the digital signature data from the database apparatus 130.

Step S1015:

By using the user information acquired in step S1014, the image verification apparatus 120 generates request information for requesting the private key of the database apparatus 130, and transmits the request information to the database apparatus 130.

Step S1016:

The image verification apparatus 120 determines whether the response from the database apparatus 130 to the request information transmitted in step S1015 is acknowledgement or negative acknowledgement.

If the response is determined to be negative acknowledgement, the image verification apparatus 120 repetitively executes the process from step S1015; if the response is determined to be acknowledgement, advances to step S1017.

Step S1017:

If it is determined in step S1016 that the database apparatus 130 has transmitted acknowledgement, the image verification apparatus 120 receives private key from the database apparatus 130, and verifies the digital signature data inserted in the header of the image data received in step S1013 by using the private key.

Step S1018:

The image verification apparatus 120 outputs the verification result of step S1017.

The process then ends.

<Operation of Database Apparatus 130>

Figure 35:
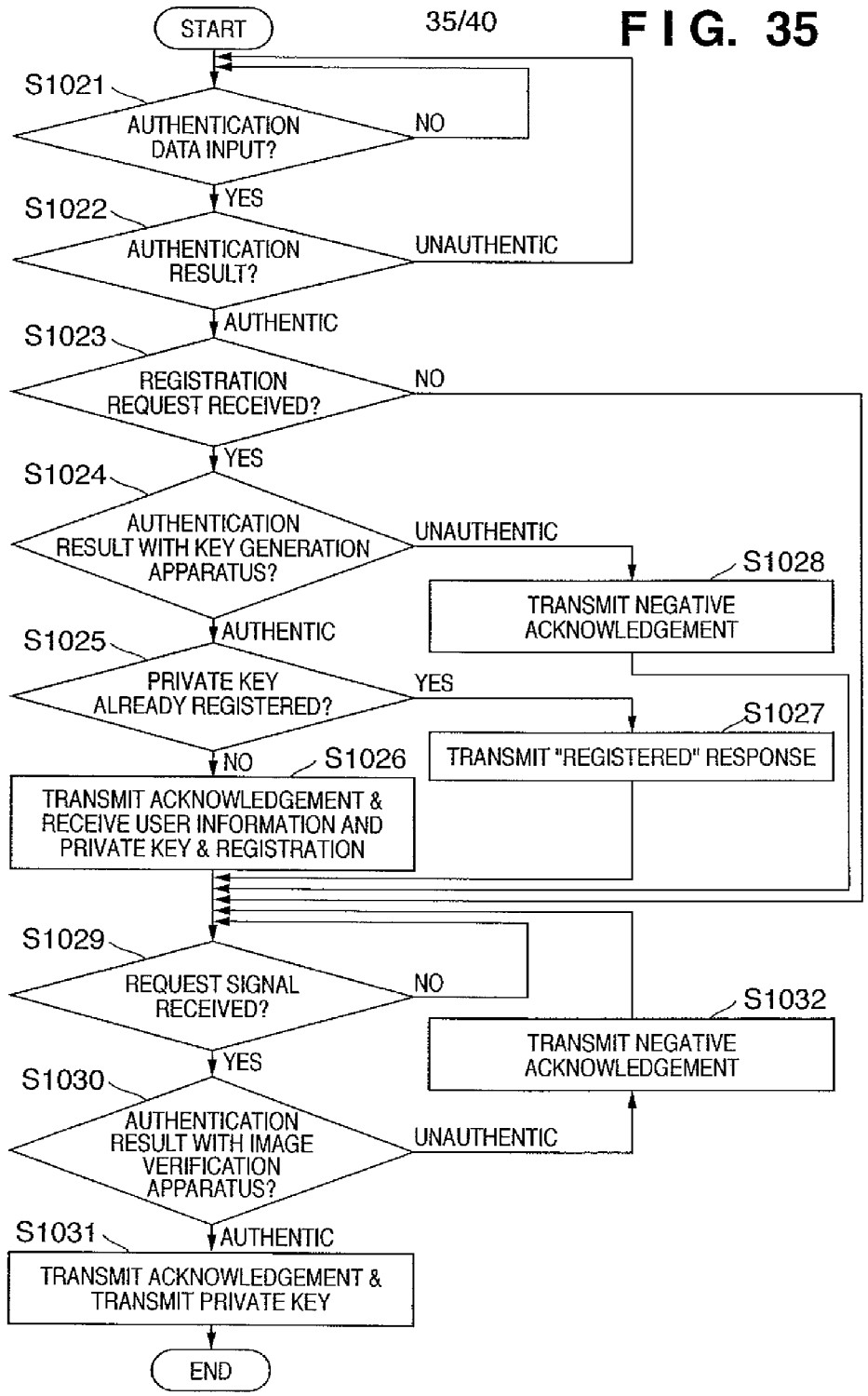
FIG. 35 is a flowchart for explaining the operation of a database apparatus in the image verification system according to the fifth embodiment of the present invention.

FIG. 35 shows as an example of the operation of the database apparatus 130 an operation of receiving and registering private key from the key generation apparatus 140, and transmitting the private key to the image verification apparatus 120 in response to a request from the image verification apparatus 120.

Step S1021:

The database apparatus 130 determines whether the user has input authentication data such as a password for authentication.

If authentication data is determined not to have been input, the database apparatus 130 waits for input of data; if authentication data is determined to have been input, advances to step S1022.

Step S1022:

If authentication data is determined in step S1021 to have been input, the database apparatus 130 determines from the authentication data whether the user is authentic.

If the user is determined not to be authentic, the database apparatus 130 repetitively executes the process from step S1021; if the user is determined to be authentic, advances to step S1023.

Step S1023:

If the user is determined in step S1022 to be authentic, the database apparatus 130 determines whether it has received a private key registration request from the key generation apparatus 140.

If the private key registration request is determined to have been received, the database apparatus 130 advances to step S1024; if the private key registration request is determined not to have been received, directly to step S1029 without executing processes in steps S1024 to S1028.

Step S1024:

If the private key registration request is determined in step S1023 to have been received, the database apparatus 130 performs authentication using the private key registration request, and determines from the authentication result whether the key generation apparatus 140 which has transmitted the private key registration request is authentic.

If the key generation apparatus 140 is determined to be authentic, the database apparatus 130 advances to step S1025; if the key generation apparatus 140 is determined not to be authentic, to step S1029 via step S1028.

Step S1025:

If the key generation apparatus 140 is determined in step S1024 to be authentic, the database apparatus 130 determines whether the registration-requested private key has been registered. If the registration-requested private key is determined not to have been registered, the database apparatus 130 advances to step S1029 via step S1026; if the registration-requested private key is determined to have been registered, advances to step S1029 via step S1027.

Step S1026:

If the registration-requested private key is determined in step S1025 not to have been registered, the database apparatus 130 transmits acknowledgement to the key generation apparatus 140. The database apparatus 130 receives user information and corresponding private key from the key generation apparatus 140, and stores (registers) them in the save memory 54. The database apparatus 130 then advances to step S1029.

Step S1027:

If the registration-requested private key is determined in step S1025 to have been registered, the database apparatus 130 transmits a "registered" response to the key generation apparatus 140. The database apparatus 130 then advances to step S1029.

Step S1028:

If the key generation apparatus 140 is determined in step S1025 not to be authentic, the database apparatus 130 transmits negative acknowledgement to the key generation apparatus 140. The database apparatus 130 then advances to step S1029.

Step S1029:

After the process in step S1026, S1027, or S1028, the database apparatus 130 determines whether it has received request information (request signal) from the image verification apparatus 120.

If the request signal is determined not to have been received, the database apparatus 130 waits for reception of a request signal; if the request signal is determined to have been received, advances to step S1030.

Step S1030:

If a request signal is determined in step S1029 to have been received, the database apparatus 130 performs authentication using the request signal, and determines from the authentication result whether the image verification apparatus 120 which has transmitted the request signal is authentic.

If the image verification apparatus 120 is determined to be authentic, the database apparatus 130 advances to step S1031; if the image verification apparatus 120 is determined not to be authentic, to step S1030 via step S1032.

Step S1031:

If the image verification apparatus 120 is determined in step S1030 to be authentic, the database apparatus 130 transmits acknowledgement to the image verification apparatus 120, and transmits the requested private key to the image verification apparatus 120. The process then ends.

Step S1032:

If the image verification apparatus 120 is determined in step S1030 not to be authentic, the database apparatus 130 transmits negative acknowledgement to the image verification apparatus 120. The database apparatus 130 then returns to step S1029 to repetitively execute the subsequent processing steps.

<Operation of Key Generation Apparatus 140>

Figure 36:
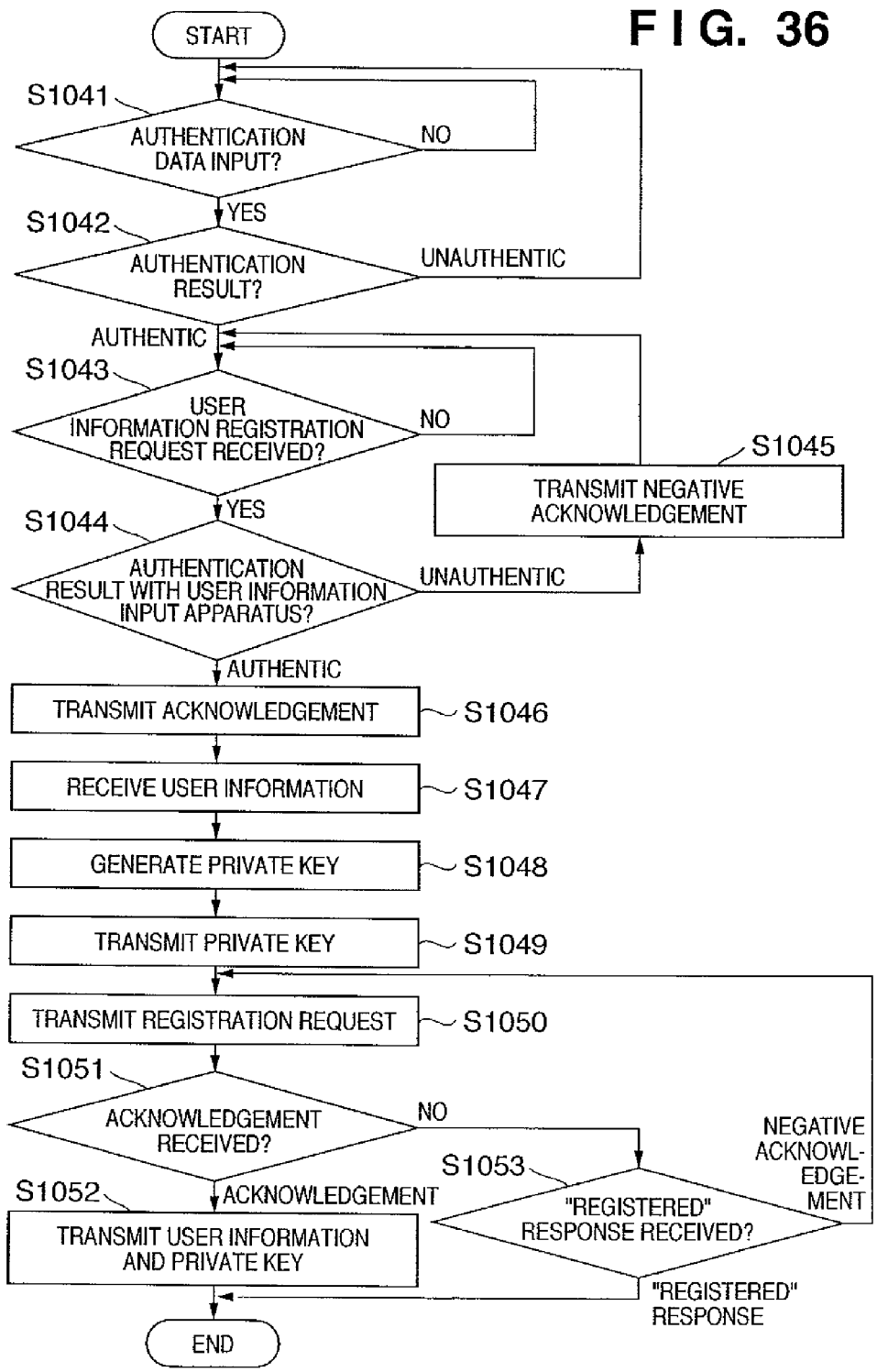
FIG. 36 is a flowchart for explaining the operation of the key generation apparatus in the image verification system according to the fifth embodiment of the present invention.

FIG. 36 shows as an example of the operation of the key generation apparatus 140 an operation of generating private key, and transmitting it to the image input apparatus 110 and database apparatus 130.

Step S1041:

The key generation apparatus 140 determines whether the user has input authentication data such as a password for authentication.

If authentication data is determined not to have been input, the key generation apparatus 140 waits for input of data; if authentication data is determined to have been input, advances to step S1042.

Step S1042:

If authentication data is determined in step S1041 to have been input, the key generation apparatus 140 determines from the authentication data whether the user is authentic.

If the user is determined not to be authentic, the key generation apparatus 140 repetitively executes the process from step S1041; if the user is determined to be authentic, advances to step S1043.

Step S1043:

If the user is determined in step S1042 to be authentic, the key generation apparatus 140 determines whether it has received a user information registration request from the user information input apparatus 150. If the user information registration request is determined not to have been received, the key generation apparatus 140 waits for the request; if the user information registration request is determined to have been received, advances to step S1044.

Step S1044:

If the user information registration request is determined in step S1043 to have been received, the key generation apparatus 140 performs authentication using the user registration request, and determines from the authentication result whether the user information input apparatus 150 which has transmitted the user information registration request is authentic.

If the user information input apparatus 150 is determined to be authentic, the key generation apparatus 140 advances to step S1046; if the user information input apparatus 150 is determined not to be authentic, to step S1043 via step S1045.

Step S1045:

If the user information input apparatus 150 is determined in step S1044 not to be authentic, the key generation apparatus 140 transmits negative acknowledgement to the user information input apparatus 150. The key generation apparatus 140 then returns to step S1043 to repetitively execute the subsequent processing steps.

Step S1046:

If the user information input apparatus 150 is determined in step S1044 to be authentic, the key generation apparatus 140 transmits acknowledgement to the user information input apparatus 150. The key generation apparatus 140 then advances to step S1047.

Step S1047:

If the user information input apparatus 150 is determined in step S1044 to be authentic, the key generation apparatus 140 receives the user information.

Step S1048:

The key generation apparatus 140 generates private key and associates it with the user information. The generated private key is registered in the image input apparatus 110 and database apparatus 130, and finally used by the image verification apparatus 120 for verification of digital signature data. At this time, private key is generated by the same method as that described in the second embodiment.

Step S1049:

The key generation apparatus 140 transmits the private key generated in step S1048 to the image input apparatus 110 having user information corresponding to the private key.

Step S1050:

The key generation apparatus 140 transmits a registration request to the database apparatus 130 in order to register the private key generated in step S1048 in the database apparatus 130.

Step S1051:

The key generation apparatus 140 determines whether the response from the database apparatus 130 to the registration request transmitted in step S1050 is acknowledgement or negative acknowledgement.

If the response is determined to be acknowledgement, the key generation apparatus 140 advances to step S1052; if the response is determined to be negative acknowledgement, to step S1053.

Step S1052:

If the response is determined in step S1051 to be acknowledgement, the key generation apparatus 140 transmits the private key and user information generated in step S1048 to the database apparatus 130. The process then ends.

Step S1053:

If the response is determined in step S1051 to be negative acknowledgement, the key generation apparatus 140 determines whether the response from the database apparatus 130 to the registration request transmitted in step S1050 is a "registered" response or negative acknowledgement. If the response is determined to be negative acknowledgement, the key generation apparatus 140 repetitively executes the process from step S1050; if the response is determined to be the "registered" response, the process ends.

<Operation of User Information Input Apparatus 150>

The operation of the user information input apparatus 150 is the same as the process described in the fourth embodiment with reference to FIG. 30, and a description thereof will be omitted.

Sixth Embodiment

Figure 31:
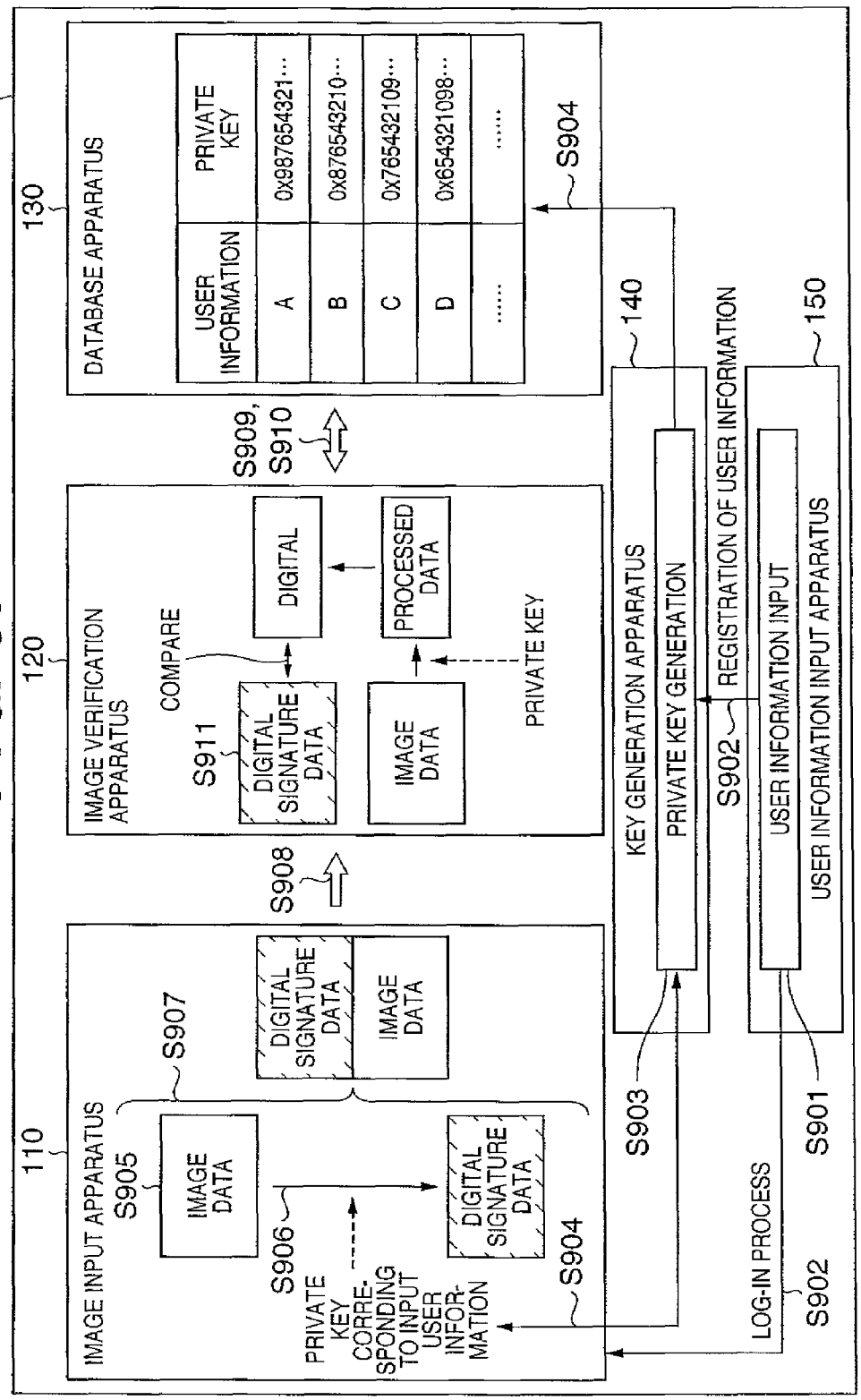
FIG. 31 is a block diagram showing the configuration of an image verification system to which the present invention is applied, and schematic processing procedures executed within and between apparatuses which form the image verification system according to the fifth embodiment of the present invention.

In the fourth and fifth embodiments, a database is formed from user information processible by each user information input apparatus and a corresponding public key or private key in the image verification system 100 of FIG. 22 or 31. When a plurality of types of user information input apparatuses 150 such as a user ID input apparatus and fingerprint input apparatus exist, unique user information identifiable by each user information input apparatus changes to, e.g., a user ID for the user ID input apparatus and a fingerprint for the fingerprint input apparatus. Databases must be constructed and managed with different formats.

In the sixth embodiment, an input value is prepared by adding an identifier for identifying each user information input apparatus to a digital value of user information generated by the user information input apparatus. The input value undergoes an arithmetic process using a hash function, and the output result is set as unique user information paired with a public key or private key.

As described above, the hash function has a one-way characteristic and collision resistance, and is guaranteed to provide a unique output value for the input value.

For this reason, the sixth embodiment can unify and process pieces of user information even when a plurality of types of user information input apparatuses 150 exist.

An image verification system 100 according to the sixth embodiment will be described in detail.

The image verification system 100 employs a method of generating digital signature data from private key used in the fifth embodiment and a hash function, and only a configuration and operation different from those in the fifth embodiment will be explained in detail.

<Overall Operation of Image Verification System 100>

Figure 37:
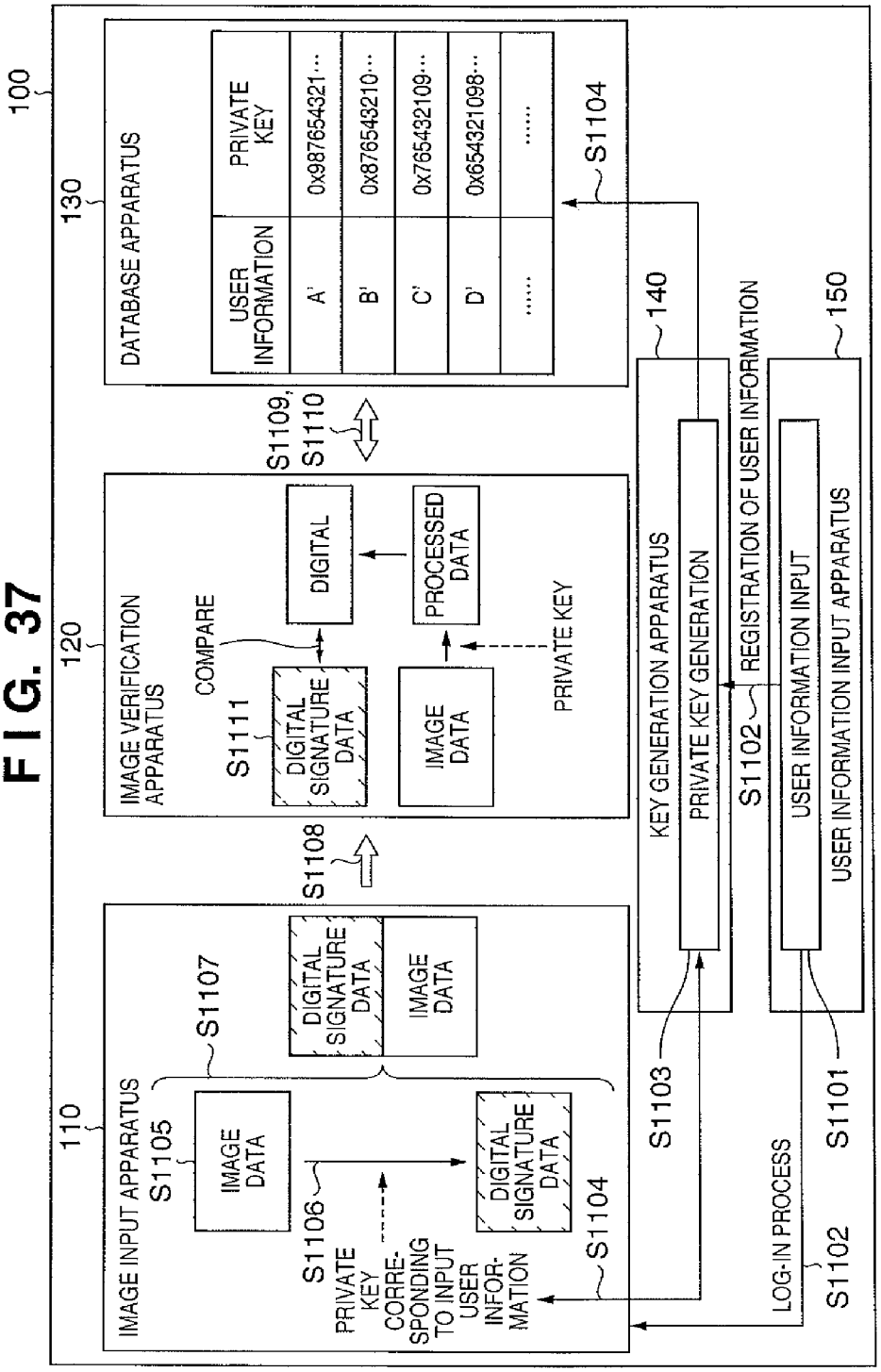
FIG. 37 is a block diagram showing the configuration of an image verification system to which the present invention is applied, and schematic processing procedures executed within and between apparatuses which form the image verification system according to the sixth embodiment of the present invention.

The operation of the image verification system 100 according to the sixth embodiment will be explained with reference to FIG. 37 by exemplifying operations when an exclusive-OR arithmetic process with private key is executed for image data without using public key cryptography in generating digital signature data, then an arithmetic process using a hash function is executed, and the resultant output is set as digital signature data, and when an output value generated by applying the hash function to concatenated data of user information and an identifier for identifying a user information input apparatus is set as new unique user information.

Step S1101:

The user information input apparatus 150 accepts and delivers user information unique to private key necessary to generate digital signature data, and executes log-in work. At this time, the user who is to perform this operation cannot execute this operation until he is confirmed to be authentic as a result of authentication with the user information input apparatus 150 by using a password or the like.

Step S1102:

When the user information input apparatus 150 transmits the user information to a key generation apparatus 140, the key generation apparatus 140 stores the user information in a ROM 65.

When the user information input apparatus 150 transmits a log-in request for the user information to an image input apparatus 110, the image input apparatus 110 accepts log-in of the user information, and performs a compression process using a hash function for the user information and an identifier unique to the user information input apparatus. The image input apparatus 110 calculates a hash value (digest), sets the resultant output as new user information, and stores the user information in a ROM 37.

As the hash function, MD-5, SHA-1, and the like are available. The hash value is represented by 128 bits when MD-5 is applied, and 160 bits when SHA-1 is applied.

Step S1103:

The key generation apparatus 140 generates private key used to generate and verify digital signature data. Also, the key generation apparatus 140 performs a compression process with the hash function used in step S1102 for the user information transmitted from the user information input apparatus 150 and an identifier unique to the user information input apparatus, calculates a hash value (digest), and sets the resultant output as new user information.

For example, when digital signature data are generated using different pieces of private key for pieces of user information, the pieces of generated private key and the pieces of user information for managing them are made to correspond to each other, as shown in FIG. 38. The user who is to perform this operation cannot execute this operation until he is confirmed to be authentic as a result of authentication with the key generation apparatus 140 by using a password or the like.

Step S1104:

The image input apparatus 110 requests corresponding private key of the key generation apparatus 140 by using the user information stored in the ROM 37 in step S1102. The image input apparatus 110 receives the private key corresponding to the user information, and stores the private key in the ROM 37.

As described above, the key generation apparatus stores private key in correspondence with user information. In the example shown in FIG. 38, the hash function is applied to the identifier of the user information input apparatus 150 and user information "A" which are stored in the ROM 37. As a result, private key "0x987654321" corresponding to newly generated user information "A'" is transmitted and stored.

If a database apparatus 130 authenticates the key generation apparatus 140, the database apparatus 130 registers the user information and private key sent from the key generation apparatus 140.

In the example shown in FIG. 38, the hash function is applied to the identifier of the user information input apparatus 150 and user the information "A", and the generated hash value "A'" is set as new user information. The private key data "0x987654321" is managed in association with the user information "A'". In this case, the user (registrant) cannot execute private key registration operation and the like until he performs authentication with the database apparatus 130 by using a password or the like and is confirmed to be authentic.

Step S1105:

The image input apparatus 110 senses an object, executes an image compression process for the sensed image (image information) of the object subsequently to an electrical signal process, digital signal process, and the like, and formats the image to a file.

As the image compression method, JPEG for a still picture, MPEG for a moving picture, and the like are available. As the file format, JFIF, TIFF, GIFF, and the like are available.

Step S1106:

The image input apparatus 110 sets as digital signature data a result obtained by applying either the method of the second embodiment in which exclusive-OR calculation is performed between the image data having undergone the image compression process in step S1105 and the private key acquired in step S1104 and a compression process using a hash function is executed for the result to generate a hash value (digest), or the method of the third embodiment in which an arithmetic process (represented by a keyed hash function, MAC, or the like) for generating data of a predetermined length from image data and private key is done for the image data.

Step S1107:

The image input apparatus 110 inserts the digital signature data generated in step S1106 together with the user information into the header of the image data formatted to the file in step S1105 (see FIG. 25).

Step S1108:

The image input apparatus 110 uses an interface 36 to convert the image data to which the digital signature data has been inserted in step S1107 into data suitable for an external apparatus serving as a transmitting destination and transmit the converted image data.

For example, when the external apparatus exists on a network, the interface 36 converts image data into data corresponding to the network protocol, and transmits the data. The external apparatus records the image data received via a network on a recording device such as a flexible disk or memory card.

Step S1109:

The user who is to verify the image data sent from the image input apparatus 110 by an image verification apparatus 120 cannot verify the image data, i.e., utilize the function of the image verification apparatus 120 until he executes authentication with the image verification apparatus 120 by using a password or the like and is confirmed to be an authentic user (verifier).

If the image data verifier is determined to be authentic, the image verification apparatus 120 receives the image data containing the digital signature data from the image input apparatus 110, and analyzes the header of the image data.

More specifically, the header of the image data contains, together with the digital signature data, the user information serving as information for acquiring private key used to generate the digital signature data.

The image verification apparatus 120 extracts the user information from the user information area of the header. By using the user information, the image verification apparatus 120 generates request information for requesting private key necessary for verification of the database apparatus 130, and transmits the request information to the database apparatus 130.

Step S1110:

The database apparatus 130 receives the request information from the image verification apparatus 120, and determines from the request information in the above-described manner whether the image verification apparatus 120 is authentic.

Only when the database apparatus 130 determines as a result of authentication that the image verification apparatus 120 is authentic, the database apparatus 130 searches for private key which is stored in a save memory 54 and corresponds to the user information contained in the received request information, and transmits the found private key to the image verification apparatus 120.

Step S1111:

The image verification apparatus 120 receives the private key from the database apparatus 130, and extracts the digital signature data from the digital signature area of the header of the image data received from the image input apparatus 110 in step S1109.

The image verification apparatus 120 deletes the header containing the digital signature data from the image data, and generates digital signature data for the resultant image data, i.e., data formed from only the image data by performing an arithmetic process for the image data used in step S1106.

The image verification apparatus 120 compares the generated digital signature data and the digital signature data extracted from the image data. If these digital signature data coincide with each other, the image verification apparatus 120 determines that the image data has not been altered; if they do not coincide with each other, determines that the image data has been altered, and outputs the determination result.

<Operation of Image Input Apparatus 110>

Figure 39:
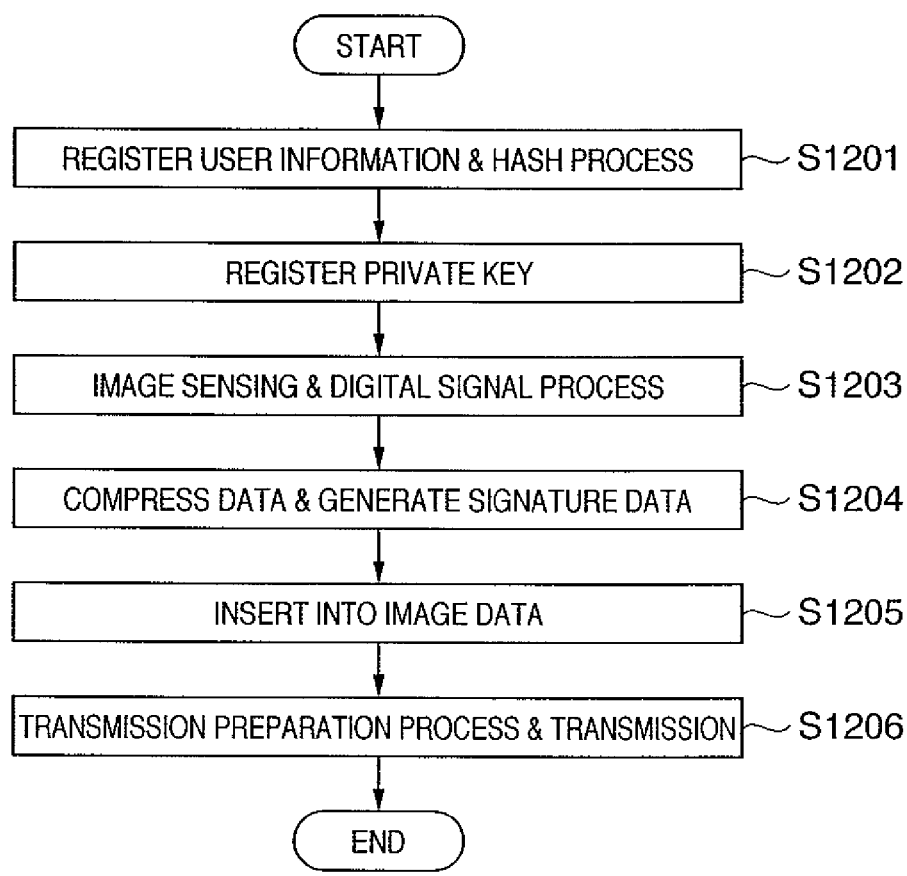
FIG. 39 is a flowchart for explaining the operation of an image input apparatus in the image verification system according to the sixth embodiment of the present invention.

FIG. 39 shows as an example of the operation of the image input apparatus 110 an operation of receiving and registering private key, generating digital signature data by using the private key for sensed image data, and inserting the digital signature data into the image data.

Step S1201:

The image input apparatus 110 receives a log-in request and user information from the user information input apparatus 150, performs a compression process using a hash function for the received user information and an identifier unique to the user information input apparatus, and stores (registers) the resultant output as new user information in the ROM 37.

The arithmetic process using the hash function is represented by, e.g., processes (a) and (b) out of processes shown in FIG. 18.

Process (a):

An identifier which is defined in advance uniquely to the user information input apparatus is concatenated to the header of the digital value of user information, and the resultant output is set as concatenated data.

Process (b):

A compression process using a hash function is done for the concatenated data generated by process (a), and the resultant hash value is stored (registered) as new user information in the ROM 37.

Processes in steps S1202 to S1206 are the same as those in steps S1002 to S1006 of FIG. 33, and a description thereof will be omitted.

<Operation of Key Generation Apparatus 140>

Figure 40:
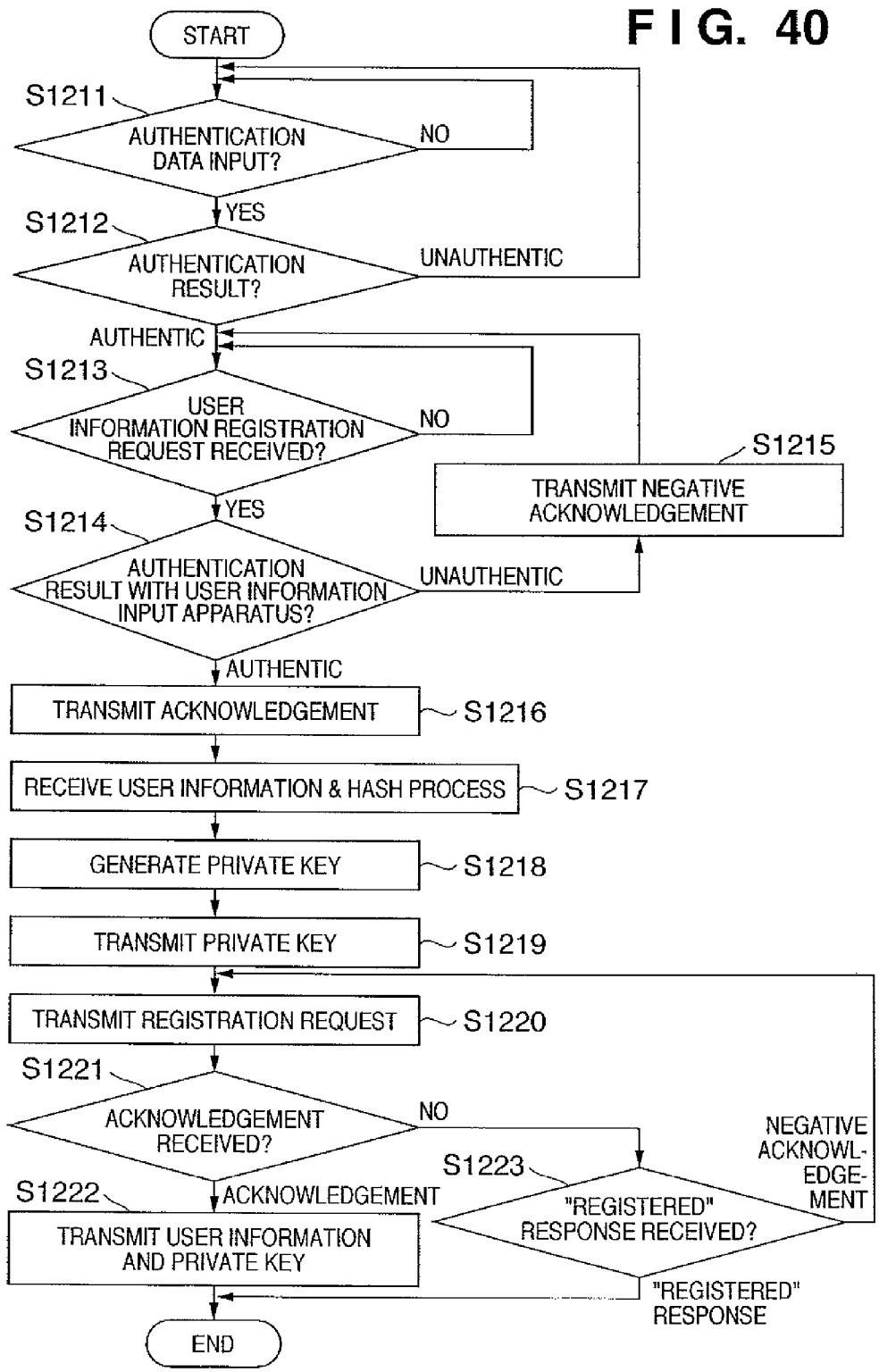
FIG. 40 is a flowchart for explaining the operation of the key generation apparatus according to the sixth embodiment of the present invention.

FIG. 40 shows as an example of the operation of the key generation apparatus 140 an operation of generating private key, and transmitting it to the image input apparatus 110 and database apparatus 130.

In the fifth embodiment, the key generation apparatus 140 only receives user information from the user information input apparatus 150 in step S1047 of FIG. 36. To the contrast, in step S1217 of the process shown in FIG. 40, the key generation apparatus 140 receives user information, performs the same compression process using the hash function as that in step S1201 of FIG. 39, and sets the resultant output as new user information. The remaining steps S1211 to S1216 and steps S1218 to S1223 are the same as steps S1041 to S1046 and steps S1048 to S1053 in FIG. 36, and a description thereof will be omitted.

The sixth embodiment is applied to the fifth embodiment, but is not limited to this and can also be applied to the fourth embodiment.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Figure 19:
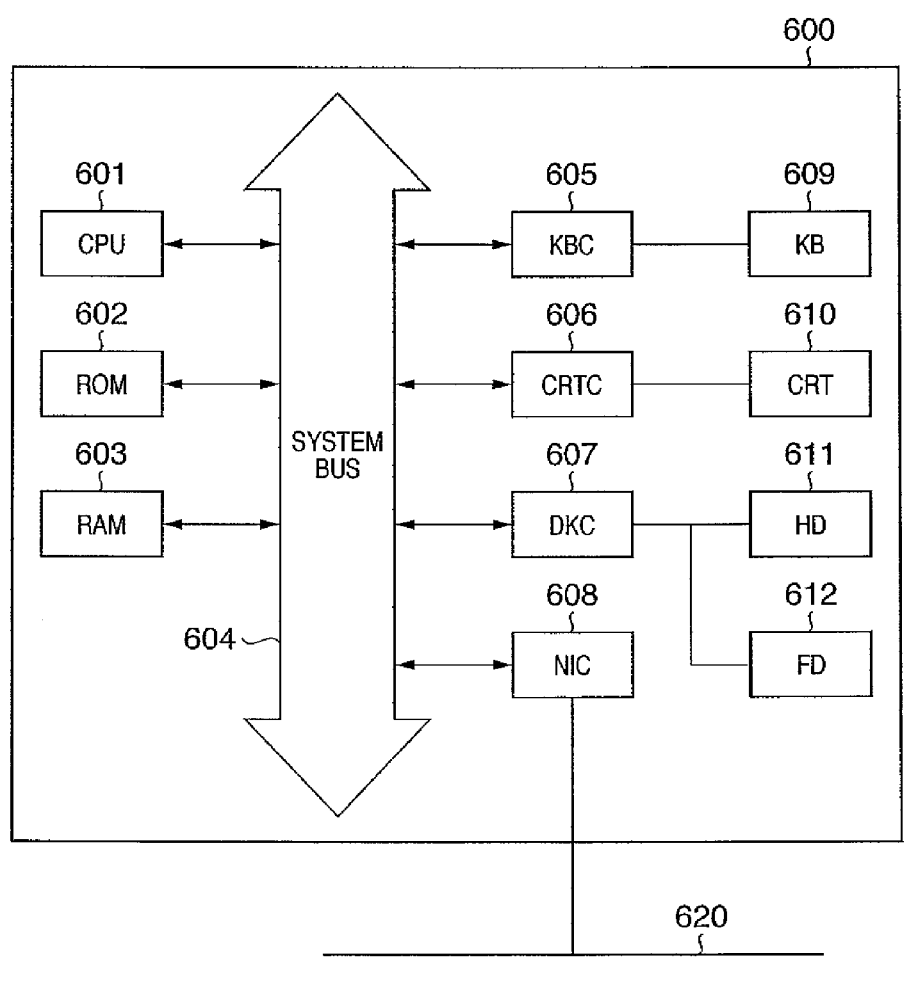
FIG. 19 is a block diagram showing the configuration of a computer which reads out from a computer-readable storage medium a computer program for causing the computer to implement the function of the image verification system, and executes the program.
Figure 20:
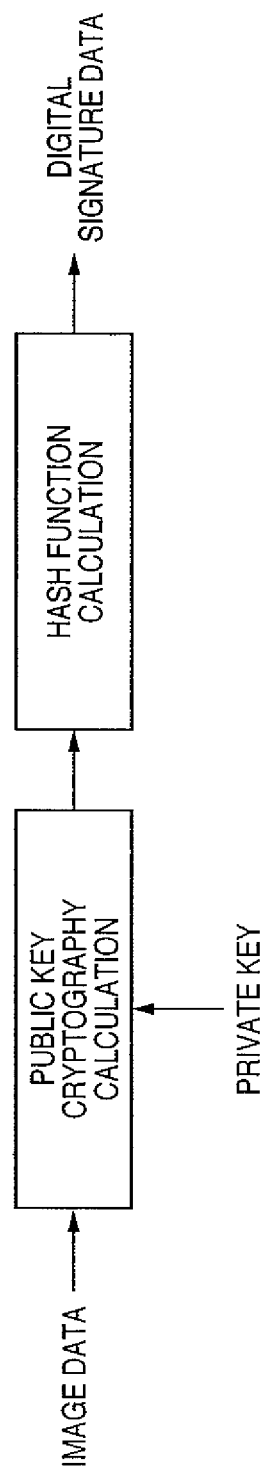
FIG. 20 is a view for explaining a conventional digital signature data generation method.
Figure 21:
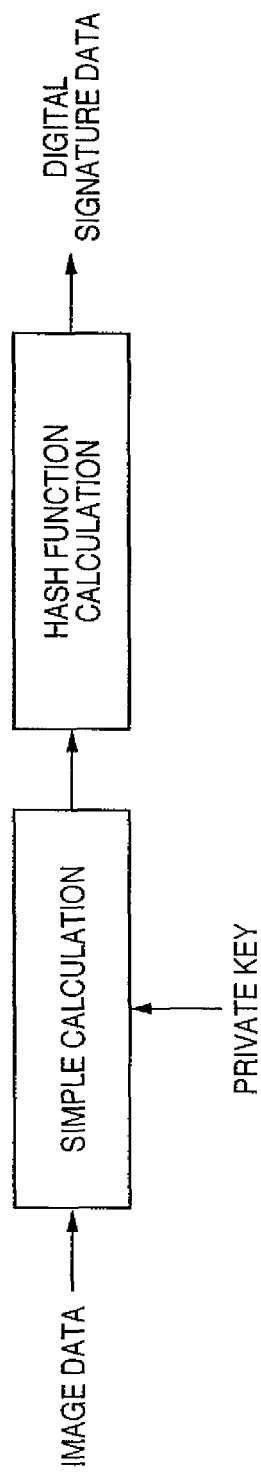
FIG. 21 is a view for explaining another conventional digital signature data generation method.

FIG. 19 shows a computer function 600.

In the computer function 600, as shown in FIG. 19, a CPU 601, a ROM 602, a RAM 603, a keyboard controller (KBC) 605 for a keyboard (KB) 609, a CRT controller (CRTC) 606 for a CRT display (CRT) 610 serving as a display, a disk controller (DKC) 607 for a hard disk (HD) 611 and flexible disk (FD) 612, and a network interface controller (NIC) 608 for connection to a network 620 are connected via a system bus 604 so as to be able to communicate with each other.

The CPU 601 comprehensively controls the constituents connected to the system bus 604 by executing software stored in the ROM 602 or HD 611 or software supplied from the FD 612.

More specifically, the CPU 601 performs control for implementing operations according to the first to six embodiments by reading out computer programs complying with predetermined sequences from the ROM 602, HD 611, or FD 612 and executing the readout programs.

The RAM 603 functions as a main memory, work area, or the like for the CPU 601.

The KBC 605 controls an instruction input from the KB 609, a pointing device (not shown), or the like.

The CRTC 606 controls display on the CRT 610.

The disk controller 607 controls access to the HD 611 and FD 612 which store a boot program, various applications, edit files, user files, network management programs, predetermined computer programs according to the embodiments, and the like.

The NIC 608 exchanges data with an apparatus or system on the network 620 in two directions.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application No. 2003-354155 filed on Oct. 14, 2003 and Japanese Patent Application No. 2004-297010 filed on Oct. 8, 2004 which are hereby incorporated herein by reference herein.

The invention claimed is:
1. An image verification system comprising:
an image input apparatus;
an image verification apparatus;
a storage apparatus;
a user information input apparatus; and
a key generation apparatus,
wherein said user information input apparatus sends user information relating to a user to said key generation apparatus, and sends the user information to said image input apparatus,
wherein said key generation apparatus receives the user information from said user information input apparatus, generates a public key which corresponds to the user information, generates a private key which corresponds to the user information, sends the private key corresponding to the user information to said image input apparatus, and sends the user information and the public key corresponding to the user information to said storage apparatus,
wherein said storage apparatus receives the user information and the public key corresponding to the user information from said key generation apparatus, and sends the public key corresponding to the user information to said image verification apparatus,
wherein said image input apparatus receives the user information from said user information input apparatus, receives the private key corresponding to the user information from said key generation apparatus, generates verification data for image data using the private key corresponding to the user information, and sends the user information, the verification data, and the image data to one of said image verification apparatus and a storage medium, and
wherein said image verification apparatus receives the user information, the verification data, and the image data from one of said image verification apparatus and the storage medium, receives the public key corresponding to the user information from said storage apparatus, and verifies whether the image data has been altered or not using the verification data and the public key corresponding to the user information.

2. An image verification system comprising:
an image input apparatus;
an image verification apparatus;
a storage apparatus;
a user information input apparatus; and
a key generation apparatus,
wherein said user information input apparatus sends user information relating to a user to said key generation apparatus, and sends the user information to said image input apparatus,
wherein said key generation apparatus receives the user information from said user information input apparatus, generates a private key which corresponds to the user information, sends the private key corresponding to the user information to said image input apparatus, and sends the user information and the private key corresponding to the user information to said storage apparatus,
wherein said storage apparatus receives the user information and the private key corresponding to the user information from said key generation apparatus, and sends the private key corresponding to the user information to said image verification apparatus,
wherein said image input apparatus receives the user information from said user information input apparatus, receives the private key corresponding to the user information from said key generation apparatus, generates verification data for image data using the private key corresponding to the user information, and sends the user information, the verification data, and the image data to one of said image verification apparatus and a storage medium, and
wherein said image verification apparatus receives the user information, the verification data, and the image data from one of said image verification apparatus and the storage medium, receives the private key corresponding to the user information from said storage apparatus, and verifies whether the image data has been altered or not using the verification data and the private key corresponding to the user information.

3. The image verification system according to claim 1, wherein said image input apparatus is configured to request said key generation apparatus to send the private key corresponding to the user information.

4. The image verification system according to claim 1, wherein said storage apparatus is configured to store the user information and the public key corresponding to the user information in a storage unit.

5. The image verification system according to claim 1, wherein said image verification apparatus is configured to request said storage apparatus to send the public key corresponding to the user information.

6. The image verification system according to claim 1, wherein said image input apparatus is configured to act as a camera.

7. The image verification system according to claim 1, wherein said image input apparatus is configured to act as a scanner.

8. The image verification system according to claim 2, wherein said image input apparatus is configured to request said key generation apparatus to send the private key corresponding to the user information.

9. The image verification system according to claim 2, wherein said storage apparatus is configured to store the user information and the private key corresponding to the user information in a storage unit.

10. The image verification system according to claim 2, wherein said image verification apparatus is configured to request said storage apparatus to send the private key corresponding to the user information.

11. The image verification system according to claim 2, wherein said image input apparatus is configured to act as a camera.

12. The image verification system according to claim 2, wherein said image input apparatus is configured to act as a scanner.

13. A method comprising:
sending, from a user information input apparatus to a key generation apparatus, user information relating to a user;
sending, from the user information input apparatus to an image input apparatus, the user information;
after the key generation apparatus receives the user information from the user information input apparatus, generating, by the key generation apparatus, a public key which corresponds to the user information;
after the key generation apparatus receives the user information from the user information input apparatus, generating, by the key generation apparatus, a private key which corresponds to the user information;
sending, from the key generation apparatus to the image input apparatus, the private key corresponding to the user information;
sending, from the key generation apparatus to a storage apparatus, the user information and the public key corresponding to the user information;
after the storage apparatus receives the user information and the public key corresponding to the user information from the key generation apparatus, sending, from the storage apparatus to an image verification apparatus, the public key corresponding to the user information;
after the image input apparatus receives the user information from the user information input apparatus and receives the private key corresponding to the user information from the key generation apparatus, generating verification data for image data using the private key corresponding to the user information;
sending, from the image input apparatus to one of the image verification apparatus and a storage medium, the user information, the verification data, and the image data; and
after the image verification apparatus receives the user information, the verification data, and the image data from one of the image input apparatus and the storage medium, and receives the public key corresponding to the user information from the storage apparatus, verifying, by the image verification apparatus, whether the image data has been altered or not using the verification data and the public key corresponding to the user information.

14. The method according to claim 13, further comprising requesting the key generation apparatus to send, to the image input apparatus, the private key corresponding to the user information.

15. The method according to claim 13, further comprising storing the user information and the public key corresponding to the user information in a storage unit included in the storage apparatus.

16. The method according to claim 13, further comprising requesting the storage apparatus to send, to the image verification apparatus, the public key corresponding to the user information.

17. The method according to claim 13, wherein the image input apparatus is configured to act as a camera.

18. The method according to claim 13, wherein the image input apparatus is configured to act as a scanner.

19. A method comprising:
sending, from a user information input apparatus to a key generation apparatus, user information relating to a user;
sending, from the user information input apparatus to an image input apparatus, the user information;
after the key generation apparatus receives the user information from the user information input apparatus, generating, by the key generation apparatus, a private key which corresponds to the user information;
sending, from the key generation apparatus to the image input apparatus, the private key corresponding to the user information;
sending, from the key generation apparatus to a storage apparatus, the user information and the private key corresponding to the user information;
after the storage apparatus receives the user information and the private key corresponding to the user information from the key generation apparatus, sending, from the storage apparatus to an image verification apparatus, the private key corresponding to the user information;
after the image input apparatus receives the user information from the user information input apparatus and receives the private key corresponding to the user information from the key generation apparatus, generating verification data for image data using the private key corresponding to the user information;
sending, from the image input apparatus to one of the image verification apparatus and a storage medium, the user information, the verification data, and the image data; and
after the image verification apparatus receives the user information, the verification data, and the image data from one of the image input apparatus and the storage medium, and receives the private key corresponding to the user information from the storage apparatus, verifying, by the image verification apparatus, whether the image data has been altered or not using the verification data and the private key corresponding to the user information.

20. The method according to claim 19, further comprising requesting the key generation apparatus to send, to the image input apparatus, the private key corresponding to the user information.

21. The method according to claim 19, further comprising storing the user information and the private key corresponding to the user information in a storage unit included in the storage apparatus.

22. The method according to claim 19, further comprising requesting the storage apparatus to send, to the image verification apparatus, the private key corresponding to the user information.

23. The method according to claim 19, wherein the image input apparatus is configured to act as a camera.

24. The method according to claim 19, wherein the image input apparatus is configured to act as a scanner.

* * * * *